United States Patent
Caveney et al.

(10) Patent No.: US 11,613,002 B2
(45) Date of Patent: Mar. 28, 2023

(54) DUAL ARM ROBOT

(71) Applicant: BROOKS AUTOMATION, INC., Chelmsford, MA (US)

(72) Inventors: Robert T. Caveney, Windham, NH (US); Alexander G. Krupyshev, Chelmsford, MA (US); Martin R. Elliot, Austin, TX (US); Christopher Hofmeister, Harleyville, PA (US)

(73) Assignee: Brooks Automation US, LLC, Chelmsford, MA (US)

( * ) Notice: Subject to any disclaimer, the term of this patent is extended or adjusted under 35 U.S.C. 154(b) by 210 days.

(21) Appl. No.: 16/990,775

(22) Filed: Aug. 11, 2020

(65) Prior Publication Data

US 2021/0023698 A1 Jan. 28, 2021

Related U.S. Application Data

(60) Division of application No. 15/489,449, filed on Apr. 17, 2017, now Pat. No. 10,737,381, which is a continuation of application No. 13/293,717, filed on Nov. 10, 2011, now Pat. No. 9,623,555.

(60) Provisional application No. 61/412,218, filed on Nov. 10, 2010, provisional application No. 61/451,912, filed on Mar. 11, 2011.

(51) Int. Cl.
*B25J 9/04* (2006.01)

(52) U.S. Cl.
CPC ............... *B25J 9/043* (2013.01); *B25J 9/042* (2013.01)

(58) Field of Classification Search
None
See application file for complete search history.

(56) References Cited

U.S. PATENT DOCUMENTS

| 5,064,340 A | 11/1991 | Genov et al. |
| 5,765,444 A | 6/1998 | Bacchi et al. |

(Continued)

FOREIGN PATENT DOCUMENTS

| CN | 1332667 | 1/2002 |
| CN | 101711429 | 5/2010 |

(Continued)

OTHER PUBLICATIONS

International Search Report, International Application No. PCT/US2011/060174, dated Feb. 1, 2012.

*Primary Examiner* — Michael S Lowe
(74) *Attorney, Agent, or Firm* — Perman & Green, LLP; Colin C. Durham

(57) ABSTRACT

A substrate processing apparatus including a frame, a first arm coupled to the frame at a shoulder axis having a first upper arm, a first forearm and at least one substrate holder serially and rotatably coupled to each other, a second arm coupled to the frame at the shoulder axis where shoulder axes of rotation of the arms are substantially coincident, the second arm having a second upper arm, a second forearm and at least one substrate holder serially and rotatably coupled to each other, and a drive section connected to the frame and coupled to the arms, the drive section being configured to independently extend and rotate each arm where an axis of extension of the first arm is angled relative to an axis of extension of the second arm substantially at each angular position of at least one of the first arm or the second arm.

20 Claims, 36 Drawing Sheets

(56) References Cited

U.S. PATENT DOCUMENTS

| | | |
|---|---|---|
| 6,105,454 A | 8/2000 | Bacchi et al. |
| 6,109,860 A | 8/2000 | Ogawa et al. |
| 6,155,768 A | 12/2000 | Bacchi et al. |
| 6,297,611 B1 | 10/2001 | Todorov et al. |
| 6,450,755 B1 | 9/2002 | Cameron et al. |
| 6,485,250 B2 | 11/2002 | Hofmeister |
| 6,547,510 B1 | 4/2003 | Beaulieu |
| 7,837,425 B2 | 11/2010 | Saeki et al. |
| 7,891,935 B2 | 2/2011 | Kremerman |
| 8,008,884 B2* | 8/2011 | Krupyshev ....... H01L 21/67742 318/560 |
| 8,267,636 B2* | 9/2012 | Hofmeister ............. B25J 18/00 414/744.5 |
| 8,376,685 B2 | 2/2013 | Pietrantonio et al. |
| 9,117,859 B2* | 8/2015 | Krupyshev ....... H01L 21/67745 |
| 10,141,214 B2 | 11/2018 | Pietrantonio et al. |
| 2001/0033788 A1 | 10/2001 | Pietrantonio |
| 2001/0036398 A1 | 11/2001 | Hofmeister |
| 2002/0066330 A1 | 6/2002 | Namba et al. |
| 2002/0098072 A1 | 7/2002 | Sundar |
| 2003/0011338 A1 | 1/2003 | Gilchrist |
| 2003/0223853 A1 | 12/2003 | Caveney et al. |
| 2004/0001750 A1 | 1/2004 | Kremerman |
| 2004/0216475 A1 | 11/2004 | Sasaki et al. |
| 2006/0210387 A1 | 9/2006 | Saeki et al. |
| 2008/0056856 A1* | 3/2008 | Krupyshev ....... H01L 21/67745 414/217 |
| 2008/0249651 A1 | 10/2008 | Hosek |
| 2008/0260500 A1 | 10/2008 | Van Der Meulen |
| 2010/0178147 A1 | 7/2010 | Kremerman et al. |
| 2010/0290886 A1 | 11/2010 | Hashimoto et al. |

FOREIGN PATENT DOCUMENTS

| | | |
|---|---|---|
| DE | 2008007510 | 8/2009 |
| JP | 05109866 | 4/1993 |
| JP | 10156770 | 6/1998 |
| JP | 10163296 | 6/1998 |
| JP | 2000072248 | 3/2000 |
| JP | 2002158272 | 5/2002 |
| JP | 2002534282 | 10/2002 |
| JP | 2004288720 | 10/2004 |
| JP | 2005011966 | 1/2005 |
| JP | 2005229087 | 8/2005 |
| JP | 2007042799 | 2/2007 |
| JP | 2007130733 | 5/2007 |
| JP | 2008502498 | 1/2008 |
| JP | 2008272864 | 11/2008 |
| WO | 2005123565 | 12/2005 |

* cited by examiner

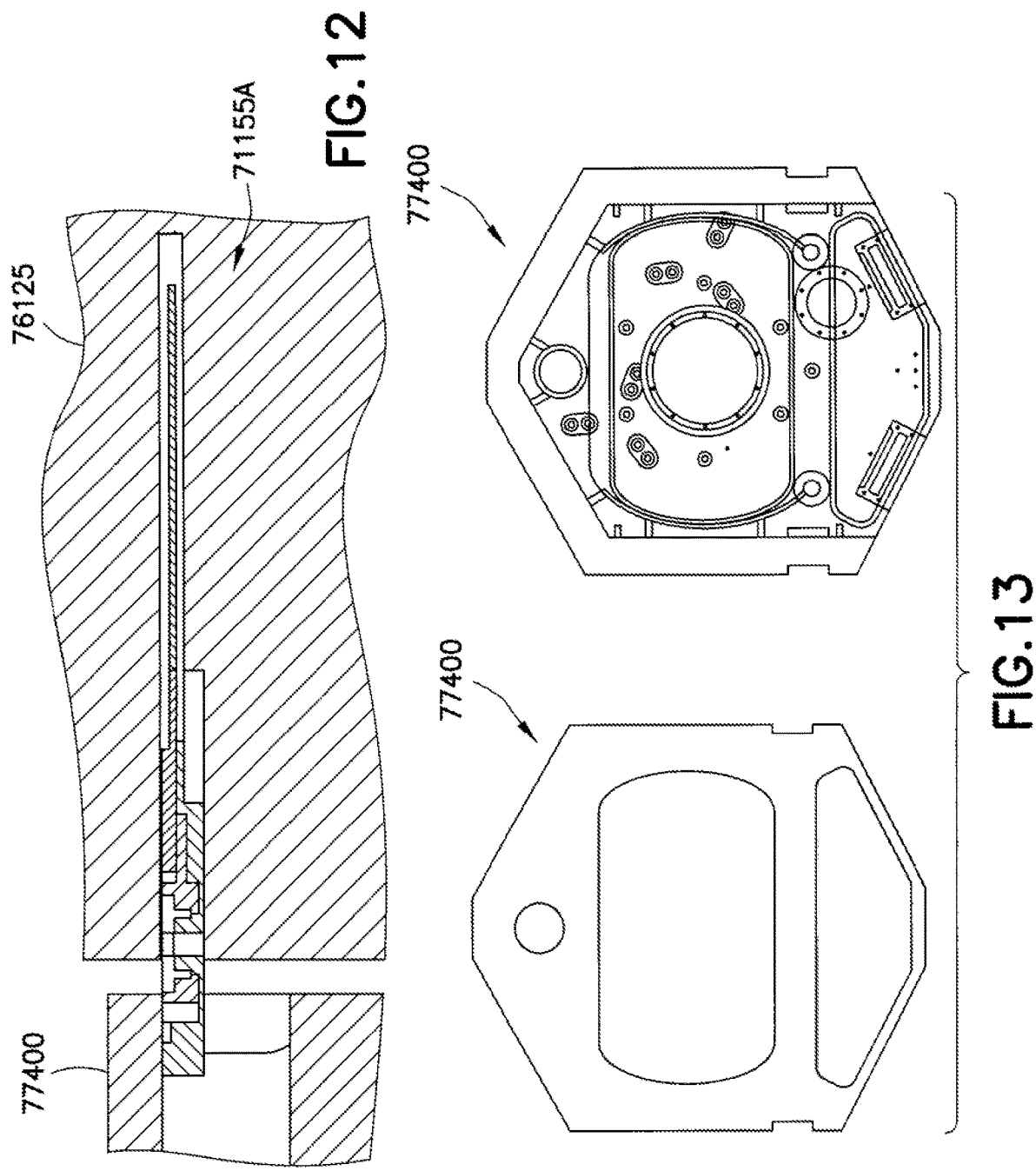

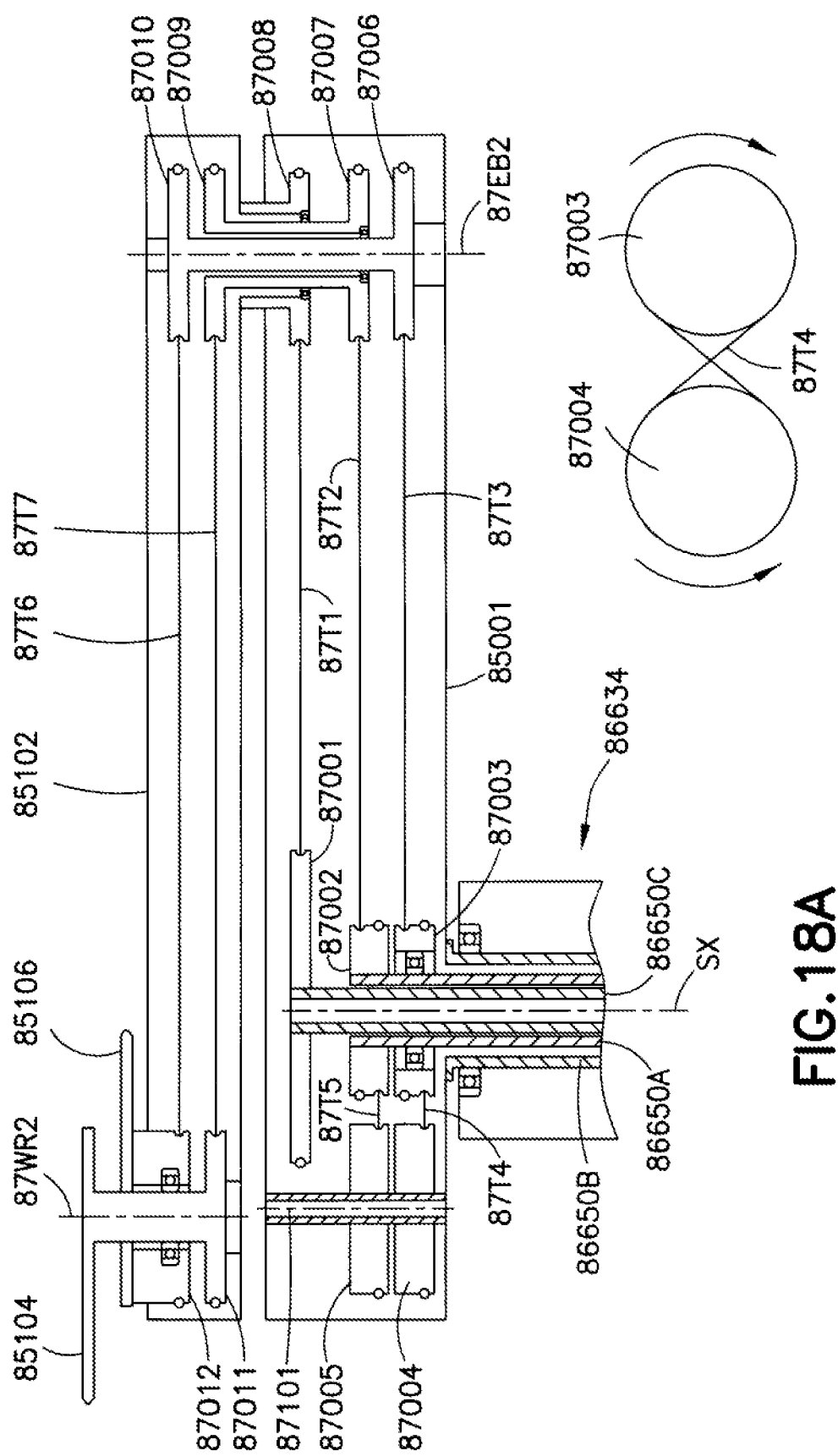

DUAL ARM ROBOT

CROSS REFERENCE TO RELATED APPLICATIONS

This application is a divisional of U.S. patent application Ser. No. 15/489,449, filed on Apr. 17, 2017, which is a continuation of U.S. Non-provisional patent application Ser. No. 13/293,717, filed on Nov. 10, 2011, (now U.S. Pat. No. 9,623,555) which claims priority from and the benefit of U.S. Provisional Patent Application No. 61/412,218 filed on Nov. 10, 2010 and U.S. Provisional Patent Application No. 61/451,912 filed on Mar. 11, 2011, the disclosures of which are incorporated herein by reference in their entireties.

BACKGROUND OF THE INVENTION

Robots are used to perform many tasks in the semiconductor industry, such as the automated handling of substrate media or other objects. In the semiconductor industry, typical media and other objects include individual silicon wafers or wafer carriers, flat panel displays, and hard disk media. Robots may be used for handling media in, for example, wafer processing cluster tools, wafer inspection equipment, metrology equipment, and equipment for hard disk thin film deposition, and in transferring media between production equipment and automated material handling systems in semiconductor factories. Robots may be used in both atmospheric and vacuum environments.

One class of robots is known as jointed arm robots or more specifically, jointed cylindrical coordinate robots. Cylindrical coordinate robots include a configuration consisting of an arm having a limb that is movable in a horizontal plane and attached to a revolute joint. The revolute joint is mounted on a carriage to which a reciprocating vertical movement is supplied along an axis of a vertical column. The limb can move in and out in a radial or R-direction. Also, the arm can rotate as one unit on the carriage in the θ-direction. The arm design is based upon a multiple-linked open kinematic chain. This arm configuration is also known as a Selective Compliant Articulated Robot Arm (SCARA) configuration.

In general, the basic components of a robot system are a manipulator, a power conversion module, sensory devices, and a controller. The manipulator consists of links and joints (with included gears, couplings, pulleys, belts, and so on). The manipulator can be described as a system of solid links connected by joints. Together, the links and joints form a kinematic chain. A kinematic pair comprising a joint and an adjacent link may also be called a linkage.

Two types of joints are used in manipulator mechanisms, revolute and prismatic. A revolute, or rotary, joint allows rotation of one link about the joint axis of the preceding link. A prismatic joint allows a translation between the links.

The motion of a joint is accomplished by an actuator mechanism. Motion of a particular joint causes subsequent links attached to it to move with respect to the link containing the joint's actuator. The actuator can be connected to the link directly or through a mechanical transmission when some output characteristics (force, torque, speed, resolution, etc.) of the actuator need to be changed, depending upon the performance required.

The manipulator usually ends with a link that can support a tool. In semiconductor wafer processing equipment, this tool is usually called an end effector. The interface between the last link and the end effector may be called an end effector mounting flange. The links, which are connected through the joints to the actuators, move relative to one another in order to position the end effector in an X-Y-Z coordinate system.

A configuration of a single arm robot or SCARA arm robot that is commercially available has three parallel revolute joints, which allow for the arm's movement and orientation in a plane. Often, the first revolute joint is called the shoulder, the second revolute joint is called the elbow, and the third revolute joint is called the wrist. The fourth, prismatic, joint is used for moving the end effector normal to the plane, in the vertical or Z-direction. Actuators (for example, closed-loop control servomotors) and motion conversion mechanisms are included in the mechanism to enable the motion of the joints. A controlled movement of each link, i.e., the positioning and the orientation of the end effector in the X-Y-θ-Z coordinate system, can be achieved only when an actuator controls each joint of a manipulator. Actuators can control joints directly, or when the reduction in force and torque is required, via a motion conversion mechanism.

For serial kinematic linkages, the number of joints equals the required number of degrees of freedom. Thus, to move and orient the end effector of the single arm per a required set of X-Y-θ-Z coordinates, four joints (three revolute and one prismatic in the vertical direction) are required. In some multiple-linked jointed cylindrical coordinate type robots, end effectors often are required to be oriented such that a center line drawn along the end effector and projected towards the column of the robot always intersects with the axis of revolution of the first rotary joint (the shoulder joint). In this case, the manipulator requires just three degrees of freedom (R-θ-Z). An individual actuator does not control the joint of the end effector, and only three actuators are required.

Known dual arm robots of this type for handling substrate media may include two shoulder joints, two elbow joints, and two wrist joints. The arms can also move vertically a predetermined distance along the translational axis of the prismatic joint of the carriage, which supports the first rotary joint (the shoulder joint of the arm). The individual links of both arms are at the same level and the shoulder joints are next to each other, requiring use of a C-type bracket between one of the arms and its end effector, so that both end effectors can pass each other. This robot, however, cannot be used in a vacuum transport module built per SEMI MESC standards, because the isolation valves of such a vacuum transport module are too narrow to allow passage of the arm that includes the C-type bracket per the SEMI specification that defines wafer transport planes within cassette and process modules. Also, the arms cannot rotate independently in cylindrical coordinates. The angular relationship between the vector of the straight-line radial translation of the individual end effectors of each arm (in robots that are presently available commercially) is permanent and established during the assembly of the robot. Often, the individual arms of the dual arm robot are directed along the same vector.

Generally in substrate processing systems the rotation of arms of transfer robots with multiple arms are linked to one another so as one arm rotates the other arm(s) rotates as well. The end effectors of the transfer robots are generally located in different planes so that a fast swap (e.g. one end effector radially passes over/under the other end effector so that as one substrate is removed from a holding station another substrate is substantially simultaneously placed at the holding station without retraction of the arms to battery) of substrates to and from holding locations generally occurs using either a Z axis capability of the transfer robot or holding station.

It would be advantageous to decouple the rotation of the arms of substrate transfer robots so that each arm is capable of independent operation.

DESCRIPTION OF THE DRAWINGS

The invention will be more fully understood from the following detailed description taken in conjunction with the accompanying drawings in which:

FIG. 12 is a schematic illustration of an exemplary transfer arm extension into a processing module in accordance with an aspect of the disclosed embodiment;

FIGS. 13-15 are schematic illustrations of transfer chambers in accordance with aspects of the disclosed embodiment;

FIGS. 18A-18C are schematic illustrations of portions of the transport apparatus of FIGS. 16A-16C;

DETAILED DESCRIPTION OF THE INVENTION

The aspects of the disclosed embodiment relate to a dual arm, cylindrical coordinate robot assembly, and more particularly to the manipulator, the system of links and joints that cooperate to position a pair of end effectors, for such a robot assembly. It is noted that suitable examples of dual arm robot assemblies can be found in U.S. patent application Ser. No. 13/030,856, filed on Feb. 18, 2011 which is a divisional application of U.S. patent application Ser. No. 10/434,582, filed May 9, 2003 and U.S. Provisional Patent Application Nos. 60/378,983, 60/379,095 and 60/379,063 both filed on May 9, 2002, the disclosures of which are all incorporated by reference herein in their entireties.

For purposes of describing the aspects of the disclosed embodiment, the manipulator can be described as a mechanical assembly and broken down into major linkages, minor linkages (wrist components), and the end effector. The major linkages are the set of joint-link pairs that position the manipulator in space. Generally, the major linkages are the first three sets of joint-link pairs. The first joint-link pair may include a prismatic joint (e.g., a linear bearing) and a link (e.g., a carriage) that allows for vertical displacement of the tool (in other aspects the manipulator may be substantially fixed in the Z or vertical direction, e.g. without a joint movable in the Z direction). The second joint-link pair includes a revolute joint (e.g., a radial ball bearing) and a link (e.g., an inner link). The third joint-link pair includes a revolute joint (e.g., a radial ball bearing) and a link (e.g., an outer link). The minor linkages are a fourth joint-link pair and include a revolute joint (e.g., a radial ball bearing) and a link $E_n$, which is the end effector mounting flange. The actual end effector is an attachment that can have various configurations and is mounted onto the mounting flange $E_n$.

Each of the joints of a robot assembly defines a joint axis about or along which the particular link either rotates or slides. In a pure open-loop jointed multiple-linked kinematic chain, every joint defines a degree of freedom (DOF), so that the total number of DOFs is equal to the number of joints. Also, the number of degrees of freedom of an arm can be calculated as based upon the number of variables or coordinates that are needed to describe its position, or the position of the end effector(s). Hence, sometimes the number of degrees of freedom may be less than the total number of joints. This happens when the state of one actuator determines the state of more than one joint.

Figure 1:
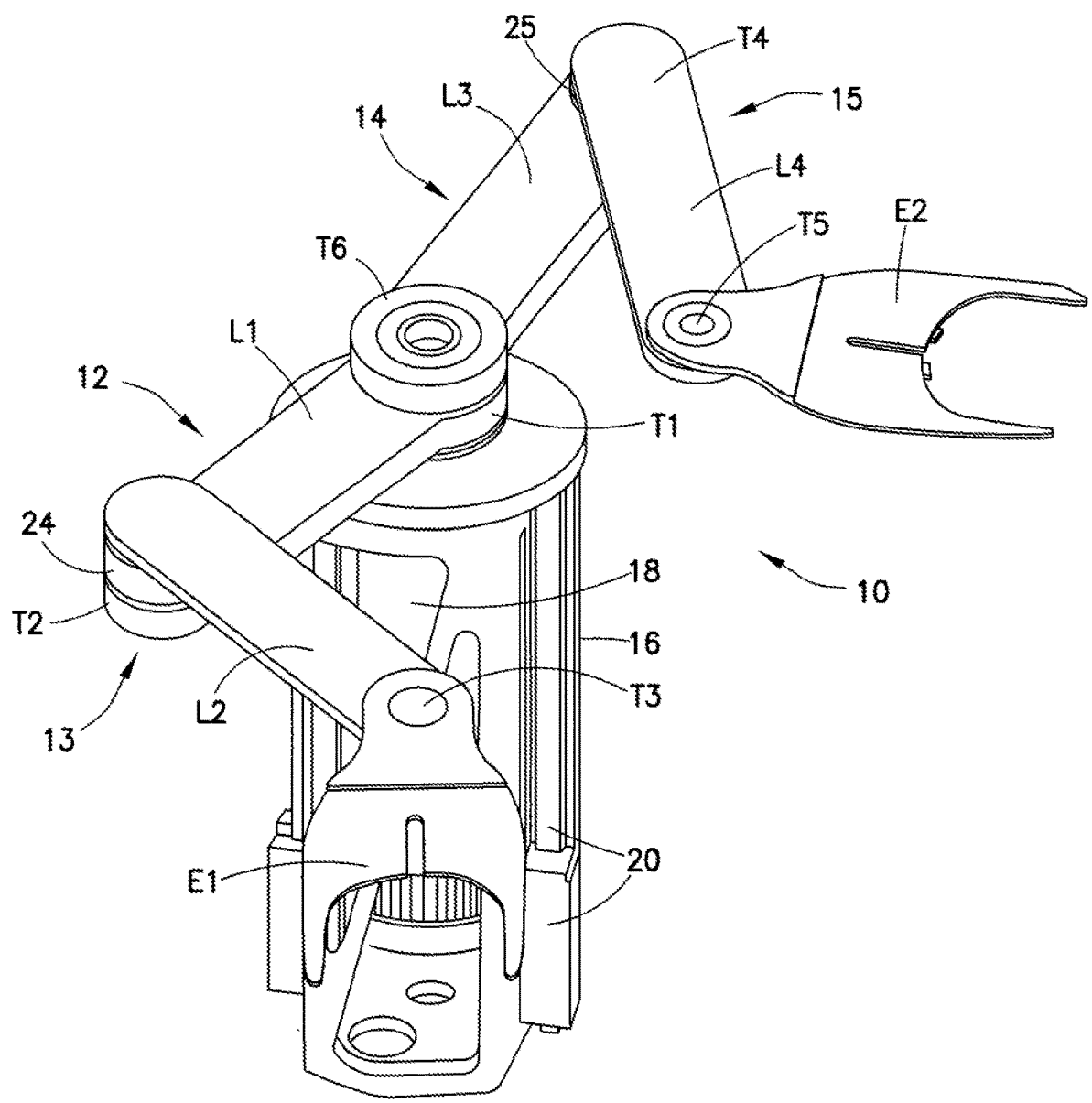
FIG. 1 is a first embodiment of a dual arm robot having two limbs providing a total of four degrees of freedom (4 DOF) according to an aspect of the disclosed embodiment.

In one aspect of the disclosed embodiment a robot assembly 10 is illustrated in FIG. 1. The assembly may include two SCARA arms 12, 14 that share a common prismatic joint 20/carriage 18 linkage. The common carriage link 18 is located within the envelope of a column 16. Each arm further includes a limb 13, 15 that is movable in a horizontal plane and mounted atop the common carriage link 18. Referring to the kinematic chain illustrated schematically in FIG. 2, four joint/link pairs are evident for each arm, and the arms may be coupled to a prismatic joint 20/carriage 18 for movement in the Z direction. Referring to arm 12, these pairs are prismatic joint 20/carriage 18, revolute joint T1/inner link L1, revolute joint T2/outer link L2, and revolute joint T3/link E1. Referring to arm 14, these pairs are prismatic joint 20/carriage 18, revolute joint T6/inner link L3, revolute joint T4/outer link L4, and revolute joint T5/link E2. Thus, the limbs 13, 15 are mounted for revolution about the axis of revolute joints T1 and T6 respectively. As a result of this arrangement, a Z-axis 22 positioned along the axis of the joints T1 and T6 can be located and described as a common axis 22 of the carriage 18. The limbs of both arms are able to extend and retract in a radial direction independently of each other.

Each distalmost link E1, E2 may support a tool. In the semiconductor industry, these links are referred to as end effector mounting flanges, and are connected to the outer links of the manipulator via the wrist rotary joints T3 and T5. The tools supported by the end effector mounting flanges are often called end effectors. The end effector mounting flanges may be identical or different, depending on the application.

Motion of a particular joint causes the links attached to that joint to move. Upon actuation, each limb is able to move in a distal or a proximal direction to provide straight-line radial translation of the end effector, maintaining a projection of the axis of the end effector aligned to intersect the common axis 22 of the carriage 18, about which the links L1 and L3, connected via the rotary joints T1 and T2, rotate. For purposes of describing the present invention, the term "distal" is a relative term that refers to a direction generally away from the common axis 22. The term "proximal" is a relative term that refers to a direction generally toward the common axis 22.

The carriage 18 is connected via the prismatic joint 20 to a vertical column 16 for vertical linear motion along the axis $Z_{20}$ of the vertical column 16. See FIG. 2. The axis $Z_{20}$ is parallel to the common axis 22 of the carriage 18, about which the links L1 and L3 rotate. The two limbs 13, 15 are supported by the carriage 18 on the column 16. The vertical column may also be mounted for rotation on a base 21 via a revolute joint T7, as indicated schematically in FIG. 3A. The base may also be referred to a link L0. In this manner, the column allows for vertical movement of the arm assemblies and the carriage as a unit in the Z direction and, if the revolute joint T7 is present, the column may rotate about the axis of the joint T7 with respect to the robot's base 21 containing the joint's actuator.

As noted above, each inner link L1, L3 is attached to the carriage 18 via a proximal, or shoulder, rotary joint T1, T6. The shoulder joints T1, T6 of the two arms 12, 14 are co-linear on the common axis 22 of the carriage 18 and vertically offset, one above the other. The end effector mounting flanges E1, E2 move in horizontal planes that are parallel to each other, one horizontal plane may be substantially coincident or offset vertically from the other horizontal plane, as will be described further below. The elbow joint of at least one arm, joint T2 of arm 12, may include a spacer 24 to space the outer link L2 from the inner link L1 by an amount sufficient to offset the two end effector mounting flanges E1, E2 vertically. In the aspect of the disclosed embodiment illustrated in FIG. 1, in which the limbs are the same length, the joint T4 may also include a spacer 25 to space the outer link L4 from the inner link L3 by an amount sufficient to offset the two end effector mounting flanges E1 and E2 vertically. In this manner, the end effectors may not interfere with each other when the two arm assemblies are configured for moving independently with unrestricted rotation about the Z-axis.

In one aspect of the disclosed embodiment, referred to as a four-axis system, the two limbs 13, 15 of the robot assembly 10 are independently operable. In this context, it will be appreciated that the term "four-axis" refers to the system of revolute joint/link pairs that allow the motion of the limbs of the arms in a plane described by polar R-θ coordinates. For descriptive purposes only, the mechanism of the vertical displacement of the arm is not included in the term "four-axis."

In this aspect of the disclosed embodiment, the limbs are independently rotatable and capable of substantially infinite rotation about the revolute joints T1 and T6, wherein rotation of an individual limb is a change in the θ coordinate of the end effector mounting flange, the last link of the manipulator. As a result of the coaxial position of the T1 and T6 joints, the rotation occurs about the common axis 22 of the carriage 18 (e.g. the shoulder axes of the limbs or arms 13, 15 are substantially coincident with each other). Also, the end effector mounting flanges E1, E2 are independently extendible and retractable via the linkage defined by the inner links L1, L3, the outer links L2, L4, and the rotary joints T1 through T6 along a centerline drawn along the end effector and projected toward the common axis 22 of the carriage 18. Two actuator assemblies are provided for each arm to effect these extension/retraction and rotation motions. The four actuators are housed in the carriage 18 and connected via co-axially located shafts 34, 44, 54, 64 to the arms. (See FIG. 5.) In other aspects, actuators for one arm may be disposed in a first housing and the actuators for the other arm may be disposed in a second separate housing. Two actuators are connected to the housings of the inner links L1 and L3, while the other two actuators are connected to pulleys located in the joints T1 and T6 of the inner links L1 and L3. The action of the linkages and the actuator assemblies, in particular when embodied as what may be referred to as a four degree of freedom (4 DOF) system effected by, for example, motors M1, M2, M3, M4, is discussed further below.

Figure 2:
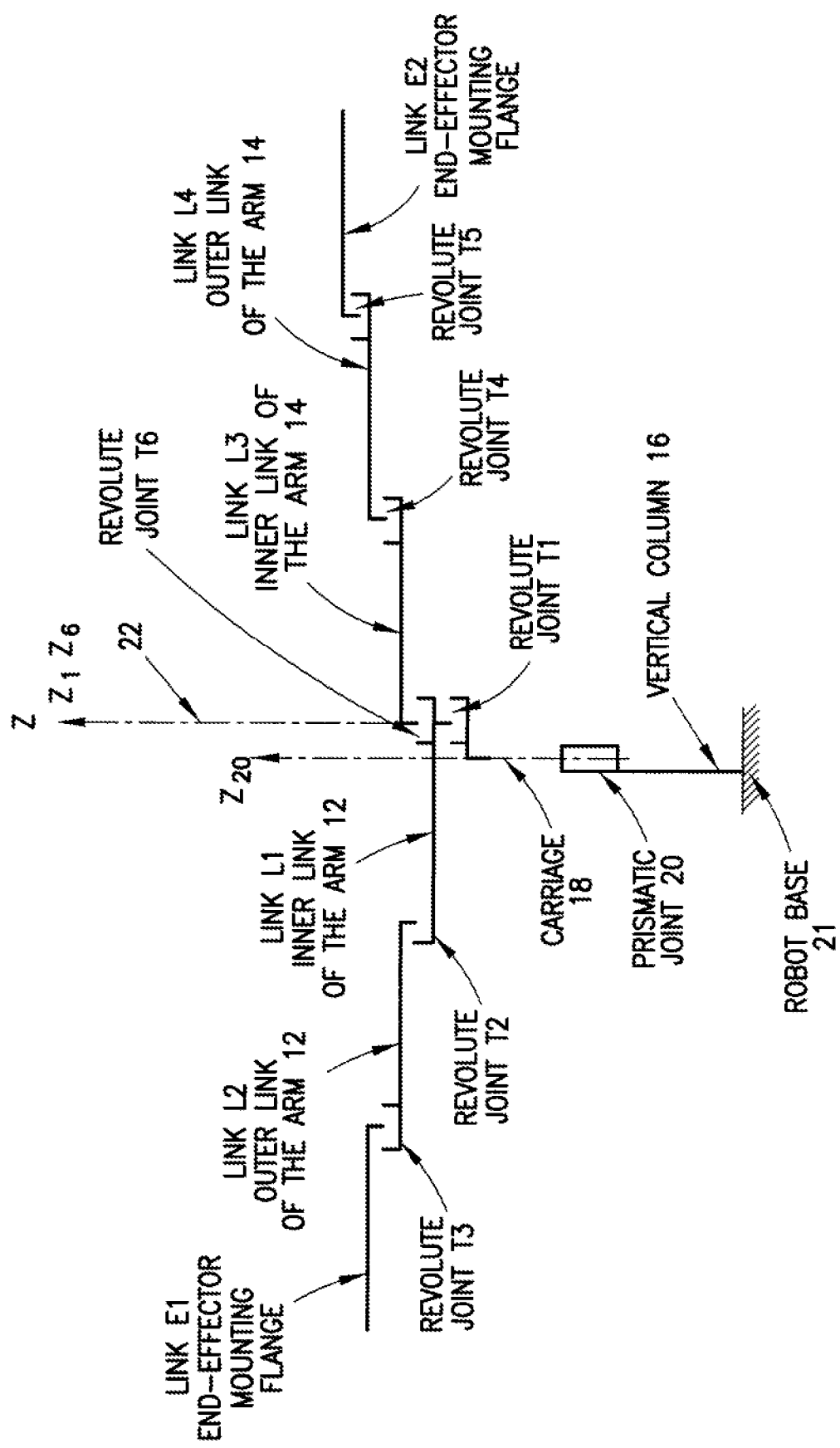
FIG. 2 is a schematic diagram of the robot of FIG. 1.
Figure 3A:
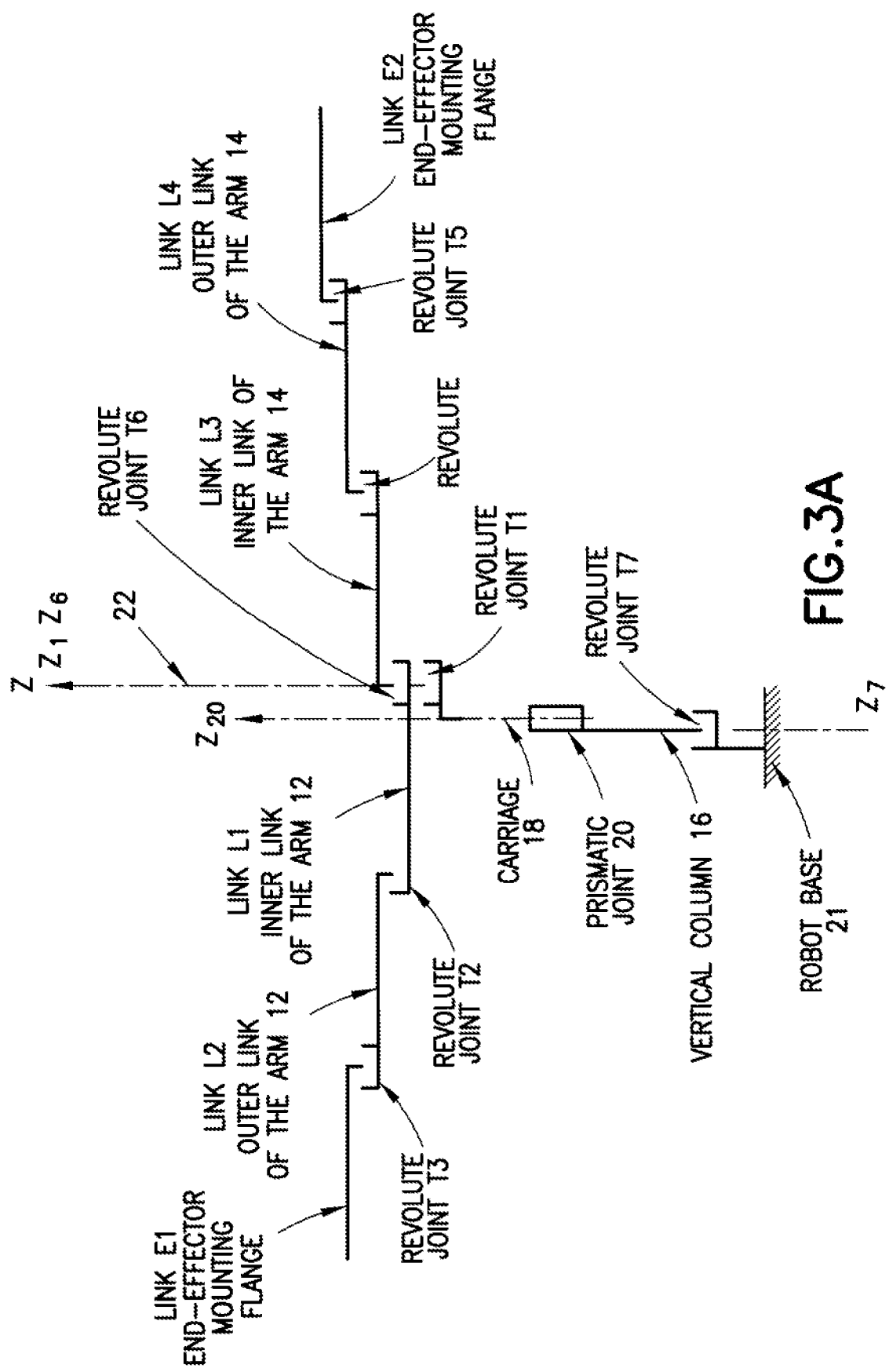
FIG. 3A is a schematic diagram of a further embodiment of the robot of FIG. 1.
Figure 3B:
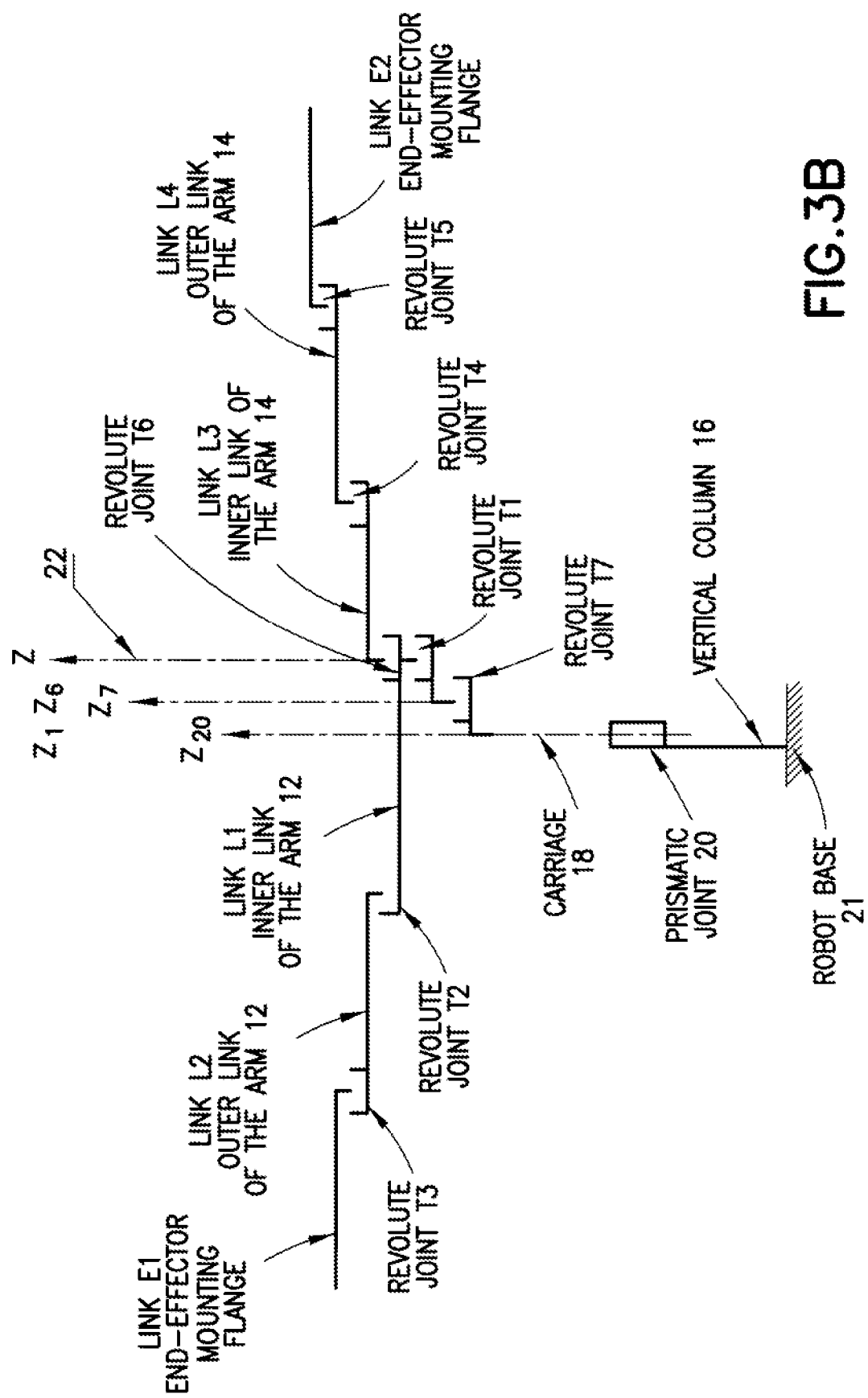
FIG. 3B is a schematic diagram of a further embodiment of the robot of FIG. 1.

In one aspect, motion of the end effector mounting flanges E1, E2 is produced by manipulation of the inner and outer links incorporating a series of belts and pulleys. The motion of the end effector mounting flange E1 of the arm 12 is discussed with reference to the schematic diagrams of FIGS. 2 and 3A and the kinematic diagram of FIG. 4. As illustrated in FIGS. 2 and 3A, the inner link L1 is connected to the carriage 18 via the shoulder rotary joint T1 (or via the rotary joint T1 and an additional rotary joint T7 located as shown in FIG. 3B). The outer link L2 is connected to the inner link L1 via the elbow rotary joint T2. The end effector mounting flange E1 is connected to the outer link L2 via the wrist rotary joint T3. The links and joints of this part of the manipulator form a kinematic chain that is open at one end and connected to the carriage 18 at the other. The carriage 18 is connected to the robot base 21 via a prismatic joint 20, as shown in FIG. 2 and also in FIG. 3B, or using an additional revolute joint T7 located between the column 16 and the robot base 21, as shown in FIG. 3A. The end effector, which is not a part of the schematic and is not shown, is connected to the end effector mounting flange E1.

Figure 4:
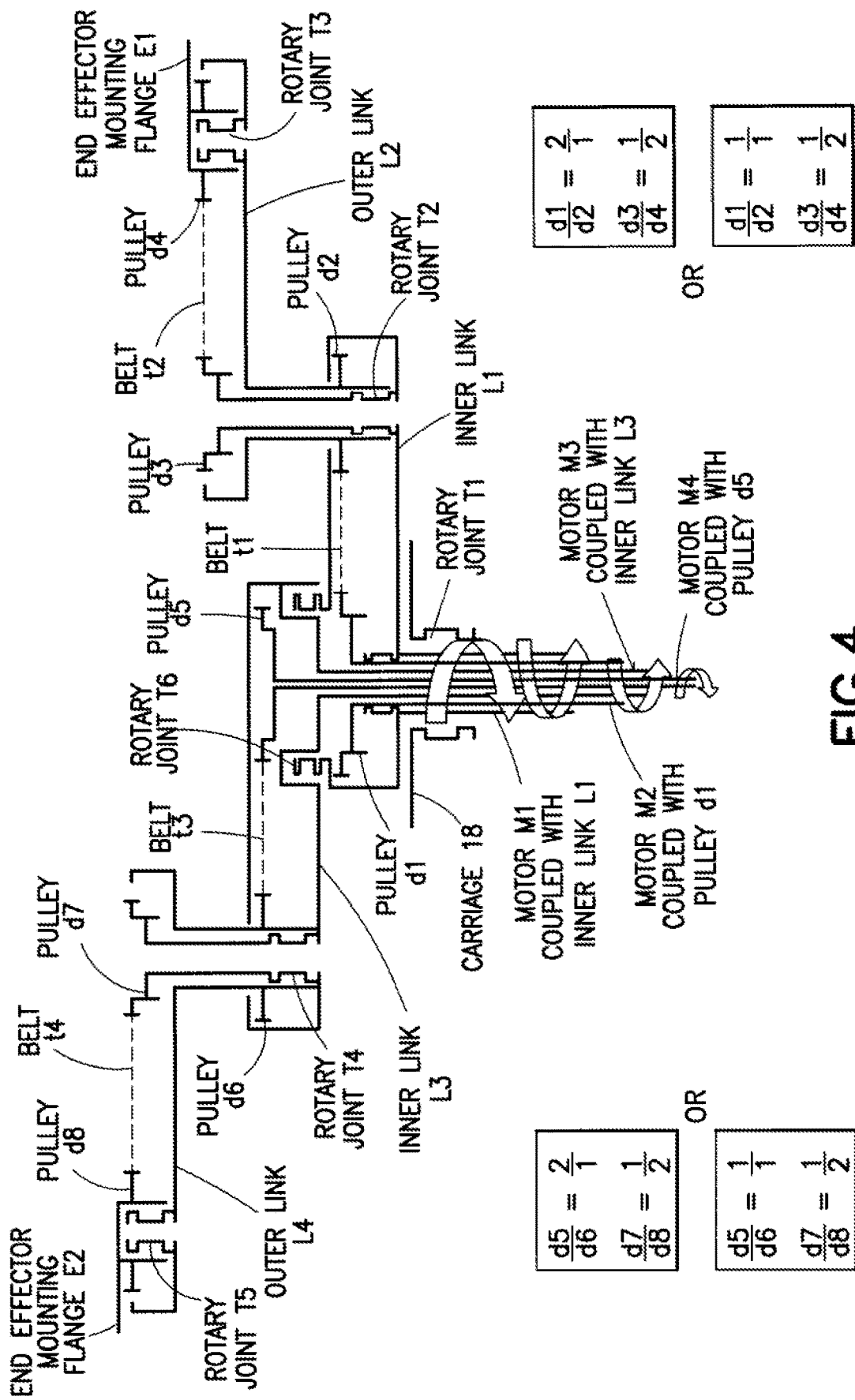
FIG. 4 is a kinematic diagram of the robot of FIG. 1.

Referring to FIG. 4, there is shown a schematic diagram of an exemplary four degree of freedom coupling system operably connecting the motors (e.g. four motors) to the two arms to effect four degree of freedom motion. It should be understood that the system shown is representative and in other aspects the system may have any suitable configuration. In one aspect, shown in FIG. 4, a pulley d1 is provided at the shoulder rotary joint T1, and a pulley d2 is provided at the elbow rotary joint T2. A belt t1 extending along the inner link L1 is connected to the pulleys d1 and d2. The pulley d2, while physically located in the inner link L1, is mounted to the link L2 and, as a part of the elbow rotary joint T2, allows rotation of the link L2 about the joint axis of the preceding link L1. A pulley d3 is also provided at the elbow joint T2, and a pulley d4 is provided at the wrist rotary joint T3. The pulley d3, while located physically in the link L2, is attached to the link L1 and is a part of the axis about which the elbow joint T2 of the link L2 revolves. The pulley d4, while physically located within the link L2, is attached to the end effector mounting flange E1 and, as a part of the wrist joint T3, allows the rotation of the end effector mounting flange E1 about the joint axis of the preceding link L2. A belt t2 is connected to the pulleys d3 and d4. The pulley d3, fixed to the link L1 at the axis about which the elbow joint T2 of the link L2 rotates, travels with the housing of the link L1 when the shoulder joint T1 of the link L1 is rotated about the common axis 22. When the link L1 is rotated, the pulley d2 is also constrained to move with the link L1, which causes the pulley d2 to move in a fashion similar to the movement of a satellite gear of a planetary gear box. The pulley d2 rotates around the common axis 22 of the shoulder joint T1, because it is attached to the distal axis of the inner link L1 via the elbow joint T2. As a part of the elbow joint T2, the pulley d2 also rotates about the distal axis of the preceding link L1. The rotation occurs as a result of the pulley d2 being connected to the pulley d1 via a belt t1, such as a timing belt, chain, or cable works.

The ratio between the diameters of the pulleys d1 and d2 effects the relative angular displacement of the pulley d2, depending on the amount of angular displacement given to the actuator input connected to the link L1 (e.g., motor M1) and the actuator input connected to the pulley d1 (e.g., motor M2). A complete description of the position of the axis and orientation of the elbow joint T2 (of which the pulley d2 is a part), in the polar coordinate system based at the polar axis located co-axially with the axis Z1 of the shoulder joint T1, depends upon the length of the link L1, the input angular displacement values to the pulley d1 (via motor M2) and link L1 (via motor M1), and the pulley diameter ratio d1/d2. Thus, the R-θ coordinates of the proximal end of the subsequent link L2 attached to the elbow joint T2 and the orientation of the link L2 around the T2 joint axis of rotation are defined. R-θ coordinates of the distal end of the link L2, which contains the axis of rotation of the wrist joint T3, depend on the length of the link L2.

The position in the R-θ coordinate system of the proximal end of the end effector mounting flange, link E1, attached to the wrist joint T3 and the orientation of E1 around the T3 joint axis of rotation depends on the following conditions: the angular input value to the link L1 (via motor M1), the angular input value to the pulley d2 (via motor M2), the length of the link L1, the pulley diameter ratio d1/d2, the length of the link L2, and the pulley diameter ratio d3/d4.

The other limb is similar. Thus, as illustrated in FIGS. 2, 3A, and 4, the inner link L3 may be connected to the carriage 18 (if the carriage 18 is provided) via the shoulder rotary joint T6 (or via rotary joint T6 and an additional rotary joint T7 located as shown in FIG. 3A). The outer link L4 is connected to the inner link L3 via the elbow rotary joint T4. The end effector mounting flange E1 is connected to the outer link L4 via the wrist rotary joint T5. The links and joints of this part of the manipulator form a kinematic chain that is open at one end and connected to the carriage 18 at the other. The carriage 18 is connected to the robot base 21 via a prismatic joint 20, as shown in FIGS. 2 and 3B or using an additional revolute joint T7 located between the column 16 and the robot base 21, as shown in FIG. 3A. The outer link L4 is coupled to the end effector mounting flange E2 via the wrist rotary joint T5.

A pulley d5 is provided at the shoulder rotary joint T6, and a pulley d6 is provided at the elbow rotary joint T4. A belt t3 extending along the inner link L3 is connected to the pulleys d5 and d6. The pulley d6, while physically located in the inner link L3, is a part of and mounted to the link L4 and, as a part of the elbow joint T4, allows rotation of the link L4 about the joint axis of the preceding link L3. A pulley d7 is also provided at the elbow joint T4, and a pulley d8 is provided at the wrist rotary joint T5. The pulley d7, while located physically in the link L4, is attached to the link L3 and is a part of the axis about which the elbow joint T4 of the link L4 revolves. The pulley d8, while physically located within the link L4, is attached to the end effector mounting flange E2 and, as a part of the wrist joint T5, allows the rotation of the end effector mounting flange E2 about the joint axis of the preceding link L4. A belt t4 is connected to the pulleys d7 and d8. The pulley d7, fixed to the link L3 at the axis about which the elbow joint T4 of the link L4 rotates, travels with the housing of the link L3 when the shoulder joint T6 of the link L3 is rotated about the common axis 22. When the link L3 is rotated, the pulley d6 is also constrained to move with the link L3, which causes the pulley d6 to move in a fashion similar to the movement of a satellite gear of a planetary gear box. The pulley d6 rotates around the common axis 22 of the shoulder joint T6, because it is attached to the distal axis of the inner link L3 via the elbow joint T4. As a part of the elbow joint T4, it also rotates about the distal axis of the preceding link L3. The rotation occurs as a result of the pulley d6 being connected to the pulley d5 via a belt t3, such as a timing belt, chain, or cable works.

The ratio between the diameters of the pulleys d5 and d6 effects the relative angular displacement of the pulley d6, depending on the amount of angular displacement given to the actuator input connected to the link L3 (e.g., motor M3) and the actuator input connected to the pulley d5 (e.g., motor M4). A complete description of the position of the axis and orientation of the elbow joint T4 (of which the pulley d6 is a part), in the polar coordinate system based at the polar axis located co-axially with the axis Z6 of the shoulder joint T6, depends upon the length of the link L3, the input angular displacement values to the pulley d5 (via motor M4) and link L3 (via motor M3), and the pulley diameter ratio d5/d6. Thus, the R-θ coordinates of the proximal end of the subsequent link L4 attached to the elbow joint T4 and the orientation of the link L4 around the T4 joint axis of rotation are defined. R-θ coordinates of the distal end of the link L4, which contains the axis rotation of the wrist joint T5, depend on the length of the link L4.

The position in the R-θ coordinate system of the proximal end of the end effector mounting flange, link E2, attached to the wrist joint T5 and the orientation of E2 around the T5 joint axis of rotation depends on the following conditions: the angular input value to the link L3 (via motor M3), the angular input value to the pulley d5 (via motor M4), the length of the link L3, the pulley diameter ratio d5/d6, the length of the link L4, and the pulley diameter ratio d7/d8.

Figure 5:
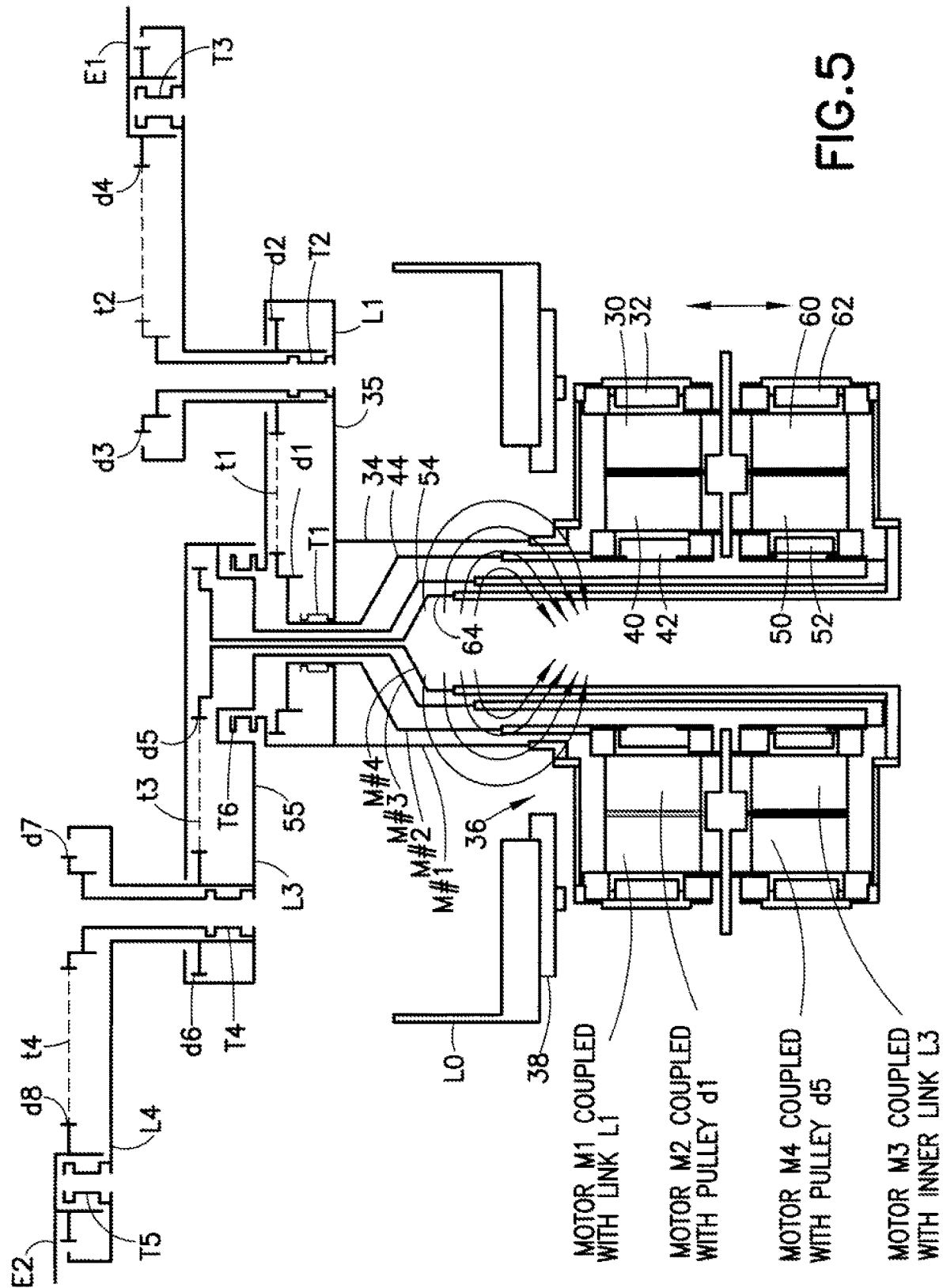
FIG. 5 is a schematic diagram of an actuator assembly of the robot of FIG. 1.

In one aspect of the disclosed embodiment, the actuators are embodied as motors. Referring to FIG. 5, a motor M1 is coupled via shaft 34 with the inner link L1. A motor M2 is coupled via shaft 44 with the pulley d1. A motor M3 is coupled via shaft 54 with the inner link L3. A motor M4 is coupled via shaft 64 with the pulley d5.

Figure 6:
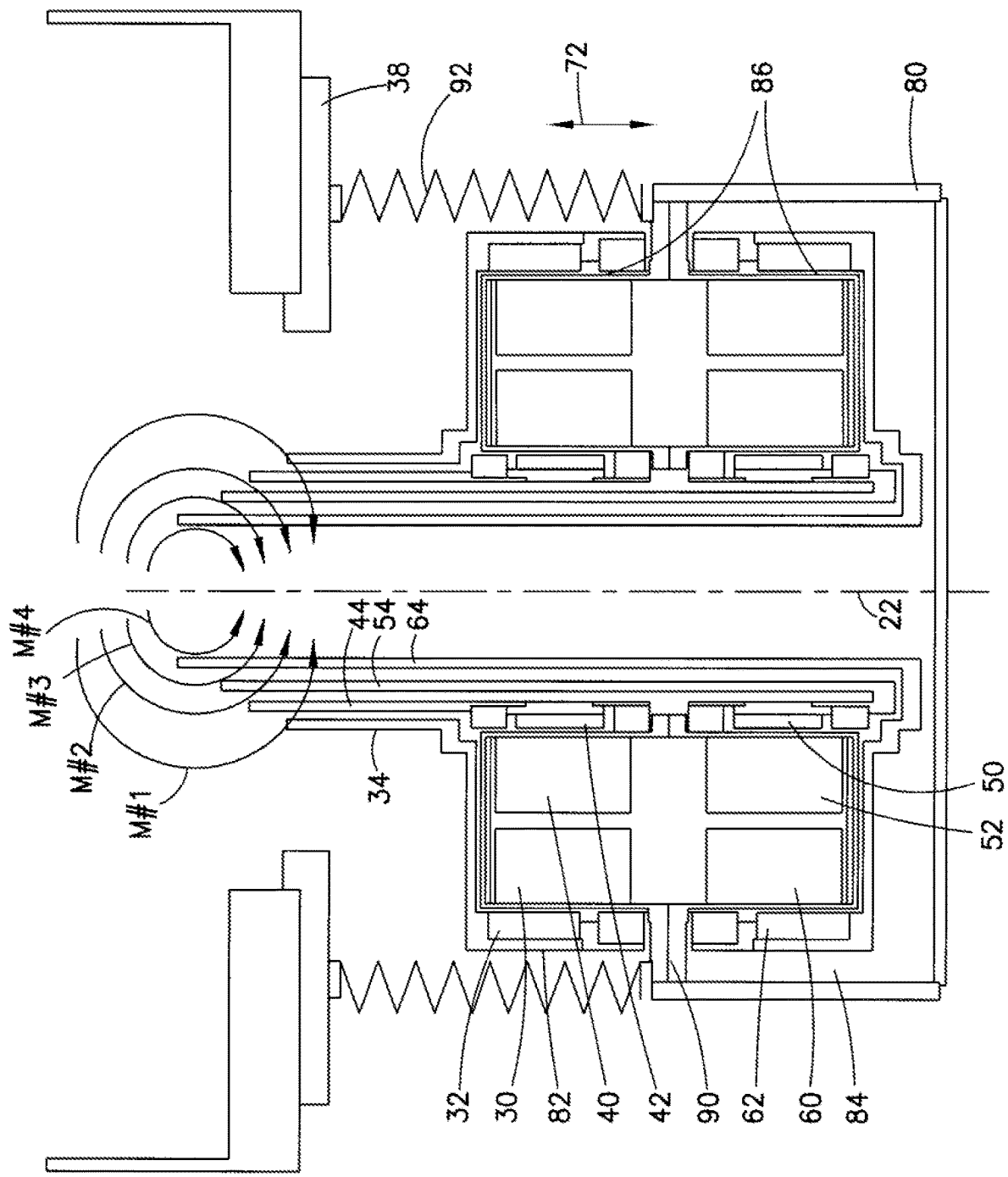
FIG. 6 is a schematic diagram of a further embodiment of a vacuum compatible actuator assembly of the robot of FIG. 1.

FIG. 6 illustrates an aspect of the disclosed embodiment having four motors M1, M2, M3, M4 suitable for use with a vacuum compatible robot. A suitable housing 80 is provided surrounding the stators of the motors. In one aspect the motors M1 and M2 are provided as one module 82, and the motors M3 and M4 are provided as a second module 84. As can be seen in FIG. 5, the drive axes of the modules 82, 84 are substantially coincident with each other. The motors are arranged in a back-to-back configuration, in which the end shafts of the motor modules are oriented in opposite directions when the motors are assembled into a two-module unit. Vacuum isolation barriers 86, such as thin wall cylinders, are provided between the rotors 32, 42, 52, 62 and stators 30, 40, 50, 60, so that the stators are in an atmospheric environment. The power and signal cables (not shown) are introduced through suitably sealed openings in a bulkhead 90 of the housing 80. A bellows 92 connects the motor housing 80 and the interface flange 38. During vertical travel of the carriage, the bellows expands and contracts. In this manner, the robot arms can be maintained in a vacuum environment.

Figure 7:
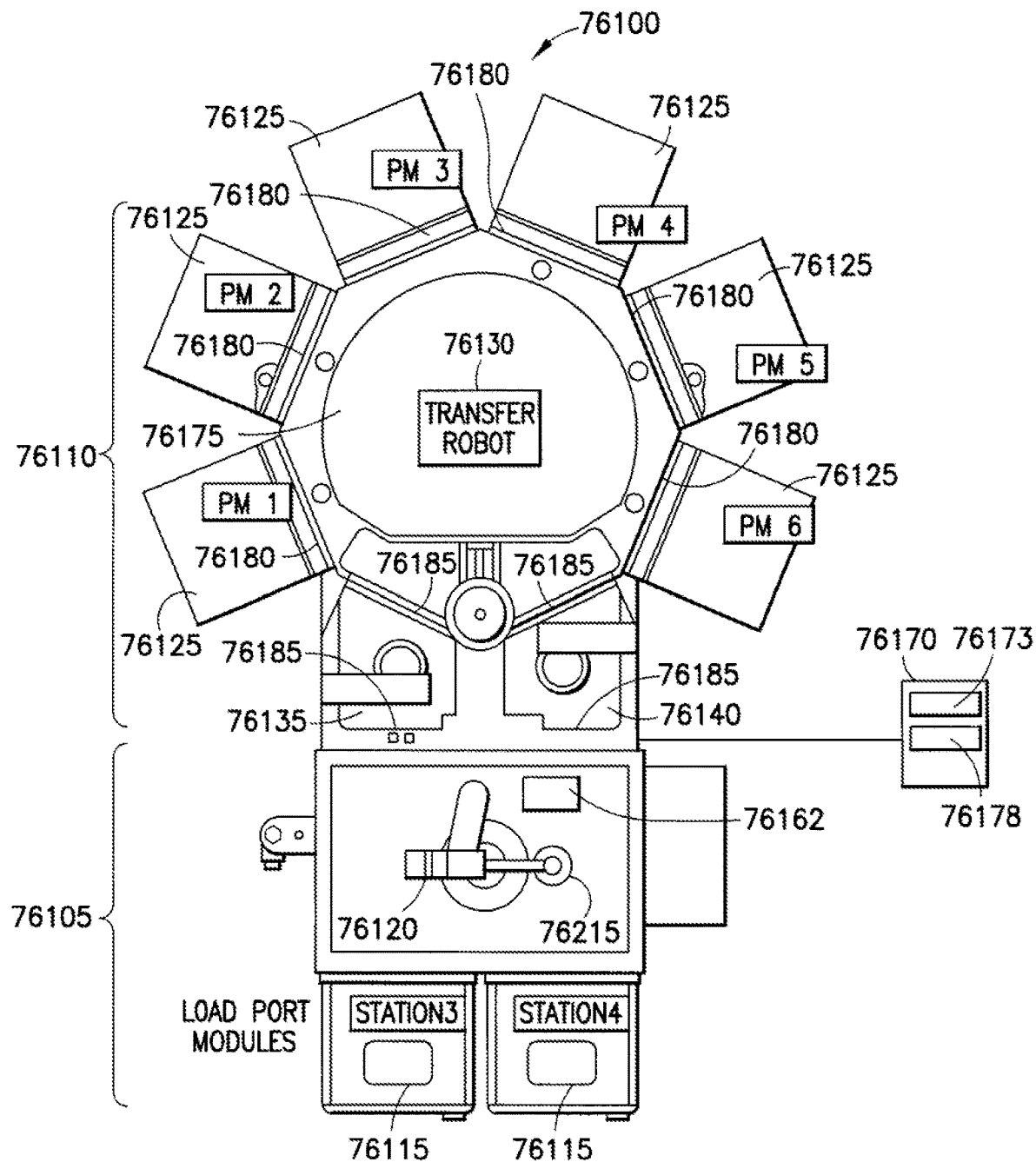
FIG. 7 illustrates a perspective view of a substrate processing apparatus in accordance with an aspect of the disclosed embodiment.

FIG. 7 illustrates a perspective view of a substrate processing apparatus 76100 incorporating aspects of the disclosed embodiment, and a substrate 76215 is illustrated. For purposes of the aspects of the disclosed embodiment described herein, substrate 76215 may be for example, a semiconductor wafer, such as a 200 mm, 300 mm or any other desired diameter substrate, any other type of substrate suitable for processing by substrate processing apparatus 76100, a blank substrate, or an article having characteristics similar to a substrate, such as certain dimensions or a particular mass. Substrate processing apparatus 76100 is a representative substrate processing tool, shown as having a general batch processing tool configuration. In other aspects, the substrate apparatus may be of any desired type such as sorter, stocker, metrology tool, etc. In this aspect, apparatus 76100 may generally have an atmospheric section 76105, for example forming a mini-environment and an adjoining atmospherically isolatable or sealed (e.g. sealed from an external atmosphere) section (e.g. atmospherically sealed section) 76110, which for example may be equipped to function as a vacuum chamber. In other aspects, the atmospherically sealed section 76110 may hold an inert gas (e.g. N2) or any other isolated atmosphere.

In one aspect of the disclosed embodiment, atmospheric section 76105 typically has one or more substrate holding cassettes 76115, and an atmospheric robot 76120. The atmospheric robot 76120 may be any suitable robot. For exemplary purposes only the atmospheric robot may be substantially similar to transfer robot 76130, 80530 described below. The atmospheric robot 76120 may be adapted to transport substrates to any location within atmospheric section 76105. For example, atmospheric robot 76120 may transport substrates among substrate holding cassettes 76115, load lock 76135, and load lock 76140. The atmospheric robot 76120 may also transport substrates 76215 to and from an aligner 76162 located within the atmospheric section 76105.

Atmospherically sealed section 76110 may have one or more processing modules PM1-PM6 (generally referred to herein as processing modules 76125), and a vacuum robot 76130. The processing modules 76125 may be of any type such as material deposition, etching, baking, polishing, ion implantation cleaning, etc. As may be realized the position of each processing module 76125, with respect to a desired reference frame, such as the robot reference frame, may be registered with controller 76170. In one aspect of the disclosed embodiment one or more of the process modules may also perform a processing operation on substrates within the substrate processing apparatus 76100 that is different than other processing operations performed by the other processing modules. The operation associate with each of the process modules 76125 may also be registered with the controller 76170. In other aspects the processing modules may perform the same processing operations. Atmospherically sealed section 76110 may also have one or more intermediate chambers, referred to as load locks 76135, 76140. The aspect shown in FIG. 7 has two load locks, but in other aspects the atmospherically sealed section 76110 may have any suitable number of load locks. Load locks 76135 and 76140 operate as interfaces, allowing substrates to pass between atmospheric section 76105 and atmospherically sealed section 76110 without violating the integrity of any vacuum or other atmosphere sealed within the atmospherically sealed section 76110.

Substrate processing apparatus 76100 generally includes a controller 76170 that controls the operation of substrate processing apparatus 76100. Controller 76170 has a processor 76173 and a memory 76178. The memory 76178 may include computer readable code for effecting the operation of the substrate processing apparatus 76100 and its components. For example, memory 76178 may further include processing parameters, such as temperature and/or pressure of processing modules, and other portions or stations of sections 76105, 76110 of the apparatus, temporal information of the substrate(s) 76215 being processed and metric information for the substrates, etc. In one aspect of the disclosed embodiment the controller 76170 may have a clustered architecture such as that described in U.S. patent application Ser. No. 11/76,178,615, entitled "Scalable Motion Control System" and filed on Jul. 11, 2005, the disclosure of which is incorporated by reference herein in its entirety. In other aspects, the controller may have any suitable control architecture.

Figure 8:
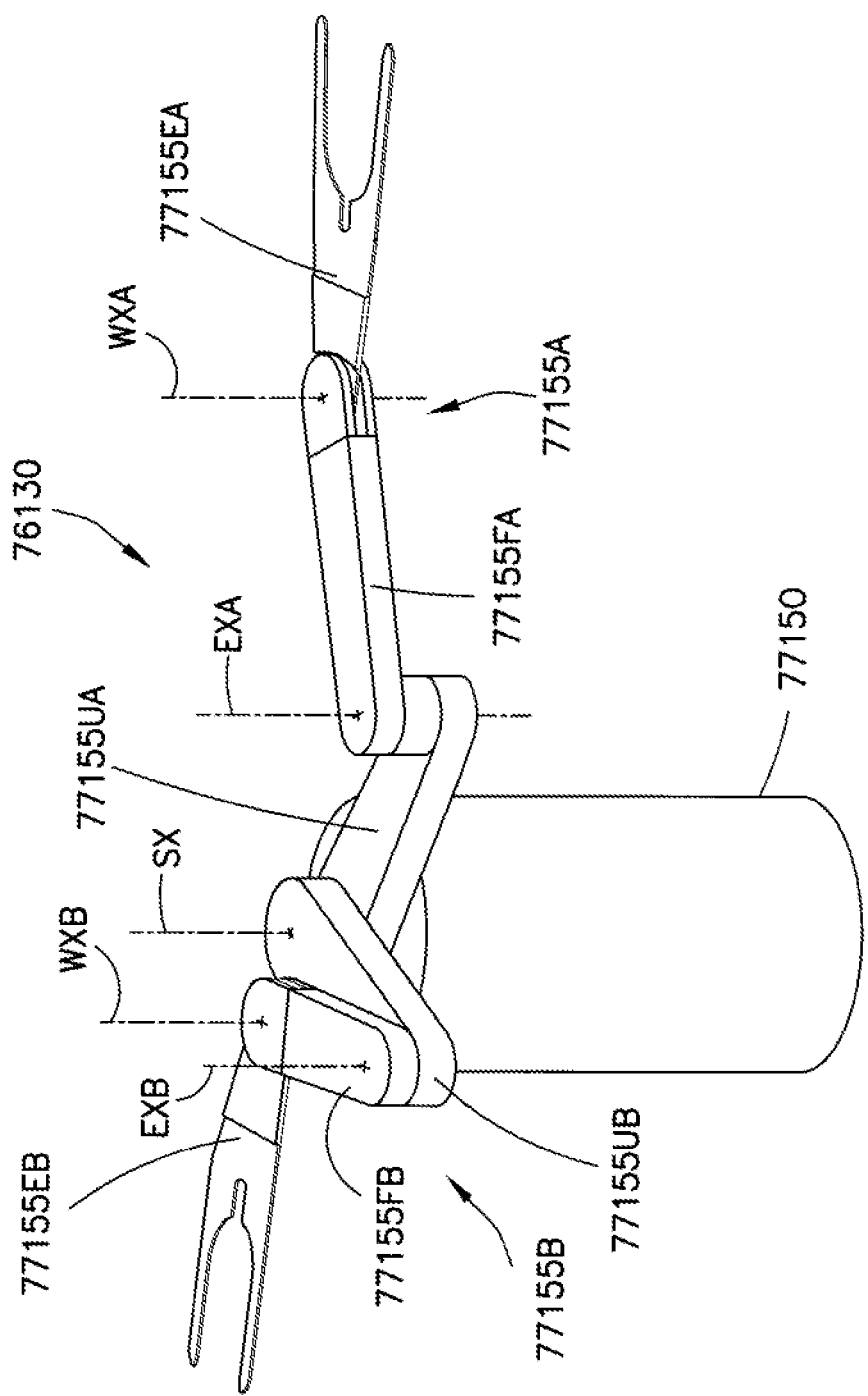
FIG. 8 is a substrate transport apparatus in accordance with an aspect of the disclosed embodiment.

Referring also to FIG. 8, in one aspect of the disclosed embodiment, the transfer robot 76130 (which may be substantially similar to atmospheric robot 76120) may include a drive section 77150 and one or more arms 77155A, 77155B. Drive section 77150 may receive commands from, for example, controller 76170 and, in response, direct radial, circumferential, elevational, compound, and other motions of arms 77155A, 77155B. The 77155A, 77155B arms may be mounted onto drive section 77150 in any suitable manner. Each of the arms 77155A, 77155B may include an upper arm section 77155UA, 77155UB rotatably mounted to the drive section at a shoulder joint axis SX (e.g. the shoulder axes of rotation of the arms are substantially coincident with each other), a forearm section 77155FA, 77155FB rotatably mounted to the upper arm section 77155UA, 77155UB at an elbow axis EXA, EXB and an end effector 77155EA, 77155EB rotatably mounted to the forearm section 77155FA, 77155FB at a wrist axis WXA, WXB. The end effector may be configured in any suitable manner for holding a substrate 76215. In one aspect, the end effectors 77155EA, 77155EB may be edge gripping, vacuum gripping, active gripping or passive gripping end effectors. The end effectors may also be configured to hold multiple substrates in a stacked or side by side configuration for the batch transfer of substrates. It is noted that the upper arm 77155UA, 77155UB and forearm 77155FA, 77155FB of the respective arms 77155A, 77155B may be substantially equal in length or unequal in length. For example, the upper arms 77155UA, 77155UB may be longer than the forearms 77155FA, 77155FB or vice versa. One example of unequal length arms is described in U.S. patent application Ser. No. 11/179,762 entitled "Unequal Link Scara Arm" and filed on Jul. 11, 2005, the disclosure of which is incorporated by reference herein in its entirety.

In an aspect of the disclosed embodiment, the transfer robot 76130 may be mounted in central chamber 76175 of atmospherically sealed section 76110 (See FIG. 7). Controller 76170 may operate to cycle openings 76180, 76185 and coordinate the operation of transfer robot 76130 for transporting substrates among processing modules 76125, load lock 76135, and load lock 76140. It should be understood that while the transfer robots 76120, 76130 are illustrated and described as having a SCARA-type robot arm, in other aspects the transfer robots may include any suitable arm configurations such as an articulating arm robot, a frog leg type apparatus, or a bi-symmetric transport apparatus.

Figure 9:
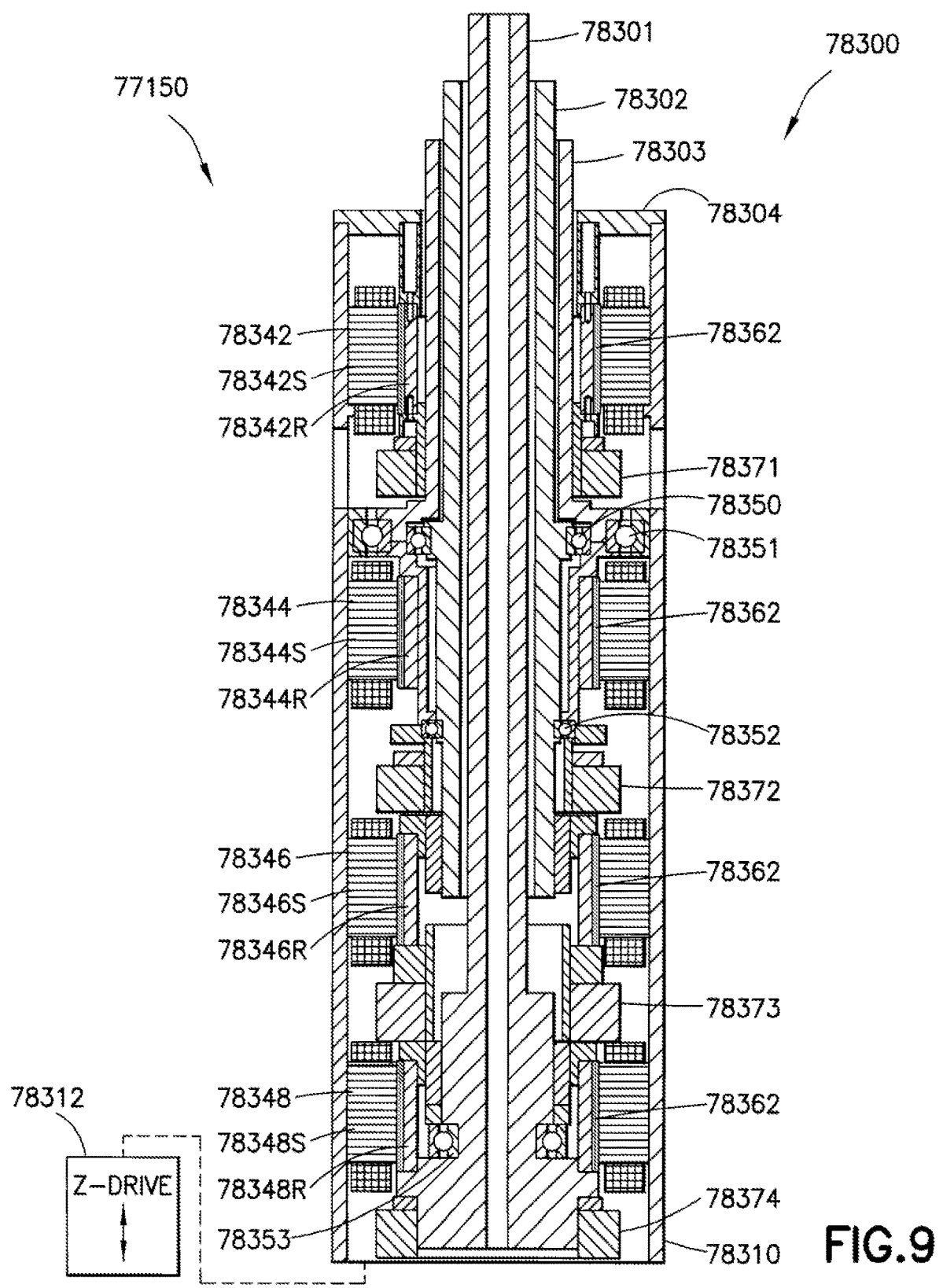
FIGS. 9 and 9A schematically illustrate a drive section of the substrate transport apparatus of FIG. 1 in accordance with an aspect of the disclosed embodiment.

Referring now to FIG. 9, an exemplary drive section 77150 is shown. In one aspect of the disclosed embodiment the drive may have a coaxial drive arrangement, while in other aspects the drive section may have any suitable drive arrangement. Suitable examples of drive section arrangements are described in U.S. Pat. Nos. 6,485,250, 5,720,590, 5,899,658 and 5,813,823 the disclosures of which are incorporated by reference herein in their entirety. Other suitable examples of drive system arrangements include those described in U.S. patent application Ser. No. 12/163,996 entitled "Robot Drive with Magnetic Spindle Bearings" and filed on Jun. 27, 2008, the disclosure of which is incorporated herein by reference in its entirety. In this aspect, the drive section 77150 includes a housing 78310 for at least partially housing a quad-coaxial drive shaft assembly 78300 having four drive shafts 78301-78304 and four motors 78342, 78344, 78346, 78348 (e.g. a 4-degree of freedom drive section). In other aspects the drive section 77150 may have any suitable number of drive shafts and motors. The first motor 78342 includes a stator 78342S and a rotor 78342R connected to the outer shaft 78304. The second motor 78344 includes a stator 78344S and a rotor 78344R connected to shaft 78303. The third motor includes a stator 78346 includes a stator 78346S and a rotor 78346R connected to shaft 78302. The fourth motor 78348 includes a stator 78348S and a rotor 78348R connected to the fourth or inner shaft 78301. The four stators 78342S, 78344S, 78346S, 78348S are stationarily attached to the housing 78310 at different vertical heights or locations within the housing. Each stator 78342S, 78344S, 78346S, 78348S generally comprises an electromagnetic coil. Each of the rotors 78342R, 78344R, 78346R, 78348R generally comprises permanent magnets, but may alternatively comprise a magnetic induction rotor that does not have permanent magnets. Where the transfer robot 76130 is used in a sealed environment, such as for non-limiting exemplary purposes only, a vacuum environment, sleeves 78362 may be located between the rotors 78342R, 78344R, 78346R, 3418R and the stators 78342S, 78344S, 78346S, 78348S so that the coaxial drive shaft assembly 78300 is located in the sealed environment and the stators are located outside the sealed environment. It should be realized that the sleeves 78362 need not be provided if the transfer robot 76130 is only intended for use in an atmospheric environment, such as within the atmospheric section 76105 of the substrate processing apparatus 76100 (FIG. 7).

The fourth or inner shaft 78301 extends from the bottom or fourth stator 78348S and includes the rotor 78348R, which is substantially aligned with the stator 78348S. The shaft 78302 extends from the third stator 78346S and includes rotor 78346R, which is substantially aligned with the stator 78346S. The shaft 78303 extends from the second stator 78344S and includes the rotor 78344R, which is substantially aligned with the stator 78344S. The shaft 78304 extends from the top or first stator 78342S and includes rotor 78342R, which is substantially aligned with the stator 78342S. Various bearings 78350-78353 are provided about the shafts 78301-78304 and the housing 78310 to allow each shaft 78301-78304 to be independently rotatable relative to each other and the housing 78310. In this aspect of the disclosed embodiment each shaft is provided with a position sensor 78371-78374. The position sensors 78371-78374 may be used to provide a signal to any suitable controller, such as controller 76170, regarding the rotational position of a respective shaft 78301-78304 relative to each other and/or relative to the housing 78310. The sensors 78371-78374 may be any suitable sensors, such as for non-limiting exemplary purposes, optical or induction sensors.

Referring also to FIG. 8, as described above the transfer robot 76130 includes two arms 77155A, 77155B. In this aspect of the disclosed embodiment the upper arm 77155UA of arm 77155A is fixedly attached to the outer shaft 78304 such that the upper arm 77155UA rotates with the shaft 78304 on a center axis of rotation (e.g. shoulder axis SX). A pulley 78380 is fixedly attached to shaft 78303. The upper arm 77155UA includes a post 78381 and a pulley 78382 rotatably mounted to the post 78381. The post 78381 is stationarily mounted to an inner surface of the upper arm 77155UA. A first set of transmission members 78390 extend between the pulley 78380 and pulley 78382. It should be realized that any suitable type of transmission members may be used to couple the pulleys 78380, 78382, such as for example, belts, bands or chains. It should also be realized that while two transmission members are shown coupling the pulleys 78380, 78382 any suitable number of transmission members may be used to couple the pulleys 78380, 78382 (e.g. more or less than two). A shaft 78382S is fixedly coupled to the pulley 78382 so that the shaft 78382S rotates with the pulley about elbow axis EXA. The shaft 78382S may be rotatably supported on the post 78381 in any suitable manner. The forearm 77155FA is fixedly mounted to the shaft 78382S so that the forearm 77155FA rotates with the shaft 78382S about elbow axis EXA. The forearm 77155FA includes a pulley 78383 rotatably supported on the top end of the post 78381. The forearm 77155FA also includes a post 78385 and a pulley 78384 rotatably mounted to the post 78385. A second set of transmission members 78391 (substantially similar to transmission members 78390) extends between and couples the pulleys 78383, 78384. The end effector 77155EA is fixedly mounted to the pulley 78384 so that the pulley 78384 and end effector 77155EA rotate about wrist axis WXA. As may be realized the upper arm 77155UA and forearm 77155FA are independently driven (e.g. rotated) by a respective one of the shafts 78304, 78303 to allow independent rotation T1 and extension R1 of the arm 77155A while the rotation of the end effector 77155EA is slaved so that while the arm is extended and retracted along R1 a longitudinal axis of the end effector remains substantially aligned with the axis of extension and retraction R1. In other aspects the drive section 77150 may include additional motors and drive shafts so that the end effector 77155EA may also be independently rotated about the wrist axis WXA.

The upper arm 77155UB of arm 77155B is fixedly attached to the inner shaft 78301 such that the upper arm 77155UB rotates with the shaft 78301 on a center axis of rotation (e.g. shoulder axis SX). A pulley 78386 is fixedly attached to shaft 78302. The upper arm 77155UB includes a post 78388 and a pulley 78387 rotatably mounted to the post 78388. The post 78388 is stationarily mounted to an inner surface of the upper arm 77155UB. A first set of transmission members 78392 (substantially similar to transmission members 78390) extend between the pulley 78386 and pulley 78387. A shaft 78387S is fixedly coupled to the pulley 78387 so that the shaft 78387S rotates with the pulley about elbow axis EXB. The shaft 78387S may be rotatably supported on the post 78388 in any suitable manner. The forearm 77155FB is fixedly mounted to the shaft 78387S so that the forearm 77155FB rotates with the shaft 78387S about elbow axis EXB. The forearm 77155FB includes a pulley 78389 rotatably supported on the top end of the post 78388. The forearm 77155FB also includes a post 78398 and a pulley 78399 rotatably mounted to the post 78398. A second set of transmission members 78393 (substantially similar to transmission members 78390) extends between and couples the pulleys 78389, 78399. The end effector 77155EB is fixedly mounted to the pulley 78399 so that the pulley 78399 and end effector 77155EB rotate about wrist axis WXB. As may be realized the upper arm 77155UB and forearm 77155FB are independently driven (e.g. rotated) by a respective one of the shafts 78302, 78301 to allow independent rotation T2 and extension R2 of the arm 77155B while the rotation of the end effector 77155EB is slaved so that while the arm is extended and retracted along R2 a longitudinal axis of the end effector remains substantially aligned with the axis of extension and retraction R2. In other aspects the drive section 77150 may include additional motors and drive shafts so that the end effector 77155EB may also be independently rotated about the wrist axis WXB.

In this aspect of the disclosed embodiment the shafts 78382S, 78387S are suitably sized so that the transport planes TP of the end effectors 77155EA, 77155EB are substantially coplanar. The substantially coplanar transport planes of the end effectors 77155EA, 77155EB may allow transport of substrates to and from substrate holding stations, such as the process modules 76125, load locks 76135, 76140 and cassettes 76115 substantially without any Z or vertical travel of the arms 77155A, 77155B. In other aspects the drive section 77150 may include at least one Z travel motor to allow Z movement of the arms. In still other aspects the transport planes TP may be proximate one another (e.g. stacked). It is noted that in some aspects of the disclosed embodiment the arm configurations described herein may be positioned in a manner such that one arm constrains the motion of another of the arms within a range of motion substantially preventing, for example, the 360 degree rotation of one arm relative to the other arm. Accordingly, it may be considered that within the constrained configuration (i.e. where substantially infinite rotation of each arm is blocked by the other arm) each arm has a corresponding angular field of motion defined and delimited by the other arm (e.g. referring to FIG. 10A arm 77155A is movable within range 77999 with arm 77155B remaining stationary and arm 77155B is movable within range 77998 with arm 77155A remaining stationary). As may be realized, as one or more of the arms 77155A, 77155B rotate the corresponding ranges 77998, 77999 also rotate (e.g. the ranges of motion 77998, 77999 may not be stationary such that the ranges rotate or move with the rotation of the respective arms—e.g. rotation of arm 77155A changes the range of rotation of arm 77155B and vice versa). As such, the paths of extension/retraction of each end effector within each field of motion/rotation may intersect one another (where the transport planes are substantially coplanar) at, for example, the shoulder axis of the arms (which may be common shoulder axis SX) or where the end effectors are not coplanar (and the arm links of one arm may or may not interfere with the arm links of the other arm) the paths of extension/retraction of each end effector may cross one above the other.

Figure 9A:
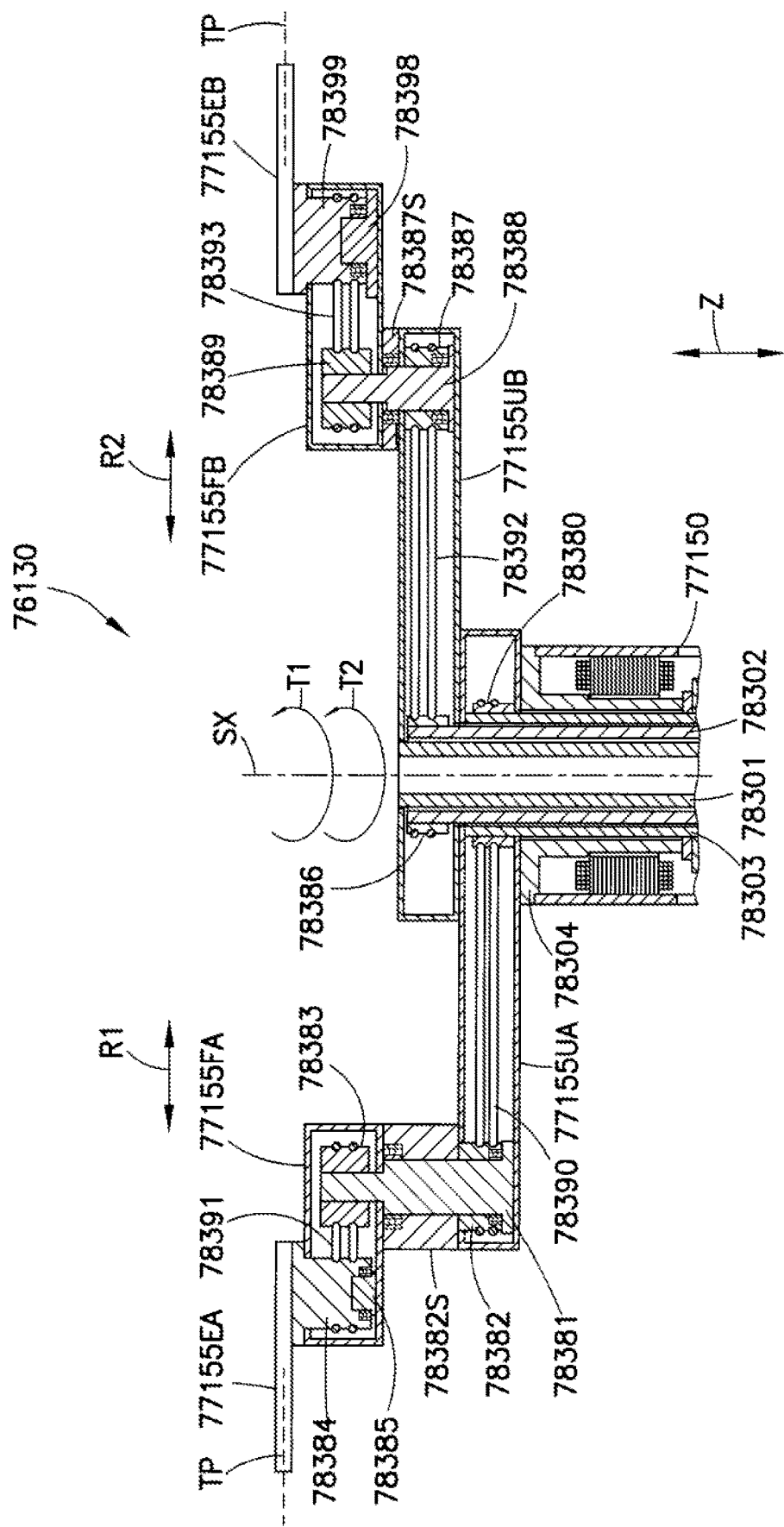

Referring to FIGS. 10A-10H an operation of arm 77155A of the transfer robot 76130 will be described. It should be understood that the operation of arm 77155B is substantially similar to that described below with respect to arm 77155A. In this aspect, the transfer robot 76130 is shown located within a transfer chamber 77400. The transfer chamber 77400 may be substantially similar to central chamber 76175 described above. The transfer chamber includes openings or gate valves 76180 to which process modules 76125 (PM1-PM4) are attached. As described above, the transfer planes TP (e.g. the end effectors as well as the forearms and wrists) (FIG. 9A) of the arms 77155A, 77155B are coplanar so that the end effectors 77155EA, 77155EB of the arms 77155A, 77155B cannot access the same process module without rotation of both arms 77155A, 77155B of the transfer robot about the shoulder axis SX. As may be realized, each of the arms 77155A, 77155B are capable of accessing all the process modules (and load locks—not shown) attached to the transfer chamber 77400. For example, with suitable rotation of one or more arms each arm is capable of accessing adjacent process modules, alternately spaced process modules and process modules located approximately 180 degrees apart. It is noted that, in the aspects of the disclosed embodiments described herein, while one arm may rotate approximately 180 degrees relative to the other arm (e.g. when the other arm remains stationary and the end effectors are substantially coplanar or in substantially proximate substrate transport planes such that rotation of one arm interferes with the rotation of the other arm) that the entire arm assembly (e.g. all of the arms as a unit) are capable of at least about 360 degree rotation about the shoulder axis when the arms are rotated together about the shoulder axis as a unit.

Figure 10A:
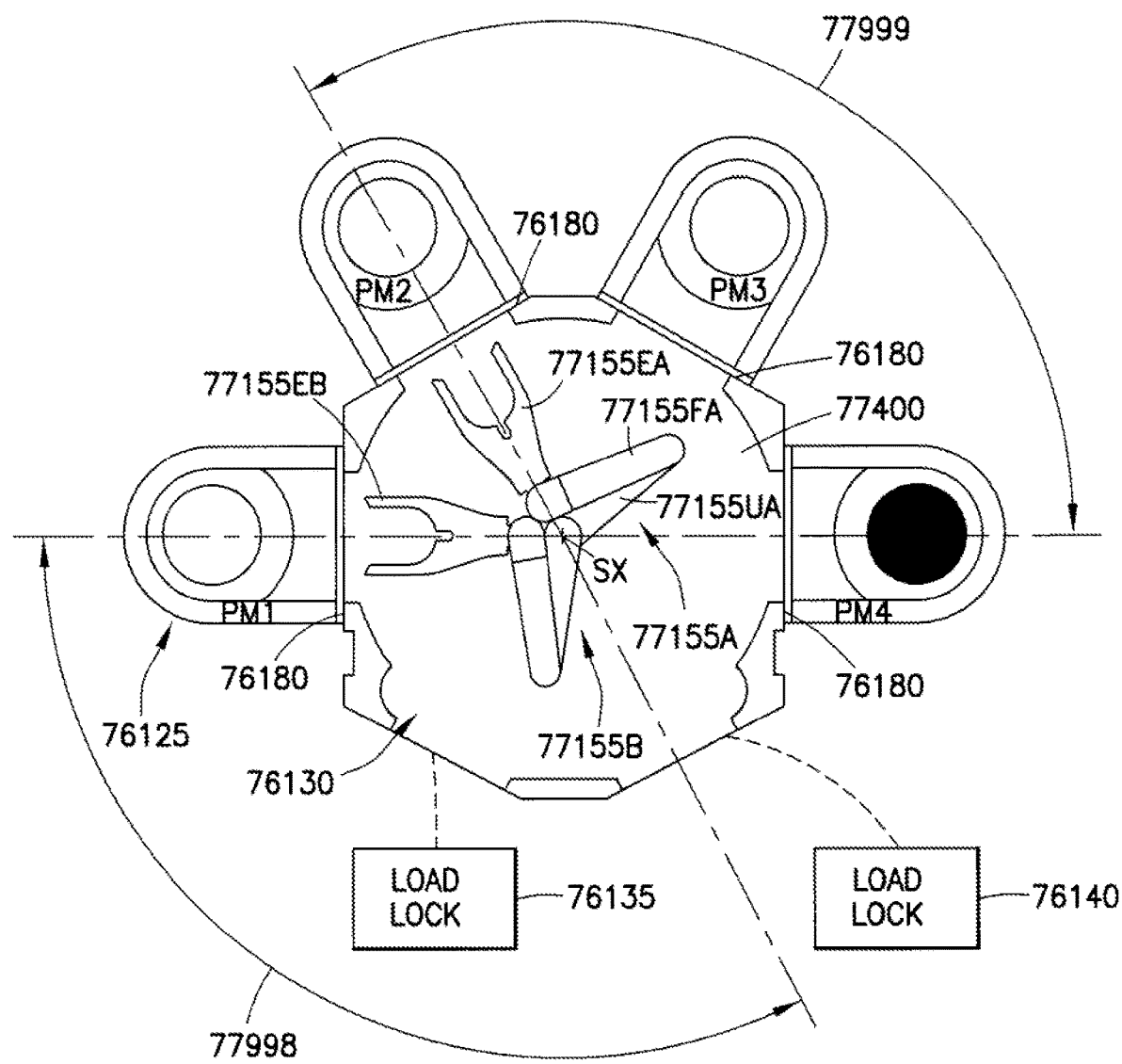
FIGS. 10A-10H illustrate an exemplary operation of the substrate transport apparatus of FIG. 1 in accordance with an aspect of the disclosed embodiment.
Figure 10B:
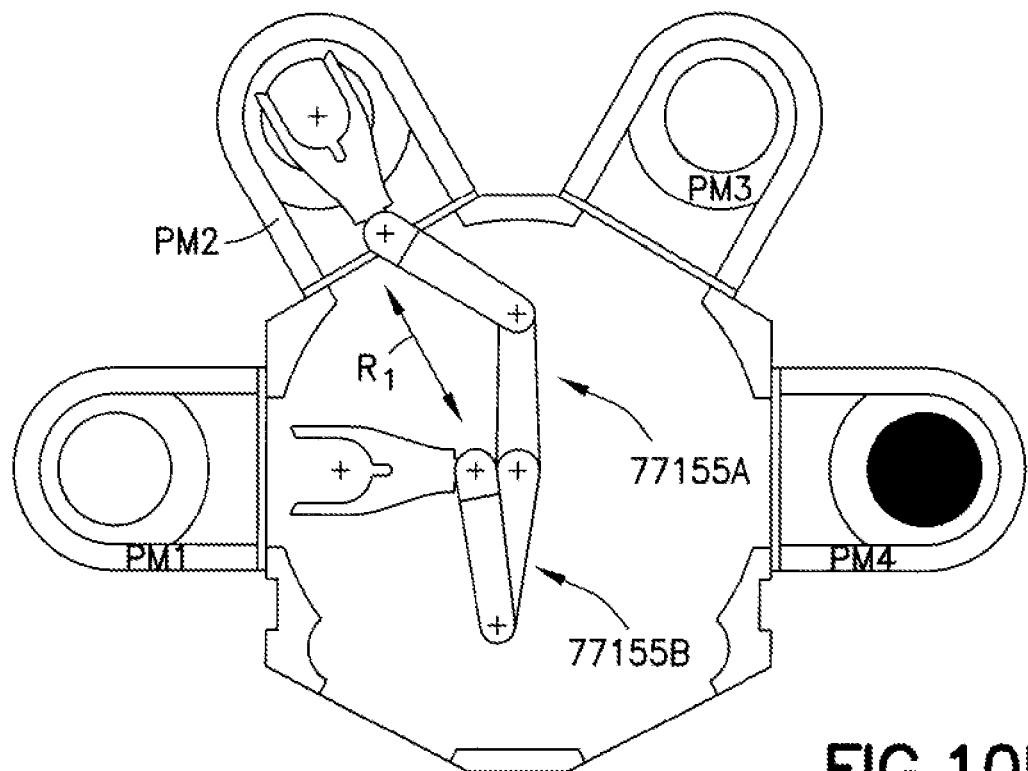

As can be seen in FIG. 10A the arms 77155A, 77155B are arranged so that the end effectors 77155EA, 77155EB are aligned with adjacent process modules PM1, PM2. To extend arm 77155A so that end effector 77155EA enters the process module PM2 the motor 78342 rotates shaft 78304 relative to shaft 78303 while shaft 78303 is kept substantially stationary. However, shaft 78303 may be rotated slightly during extension and retraction to speed up the transfer process with the start or finish of rotation of the entire movable arm assembly 77155A. With the shaft 78303 (and pulley 78380) kept stationary and the upper arm 77155UA moved, the pulley 78382 is rotated by transmission members 78390. This, in turn, rotates the forearm 77155FA about axis EXA. Because the pulley 78383 is stationarily attached to post 78381, and because the post 78381 is stationarily attached to the forearm 77155FA, the pulley 78384 is rotated by the transmission members 78391 relative to the forearm 77155FA. The pulleys 78380, 78382, 78384 may be sized relative to each other to allow end effector 77155EA to be moved straight radially in and out along extension/retraction axis R1 as can be seen in FIG.

10B. As may be realized extension and retraction of arm 77155B may occur in a substantially similar manner where motor 78348 rotates shaft 78301 relative to shaft 78302.

Figure 10C:
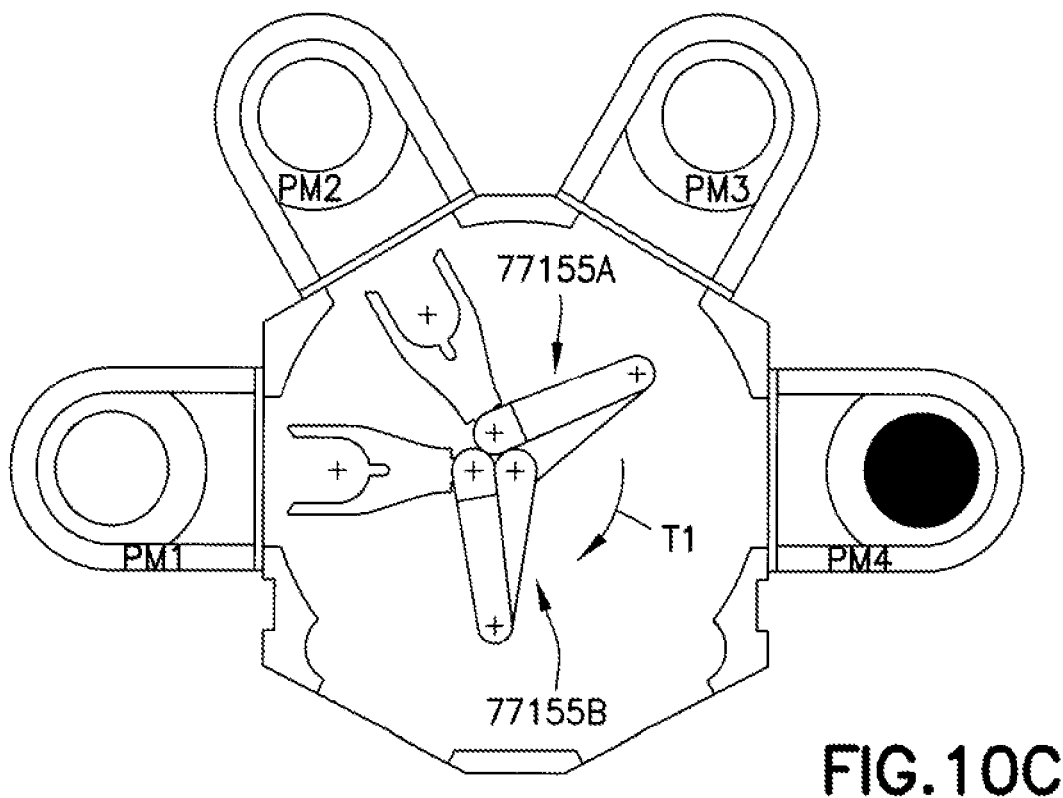
Figure 10D:
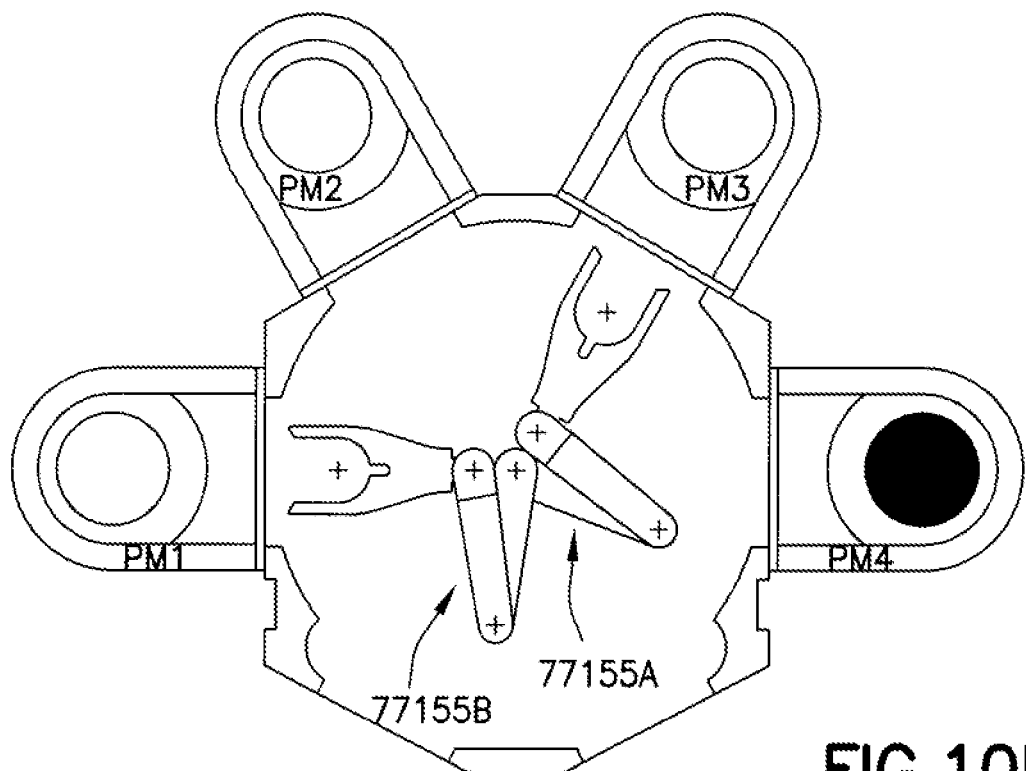
Figure 10E:
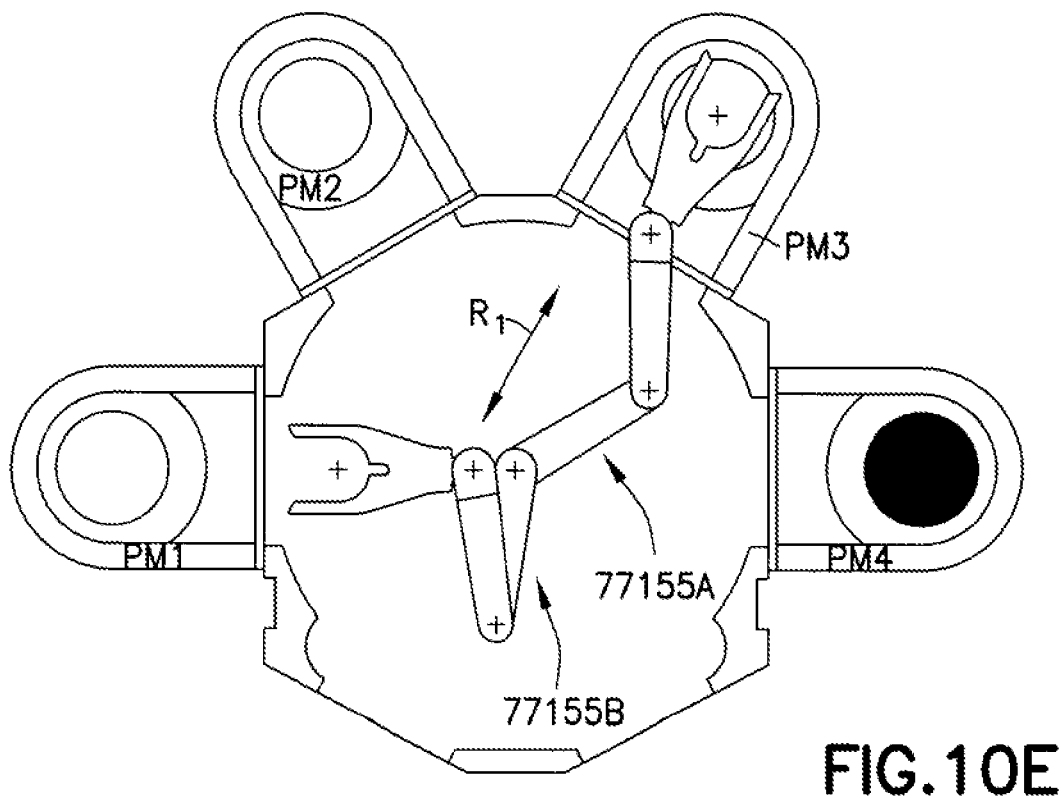
Figure 10F:
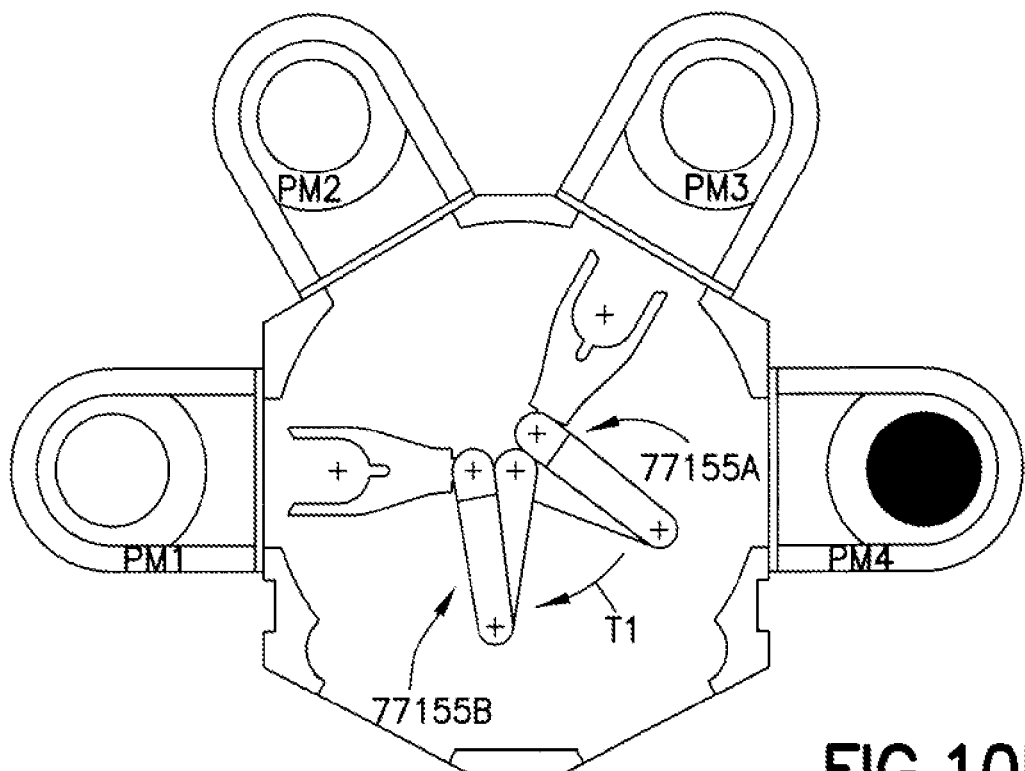
Figure 10G:
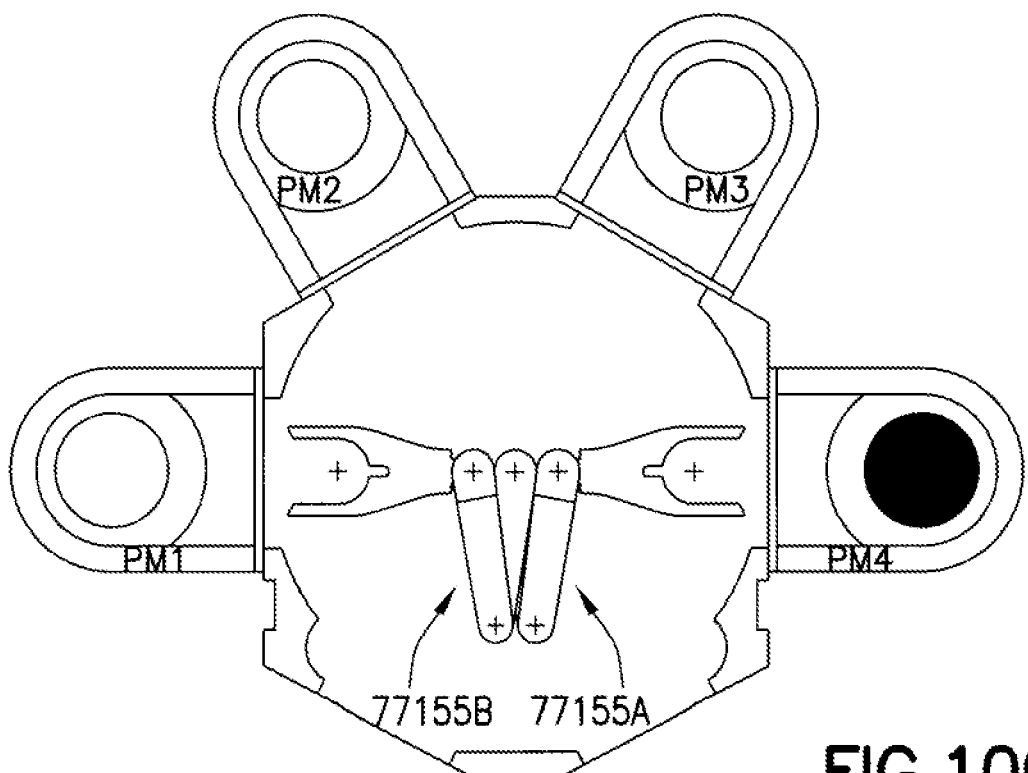
Figure 10H:
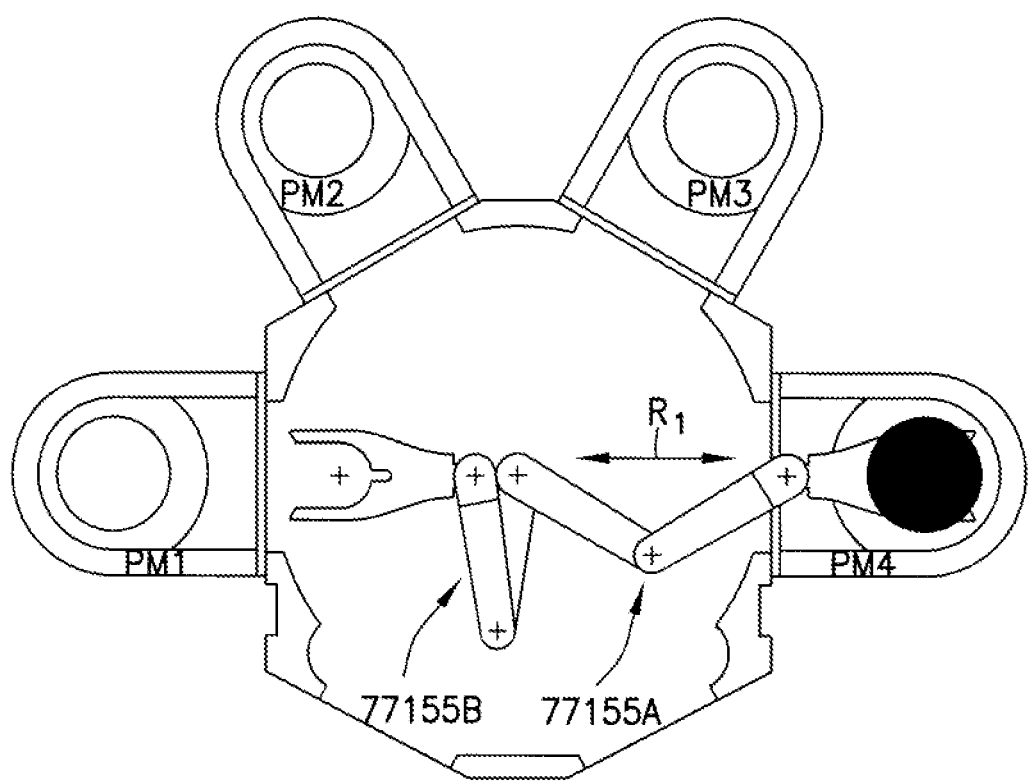

Rotation of the arm 77155A (T1 rotation) so that the arm is moved from process module PM2 to process module PM3 occurs through operation of both motor 78342 and 78344 so that the shafts 78304, 78303 are rotated in the same direction substantially simultaneously at substantially the same speed as shown in FIG. 10C. Once the arm 77155A is positioned so that end effector 77155EA is aligned with process module PM3 the arm may be extended and retracted in a manner substantially similar to that described above as shown in FIG. 10E. Likewise, to rotate the arm 77155A (T1 rotation) so that the arm is moved from process module PM3 to process module PM4 both motor 78342 and 78344 are operated so that the shafts 78304, 78303 are rotated in the same direction substantially simultaneously at substantially the same speed as shown in FIG. 10F. Once the arm 77155A is positioned so that end effector 77155EA is aligned with process module PM4 the arm may be extended and retracted in a manner substantially similar to that described above as shown in FIG. 10H. As may be realized, the rotation of the arm 77155A in, for example, a clockwise direction as shown in FIGS. 10A-10H is substantially limited to a point of rotation where the end effectors are substantially 180 degrees apart due to, for example, the transfer planes TP, the forearms 77155FA, 77155FB and the wrists being located in the same plane. As such the transport paths R1, R2 of the transport arms are angled relative to one another where the angle ranges from adjacent substrate holding locations to substrate holding locations that are approximately 180 degrees apart.

Figure 11A:
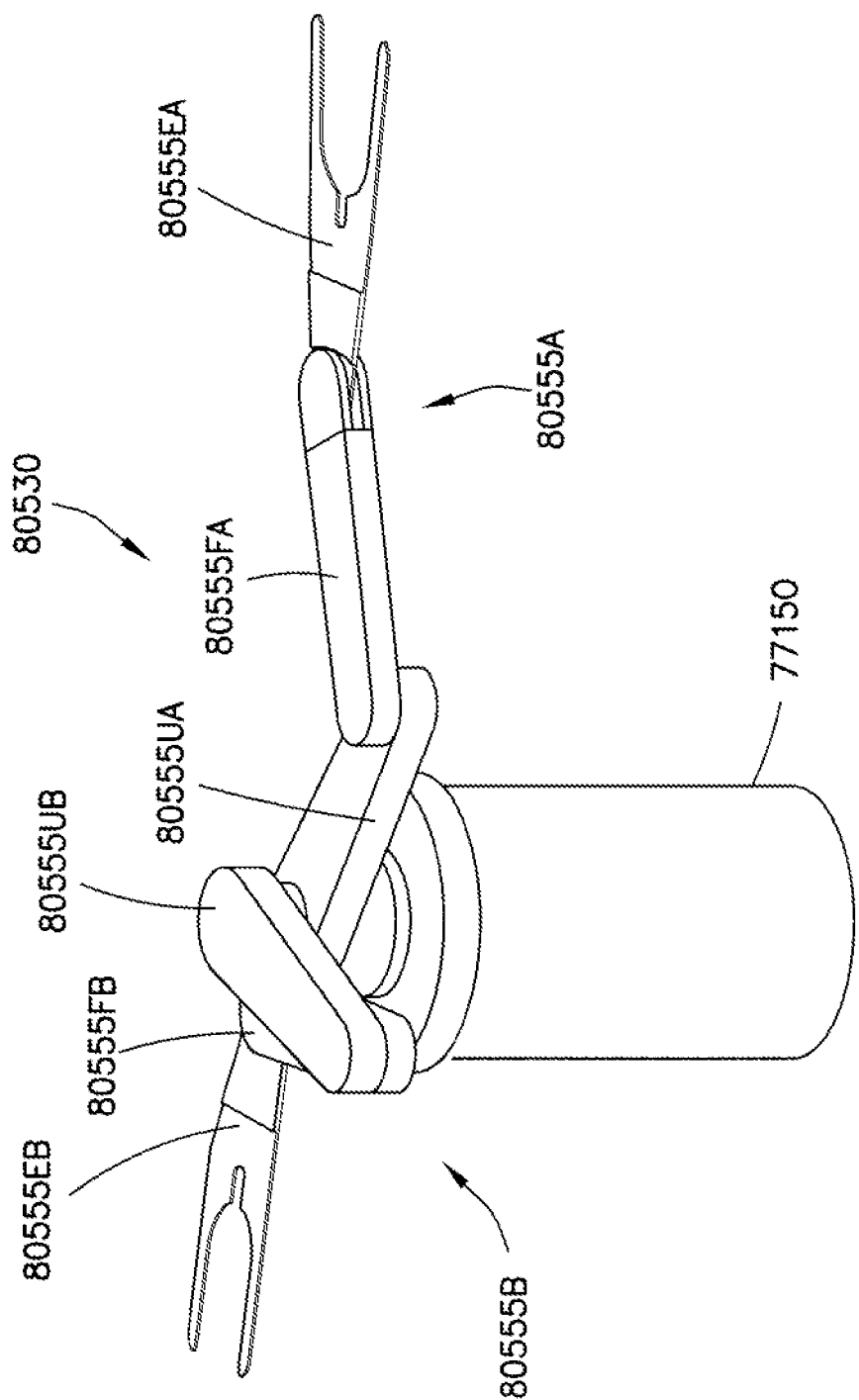
FIGS. 11A and 11B illustrate another substrate transport apparatus in accordance with an aspect of the disclosed embodiment.
Figure 11B:
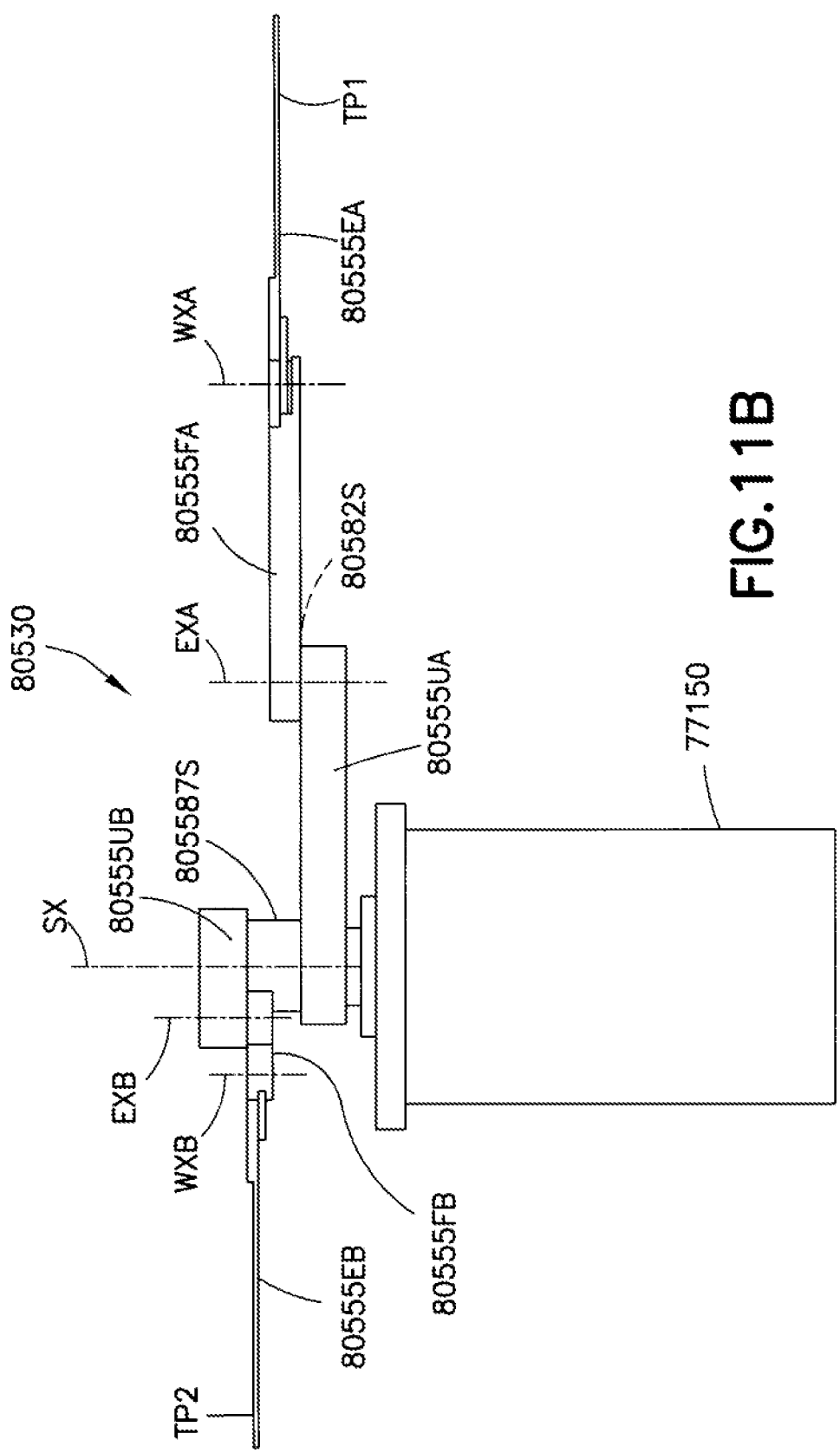

Referring now to FIGS. 11A and 11B another transfer robot 80530 is shown in accordance with an aspect of the disclosed embodiment. The transfer robot 80530 may be substantially similar to transfer robot 76130 described above except where otherwise noted. In this aspect, the transfer robot 80530 includes a drive section 77150 which may include at least one Z axis drive 312 (FIG. 9). The Z axis drive 312 may be connected to, for example, the housing 78310 of the drive 77150 in any suitable manner. The Z axis drive 312 may be configured to drive the housing 78310, including any arms 555A, 555B connected thereto, in the Z-direction so that the end effectors 80555EA, 80555EB of each of the arms 555A, 555B can be moved to different transfer planes. In another aspect one or more revolute joints of the robot may include a Z-axis drive to, for example, move the end effector(s) of each arm in the Z-direction independently of each other.

In this example, the transfer robot 80530 includes two transfer arms 80555A, 80555B. The transfer arm 80555A may be substantially similar to transfer arm 77155A described above such that like features have like reference numbers (e.g. upper arm 80555UA, forearm 80555FA and end effector 80555EA). The transfer arm 80555A may be connected to shafts 78304, 78303 of the drive section (FIG. 9) in a manner substantially similar to that described above. The transfer arm 80555B may also be substantially similar to transfer arm 77155B described above such that like features have like reference numbers (e.g. upper arm 80555UB, forearm 80555FB and end effector 80555EB). The transfer arm 80555B may be connected to shafts 78302, 78301 of the drive section (FIG. 9) in a manner substantially similar to that described above. In this aspect, however, the shafts 80582S, 80587S (which correspond to shafts 78382S, 78387S in FIG. 9) are sized so that the arm 80555B is able to rotate substantially 360 degrees infinitely and uninterrupted independent of the rotation of arm 80555A and vice versa. In addition, the forearm 80555FB of arm 80555FB may be mounted to an underside of the upper arm 80555UB (whereas the forearm 77155FB is mounted to an upper side of the upper arm 77155UB in FIG. 8—e.g. vertically opposed forearms) so that the transfer plane TP2 of end effector 80555EB is near (e.g. proximate), but not coplanar, with the transfer plane TP1 of end effector 80555EA to substantially minimize the amount of Z movement needed to transfer substrates using the different arms 80555A, 80555B. This substantially non-coplanar arrangement allows for independent operation of each arm where the extension and retraction R1, R2 of the arms can be angled relative to one another as well as for the fast swap of substrate at a single substrate holding location.

In other aspects, still referring to FIGS. 11A and 11B, the shafts 80582S, 80587S (which correspond to shafts 78382S, 78387S in FIG. 9) may be sized so that the forearm 80555FB of arm 80555FB may be mounted to an underside of the upper arm 80555UB (whereas the forearm 77155FB is mounted to an upper side of the upper arm 77155UB in FIG. 8—e.g. vertically opposed forearms) so that the transfer plane TP2 of end effector 80555EB is substantially coplanar with the transfer plane TP1 of end effector 80555EA. In this aspect, where the transfer planes are substantially coplanar (or in substantial proximity to one another as described herein) an axis of extension and retraction of, e.g. arm 80555A is constrained with respect to an axis of extension and retraction of arm 80555B and vice versa (e.g. the axes of extension and retraction are angled relative to one another where the arm links of one arm may interfere with the arm links of the other arm such that the arms may be not capable of substantially simultaneously transferring substrates to the same holding station without rotating the arms as a unit about the theta θ or shoulder SX axis).

As may be realized, the exemplary transfer robots 76130, 80530 described herein allow for sequential processing of substrates where one or more of the processing modules 76125 performs a separate processing operation on the substrates. For example, referring to FIG. 10A, a substrate may be placed in process module PM1 using one of the arms 77155A, 77155B. After processing is finished in process module PM1, arm 77155A may remove the substrate from process module PM1 and place it in process module PM2. Substantially simultaneously with the transfer of the substrate from process module PM1 to process module PM2, arm 77155B may transfer another substrate from load lock 76135 to process module PM1. Such an arrangement may provide for a substantially continuous flow of substrates from, for example, load lock 76135 through process modules PM1-PM4 to load lock 76140.

FIG. 12 illustrates schematically an exemplary extension of an arm of the transfer robot 76130, 80530 into a process module. The arm may extend into the process module any suitable horizontal distance and at any suitable vertical location. It is noted that the robot arm configuration of the aspects of the disclosed embodiment having the end effectors of the arms on a common transfer plane or along substantially proximate transfer planes as described herein allows for the stack height of the arms to be minimized such that the internal volume of the transfer chamber is also minimized. Further, having the end effectors of the arms on a common transfer plane or on substantially proximate transfer planes allows for a minimized height of the slot valve opening (e.g. the opening in the transport chamber through which substrates are transferred to and from the transport chamber).

Figure 14A:
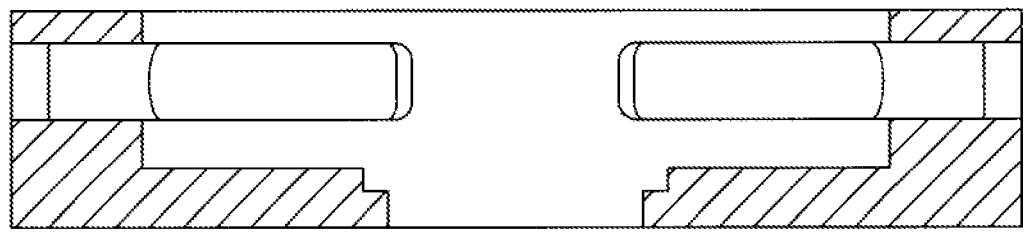
Figure 14B:
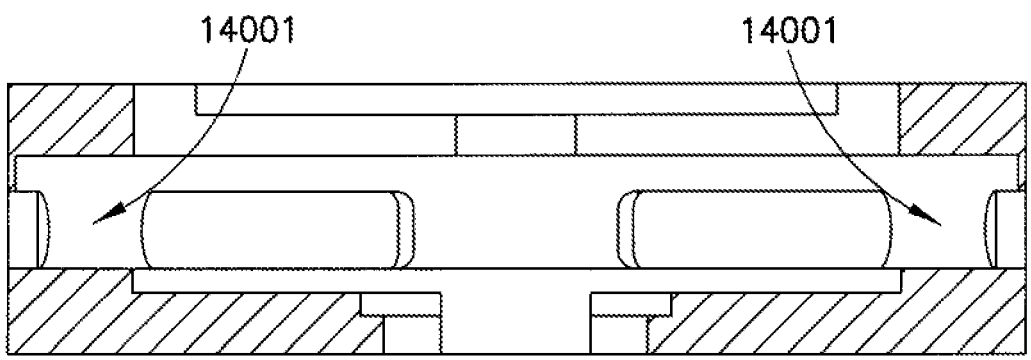
Figure 15:
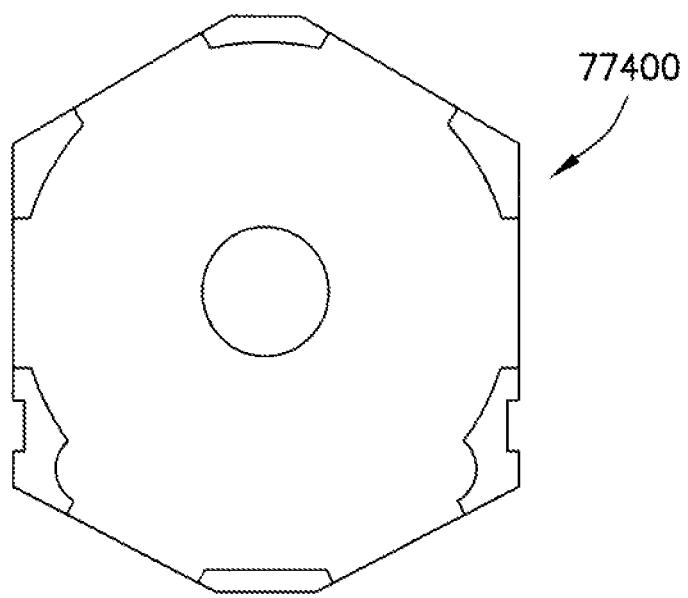

FIGS. 13 and 15 are exemplary top schematic illustrations of a transfer chamber, such as transfer chamber 77400. FIGS. 14A and 14B are schematic side views of the transfer chamber 77400 where the interior height of the transfer chamber is increased when the transfer robot includes a Z drive (e.g. with lift and with substantially no lift). As can be seen in FIGS. 14A and 14B the vertical location of the openings in the transport chamber may be positioned in any suitable locations such as more toward a bottom of the chamber when the chamber is configured to allow for Z travel of the robot. It is noted that having the end effectors on a substantially common transport plane or on substantially proximate transport planes the slot valve openings of the transport chamber may remain substantially the same size as when the transfer robot does not include a Z axis drive. As can be seen in FIG. 14B an area 14001 of the transport chamber adjacent the slot valve is increased in height to allow for, e.g., vertical movement of the arm links, such as the forearm, next to the opening while maintaining the vertical movement of the end effector within the slot valve height for a robot substantially without Z axis movement. In other aspects the transfer chamber may have any suitable configuration.

Figure 16A:
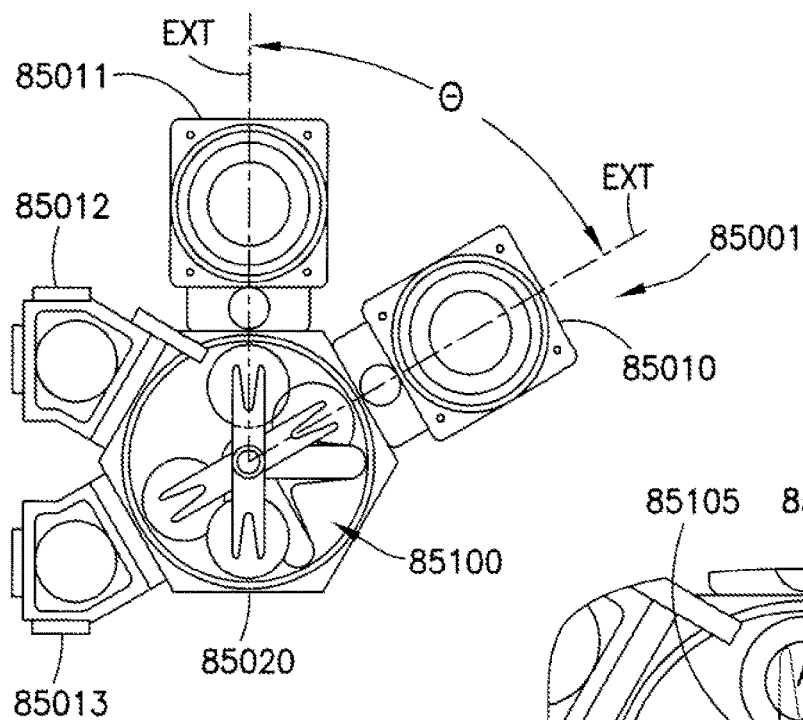
FIGS. 16A-16C are schematic illustrations of a substrate transfer apparatus in accordance with an aspect of the disclosed embodiment.
Figure 16B:
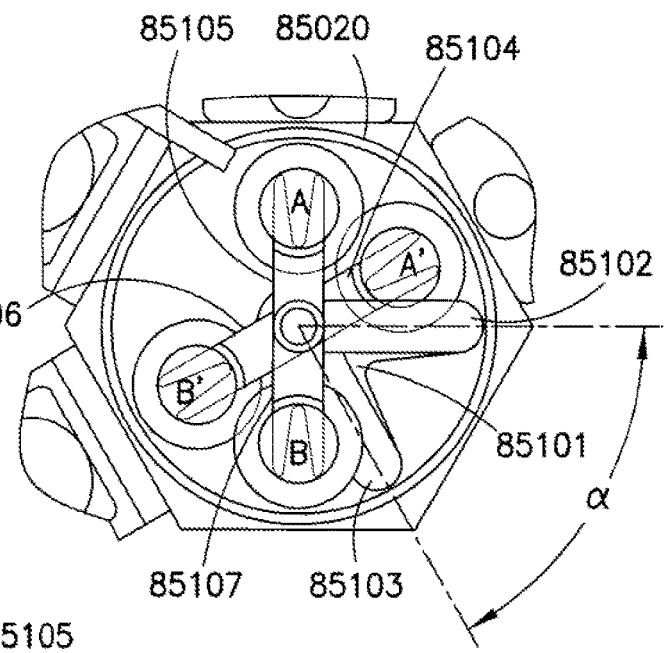
Figure 16C:
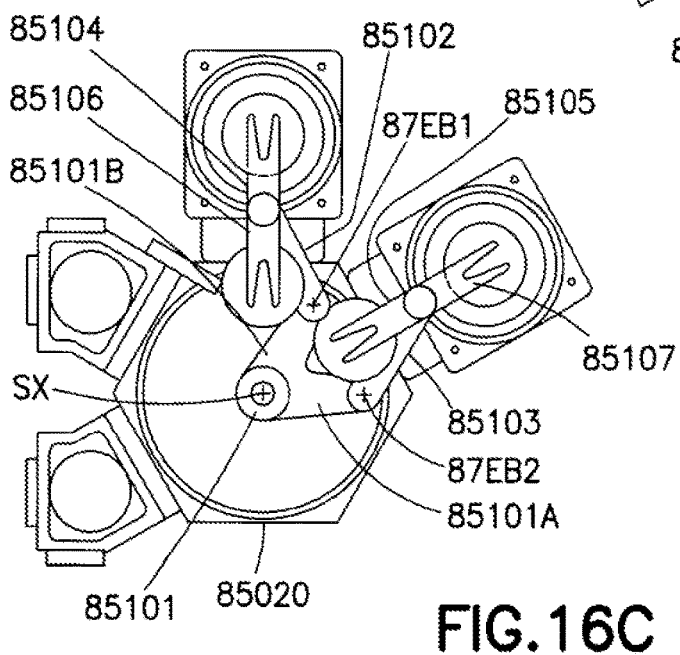

Referring to FIGS. 16A-16C a portion of a processing tool 85001 is shown in accordance with an aspect of the disclosed embodiment. The processing tool 85001 may be substantially similar to that described above with respect to processing tool 76100 (FIG. 7) and include a transfer chamber 85020, one or more processing modules 85010, 85011 connected to the transfer chamber 85020 and one or more load lock modules 85012, 85013 connected to the transfer chamber 85020. A transfer apparatus 85100 is located at least partially within the transfer chamber 85020 for transferring substrates between the processing modules 85010, 85011 and the load lock modules 85012, 85013. The transfer apparatus includes an upper arm link 85101 forearm links 85102, 85103 rotatably coupled to the upper arm link and end effectors 85104-85107 rotatably mounted to respective ones of the forearm links 85102, 85103. It is noted that the end effectors may have any suitable configuration for holding one or more than one substrate. For example, where each end effector holds more than one substrate the substrates may be held in either a stacked or side by side configuration for transferring batches of substrates with a single arm. It is also noted that the upper arm and forearms may have unequal lengths from joint center to joint center in a manner substantially similar to that described above.

The upper arm link 85101 may be a substantially rigid link having a substantially "U" or "V" shape that extends away from a main or shoulder axis of rotation SX of the transfer apparatus 85100. The upper arm link 85101 may include a first portion and a second portion 85101A, 85101B that are releasably rotationally coupled at, for example, the shoulder axis of rotation (or any other suitable point on the upper arm link) in a manner substantially similar to that described in U.S. patent application Ser. No. 11/148,871 entitled "Dual SCARA Arm" and filed on Jun. 9, 2005 (the disclosure of which is incorporated herein by reference in its entirety) so that when the coupling between the first and second portions is released the elbow axes 87EB1, 87EB2 can be rotated towards or away from each other to change or adjust the angle α between the first and second portions 85101A, 85101B and when the coupling is not released the first and second portions form the substantially rigid upper arm link 85101. It is noted that the angle α may be dynamically adjustable when, for example, each link of the upper arm is connected to its own drive shaft of the drive system for driving movement of the arm. For example, when the first and second portions are in a substantially rigid configuration respective drive axes of the drive system are moved in unison and where the angle α is to be adjusted the respective drive axes of the first and second portions are moved in one of opposite directions, at difference rates in the same direction or in any other suitable manner for dynamically changing or adjusting the angle α.

Figure 18C:
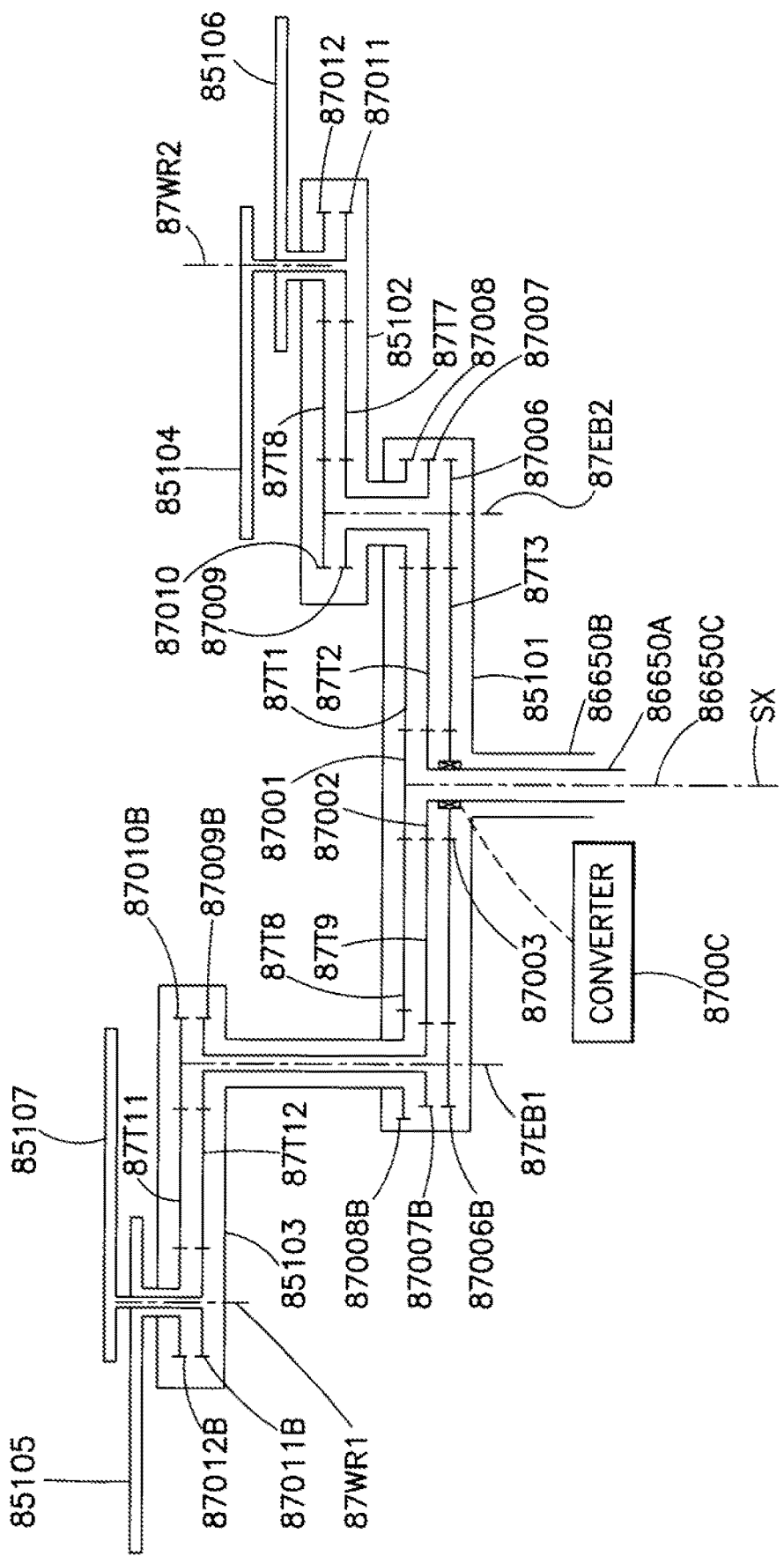

The forearm link 85102 may be rotatably coupled to the upper arm link 85101 about elbow axis 87EB1 and forearm link 85103 may be rotatably coupled to the upper arm link 85101 about elbow axis 87EB2. Each forearm link 85102, 85103 may have two independently rotatable end effectors 85104-85107. For example, end effectors 85104, 85106 may be independently rotatably mounted to forearm link 85102 about wrist axis 87WR2 (FIG. 18C) and end effectors 85105, 85107 may be independently rotatably mounted to forearm link 85103 about wrist axis 87WR1 (FIG. 18C). In one aspect the end effectors may be disposed so that they have a common transfer plane while in other aspects the end effectors may be disposed on substantially proximate or different transfer planes. The dual end effectors on each forearm link allows for the fast swapping (i.e. transfer of substrates without rotating the transport apparatus as a unit about the shoulder axis and substantially without retracting the arm to battery) of substrates at a substrate holding location such as the processing modules 85010, 85011 or load lock modules 85012, 85013. It should be understood that while two end effectors are shown coupled to each forearm link, that any suitable number of end effectors can be rotatably coupled to each forearm link each being configured to hold any suitable number of substrates in, for example, a stacked arrangement or a side by side arrangement in a manner similar to that described above.

Figure 17:
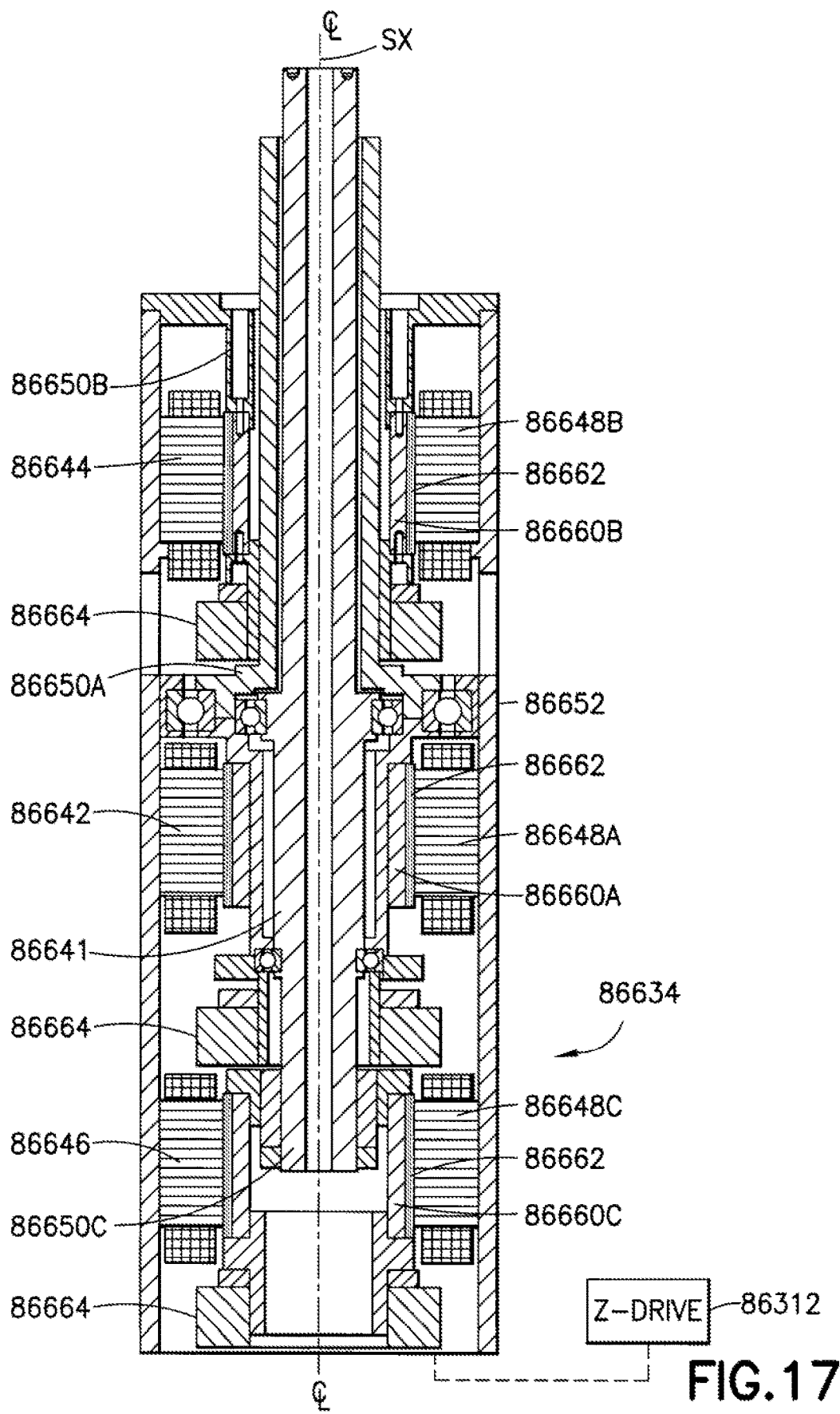
FIG. 17 is a schematic illustration of a transport apparatus drive system in accordance with an aspect of the disclosed embodiment.

The upper arm link 85101, forearm links 85102, 85103 and end effectors 85104-85107 may be connected to a drive system such that at least two of the end effectors (e.g. at least one end effector on each arm) are coupled to, for example, a common drive axis of the drive system. Referring to FIG. 17 a three axis drive system 86634 may be used to drive the transport apparatus 85100. The three axis drive system 86634 generally comprises a drive shaft assembly 86641 and three motors 86642, 86644, 86646 substantially similar to that described above with respect to FIG. 9. In this aspect, the drive shaft assembly 86641 has three drive shafts 86650A, 86650B, 86650C. As may be realized the drive system may not be limited to three motors and three drive shafts. The first motor 86642 comprises a stator 86648A and a rotor 86660A connected to the middle shaft 86650A. The second motor 86644 comprises a stator 86648B and a rotor 86660B connected to the outer shaft 86650B. The third motor 86646 comprises a stator 86648C and rotor 86660C connected to the inner shaft 86650C. The three stators 86648A, 86648B, 86648C are stationarily attached to the tube or housing 86652 at different vertical heights or locations along the tube (it is noted that a three axis drive system including radially nested motors such as that described above may also be used to drive the transport apparatus 85100). For illustrative purposes only the first stator 86648A is the middle stator, the second stator 86648B is the top stator and the third stator 86648C is the bottom stator. Each stator generally comprises an electromagnetic coil. The three shafts 86650A, 86650B, and 86650C are arranged as coaxial shafts. The three rotors 86660A, 86660B, 86660C are preferably comprised of permanent magnets, but may alternatively comprise a magnetic induction rotor that does not have permanent magnets. Sleeves 86662 are preferably located between the rotor 86660 and the stators 86648 to allow the robot to be useable in a vacuum environment with the drive shaft assembly 86641 being located in a vacuum environment and the stators 86648 being located outside of the vacuum environment. However, the sleeves 86662 need not be provided if the robot is only intended for use in an atmospheric environment.

The third shaft 86650C is the inner shaft and extends from the bottom stator 86648C. The inner shaft has the third rotor 86660C aligned with the bottom stator 86648C. The middle shaft 86650A extends upward from the middle stator 86648A. The middle shaft has the first rotor 86660A aligned with the first stator 86648A. The outer shaft 86650B extends upward from the top stator 86648B. The outer shaft has the second rotor 86660B aligned with the upper stator 86648B. Various bearings are provided about the shafts 86650A-86650C and the tube 86652 to allow each shaft to be independently rotatable relative to each other and the tube 86652. Each shaft 86650A-86650C may be provided with a position sensor 86664. The position sensors 86664 are used to signal the controller 76170 (FIG. 7) of the rotational position of the shafts 86650A-86650C relative to each other and/or relative to the tube 86652. Any suitable sensor could be used, such as optical or induction. The drive system 86634 may also include one or more suitable Z-axis drives 86312 for moving the upper arm link, forearm links and end effectors of the transport apparatus in a direction substantially parallel with (e.g. along) the shoulder axis of rotation SX as a unit. In another aspect one or more revolute joints of the robot may include a Z-axis drive to, for example, move the end effector(s) of each arm in the Z-direction independently of each other.

Referring now to FIGS. 18A-18C the outer shaft 86650B may be coupled to the upper arm link 85101 such that as the shaft 86650B rotates the upper arm link 85101 rotates with it as a unit. The inner shaft 86650C may be connected to the forearm links 85102, 85103 for rotating the forearm links about their respective elbow axes 87EB1, 87EB2. For example, the shaft 86650C may be coupled to pulley 87001 so that as the shaft 86650C rotates the pulley 87001 rotates with it. Pulley 87008B may be rotatably mounted within the upper arm link 85101 about elbow axis 87EB1 and connected to the pulley 87001 through any suitable transmission 87T8, such as a belt, band, cable, etc. The pulley 87008B may be coupled to the forearm link 85103 such that as the pulley 87008B rotates the forearm link 85103 rotates with it. Similarly, pulley 87008 may be rotatably mounted within the upper arm link 85101 about elbow axis 87EB2 and connected to the pulley 87001 through any suitable transmission 87T1, such as a belt, band, cable, etc. The pulley 87008 may be coupled to the forearm link 85102 such that as the pulley 87008 rotates the forearm link 85102 rotates with it. Because both forearms are coupled to the shaft 86650C as described above, the rotation of the shaft 86650C causes substantially simultaneous rotation of the forearm links 85102, 85103 about their respective elbow axes 87EB1, 87EB2 in a common rotational direction (e.g. clockwise or counterclockwise).

The middle shaft 86650A may be connected to the end effectors for effecting the fast swap of substrates. For example, pulley 87002 may be coupled to shaft 86650A so that as the shaft 86650A rotates the pulley 87002 rotates with it. Another pulley 87003 may also be mounted to shaft 86650A using any suitable bearings so that the pulley 87003 is independently rotatable relative to the shaft 86650A. The pulleys 87002, 87003 may be coupled to each other through a directional converter 87000C so that the pulleys 87002, 87003 rotate in opposite directions. For example, pulleys 87004, 87005 may be rotatably mounted to a shaft about axis 87101 within the upper arm 85101 so that as pulley 87004 rotates the pulley 87005 rotates with it. Pulley 87002 may be coupled to pulley 87005 through any suitable transmission 87T5 substantially similar to those described above, such that pulleys 87002, 87005 rotate in the same direction. Pulley 87004 may be coupled to pulley 87003 through any suitable transmission 87T4 substantially similar to those described above, so that pulley 87003 rotates in an opposite direction than pulley 87004 (and pulleys 87002, 87005). For example, a "FIG. 8" or any other suitable reversing transmission can be used to effect the opposite rotation of pulley 87003. It is noted that the directional converter 87000C can be located at any suitable location or locations along the end effector drive transmission.

Pulleys 87006, 87007 may be located within upper arm link 85101 for rotation about elbow axis 87EB2. Pulleys 87009, 87010 may be located within forearm link 85102 for rotation about elbow axis 87EB2. Pulley 87007 may be coupled to pulley 87009 so that the pulleys rotate as a unit about axis 87EB2. Pulley 87006 may be coupled to pulley 87010 so that the pulleys rotate as a unit about axis 87EB2. Pulley 87011 may be located within the forearm link 85102 and coupled to end effector 85104 for rotating the end effector 85104 about the wrist axis 87WR2. Pulley 87012 may be located within the forearm link 85102 and coupled to end effector 85106 for rotating the end effector 85106 about the wrist axis 87WR2. Pulley 87012 may be coupled to pulley 87010 through any suitable transmission 87T6. Pulley 87011 may be coupled to pulley 87009 through any suitable transmission 87T7. Pulley 87007 may be coupled to pulley 87002 through any suitable transmission 87T2 and pulley 87006 may be coupled to pulley 87003 through any suitable transmission 87T3. The transmissions 87T2, 87T3, 87T6, 87T7 may be substantially similar to those described above.

Pulleys 87006B, 87007B may be located within upper arm link 85101 for rotation about elbow axis 87EB1. Pulleys 87009B, 87010B may be located within forearm link 85103 for rotation about elbow axis 87EB1. Pulley 87007B may be coupled to pulley 87009B so that the pulleys rotate as a unit about axis 87EB1. Pulley 87006B may be coupled to pulley 87010B so that the pulleys rotate as a unit about axis 87EB1. Pulley 87011B may be located within the forearm link 85103 and coupled to end effector 85107 for rotating the end effector 85107 about the wrist axis 87WR1. Pulley 87012B may be located within the forearm link 85103 and coupled to end effector 85105 for rotating the end effector 85105 about the wrist axis 87WR1. Pulley 87012B may be coupled to pulley 87010B through any suitable transmission 87T11. Pulley 87011B may be coupled to pulley 87009B through any suitable transmission 87T12. Pulley 87007B may be coupled to pulley 87002 through any suitable transmission 87T9 and pulley 87006B may be coupled to pulley 87003 through any suitable transmission 87T10. The transmissions 87T9-87T12 may be substantially similar to those described above.

As may be realized the rotation of shaft 86650C in a first direction causes end effectors 85104, 85107 to rotate in the first direction. The rotation of shaft 86650C also causes the end effectors 85105, 85106 to rotate in a second direction (opposite the first direction) due to, for example, their connection to the shaft 86650C through the directional converter 8700C formed in part by pulleys 87004, 87005 and transmissions 87T5, 87T4. As such, the end effectors 85104, 85105, 85106, 85107 are coupled to a common drive shaft 86650C for causing opposite rotation of the end effectors of each arm for effecting the fast swapping of substrates.

Figure 19:
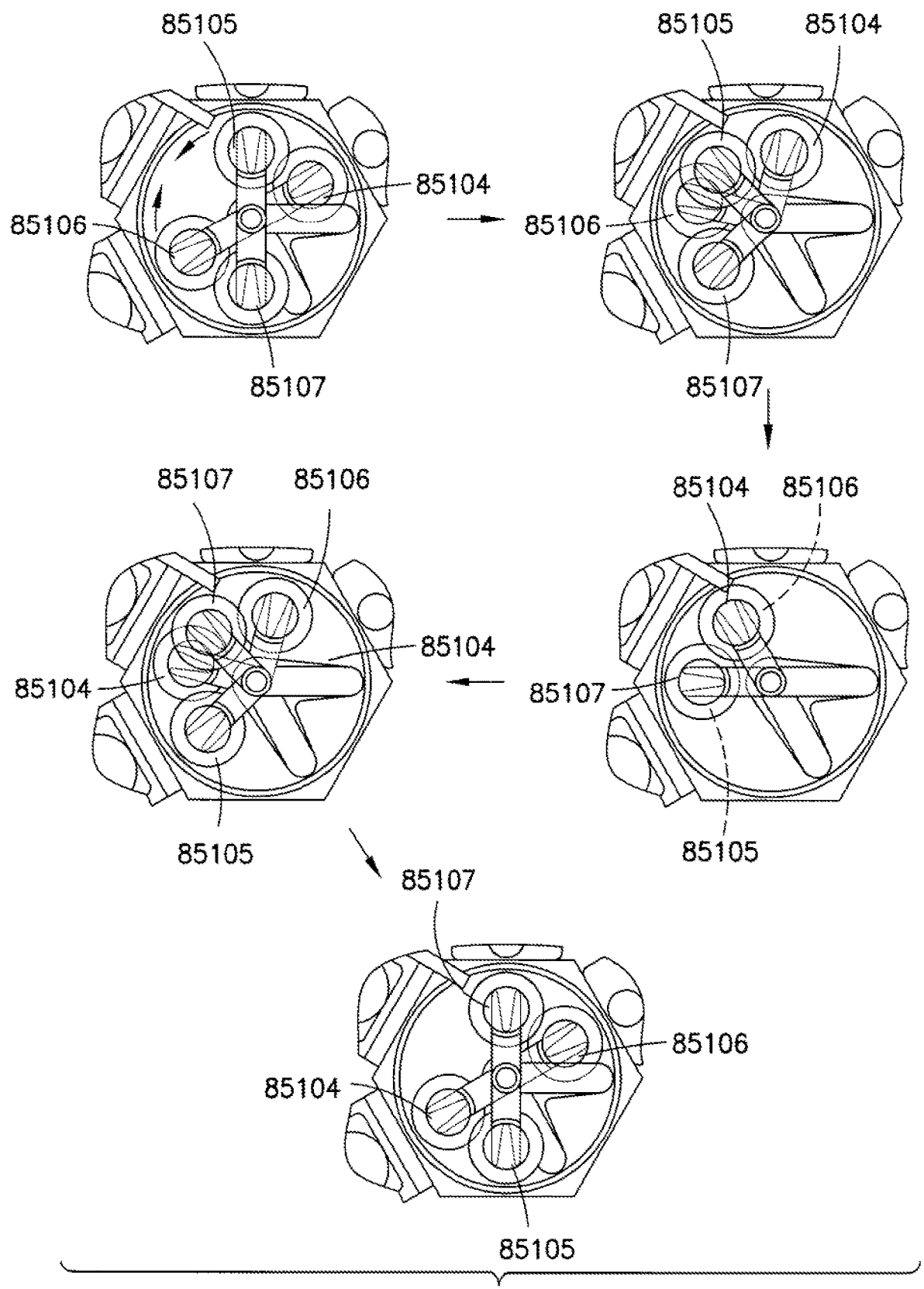
FIG. 19 is a schematic illustration of a fast swapping of end effectors for the transport apparatus of FIGS. 16A-16C.
Figure 20A:
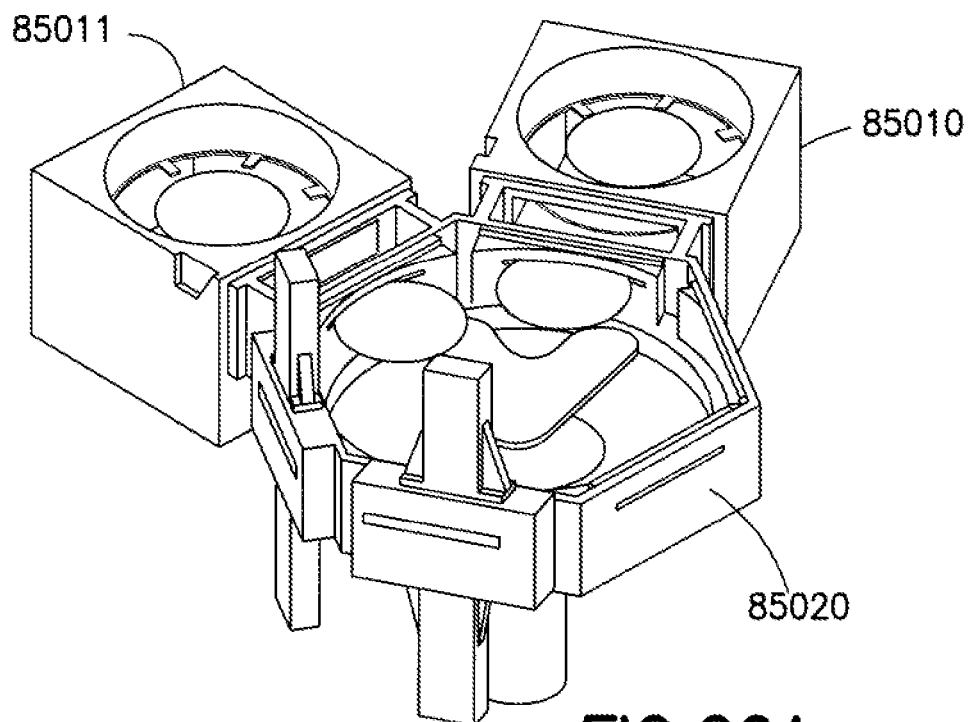
FIGS. 20A and 20B illustrate the transport apparatus of FIGS. 16A-16C in various operational states.
Figure 20B:
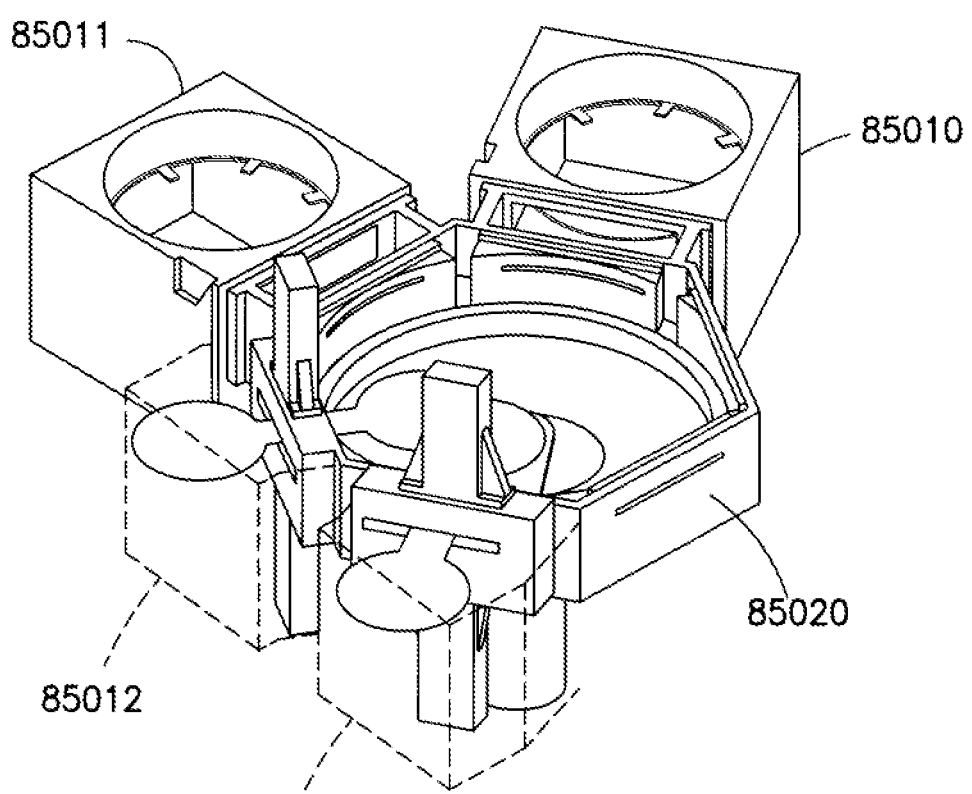

Referring again to FIGS. 16A-16C and to FIG. 19, in operation, to rotate the transport apparatus as a unit about the shoulder axis SX the drive shafts 86650A-86650C may be rotated in the same direction at substantially the same speed. To substantially simultaneously extend and retract the arms (e.g. radially move the end effectors into and out of the substrate holding locations) along respective axes of extension and retraction EXT for picking and placing substrates, the middle shaft 86650C may be held substantially stationary while the shafts 86650A, 86650B are rotated in the same direction to effect the radial extension and retraction of the end effectors as illustrated in FIGS. 20A and 20B (which show extension of the end effectors into the process modules 85010, 85011 and load lock modules 85012, 85013). To effect the fast swapping of substrates held by the end effectors the middle shaft 86650A is rotated while the shafts 86650B, 86650C are held substantially stationary so that end effectors 85104, 85105 are rotated in the first direction and end effectors 85106, 85107 are rotated (through the directional converter 87000C) in the second (opposite) direction as shown in FIG. 19 so that end effectors 85106, 85107 are pointed towards and aligned with the desired substrate holding locations.

As may be realized the pulley and transmission configuration shown and described for transport apparatus 85100 are merely exemplary and that other configurations may exist that allow the fast swap of the end effectors in a manner substantially similar manner to that described herein. As may also be realized a four axis drive system (with vertically stacked motors or radially nested motors) such as those described above may also be used to drive the transport apparatus 85100 such that pulley 87002 is driven by one drive axis and pulley 87003 is driven by another different drive axis.

Figure 15A:
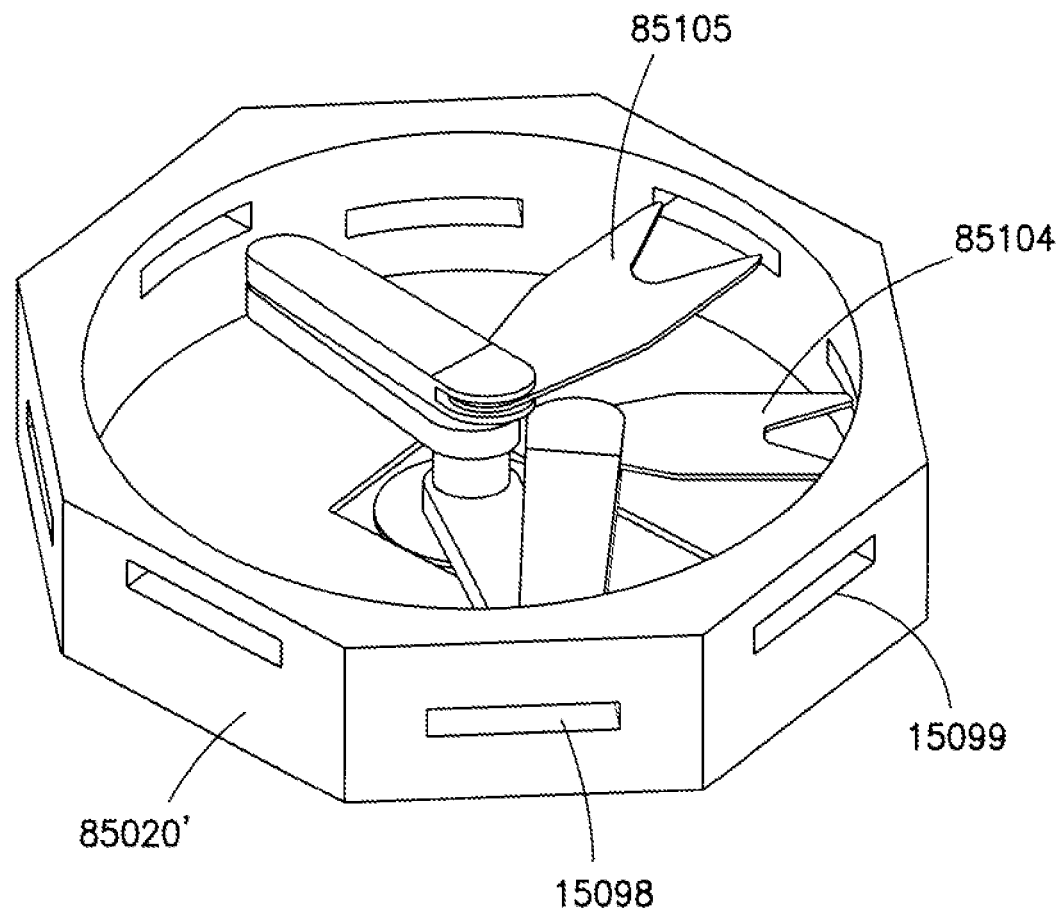
FIGS. 15A and 15B are schematic illustrations of a transfer chamber in accordance with an aspect of the disclosed embodiment.
Figure 15B:
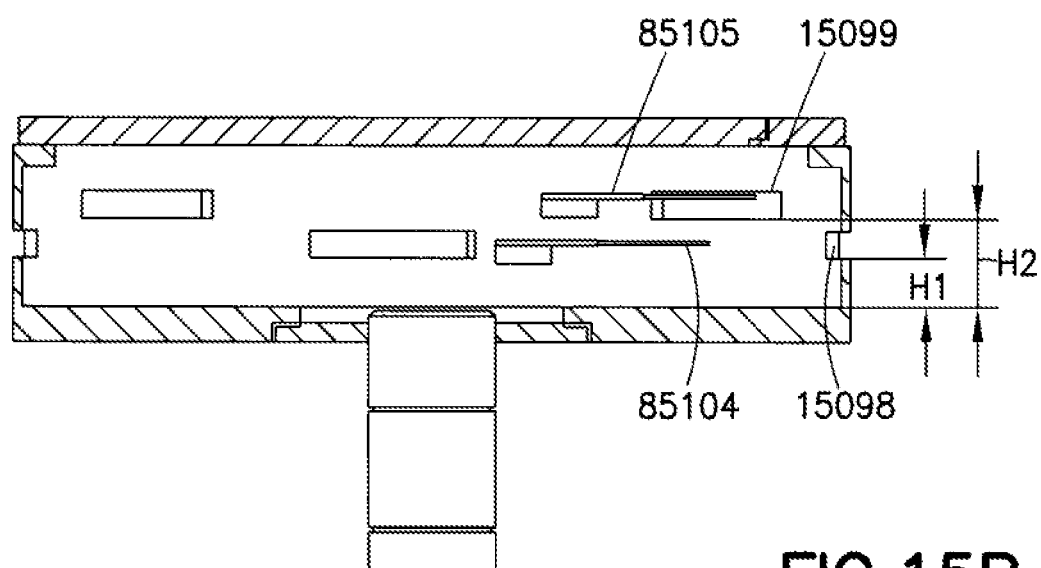

The end effectors 85104-85107 may be oriented on the respective forearm links 85102, 85103 so that an angle θ between the end effectors is substantially the same as the angle between the substrate holding locations (e.g. process modules 85010, 85011 and load locks 85012, 85013) as shown in FIG. 16A. As noted above, in one aspect the end effectors may also be located at different vertical heights (e.g. in different substrate transfer planes). The process modules 85010, 85011 and the load locks 85012, 85013 may be configured to have different wafer transfer planes that correspond to the different vertical heights of the end effectors. For example, referring to FIGS. 15A and 15B a transfer chamber 85020' is illustrated having openings or ports 15098, 15099 (to which the load locks and process modules can be attached) disposed as different vertical heights H1, H2 that correspond to the vertically different substrate transport planes of end effectors 85104, 85105. It is noted that end effectors 85104, 85105 are shown in FIGS. 15A and 15B for exemplary purposes only and that in other aspects any of the robot arm assemblies having vertically different substrate transport planes disclosed herein may be used with chamber 85020'. In other aspects the Z-drive 86312 of the drive system 86634 may be configured to raise and lower the end effectors by the same amount or different amounts (e.g. the Z-drive may be configured to vertically move the end effectors 85104, 85106 of one forearm 85102 independently of vertical movement of the end effectors 85105, 85107 of the other forearm 85103) for picking and placing the substrates at the substrate holding locations. In yet another aspect the substrate holding locations may include Z-drives for changing the wafer transfer plane of the substrate holding location depending on the end effector being used to pick or pace a substrate from a corresponding substrate holding station.

Referring now to FIGS. 21A-23 another substrate transfer apparatus 90100 is illustrated in accordance with an exemplary embodiment. The transfer apparatus 90100 may be substantially similar to transfer apparatus 85100 unless otherwise indicated. As such similar reference numbers will be used to indicate like features. In this example, the transfer apparatus includes a substantially rigid upper arm link 85101 substantially similar to that described above with respect to transfer apparatus 85100. The transfer apparatus 90100 also includes two forearm links 85102, 85103 rotatably coupled to the upper arm link 85101 in a manner substantially similar to that described above with respect to transfer apparatus 85100. It is noted that the upper arms and forearm may have unequal lengths in a manner substantially similar to that described above. A single end effector 85104, 85105 is rotatably coupled to a respective one of the forearm links 85102, 85103 in a manner substantially similar to that described above with respect to transfer apparatus 85100. It is noted that while only one end effector is shown on each arm, each arm may have multiple end effectors in either a stacked or side by side configuration for transferring batches of substrates with a single arm.

In this aspect of the disclosed embodiment the transfer apparatus is driven by a two axis (e.g. two degree of freedom) drive system 91400 such that rotation of each of the end effectors 85104, 85105 is slaved to the rotation of the upper arm link 85101. It is noted that the two axis drive system 91400 may be substantially similar to the drive systems described above but with only two drive axes. For example, the drive system 91400 may include a first motor 91403 and a second motor 91404 each including a respective stator 91403S, 91404S and rotor 91403R, 91404R. The stators 91403S, 91404S may be rotationally fixed and mounted to housing 91400H of the drive system 91400. The rotor 91403R may be mounted to drive shaft 91402 and rotor 91404R may be mounted to drive shaft 91401. While the drive shafts are shown as coaxial drive shafts and the motors are shown as being stacked one above the other in other aspects of the disclosed embodiment one or more of the drive shafts and motors may have a side by side arrangement and be coupled to each other through suitable transmissions such as belts, bands, gears, etc. The drive system 91400 may also include at least one Z-axis drive 91312 for vertically moving the arm assembly of the transfer apparatus 90100 as a unit or for vertically moving, for example, each end effector 85104, 85105 vertically independent of the other end effector 85104, 85105.

In this example, the drive shaft 91402 may be coupled to the upper arm link 85101 so that as the drive shaft 91402 rotates the upper arm link 85101 rotates with it. The drive shaft 91401 may be coupled to pulley 92101 located, for example, within the upper arm link 85101 so that as the drive shaft 91401 rotates the pulley 92101 rotates with it. Pulley 92101 may be coupled to the forearm links 85102, 85103 for rotating the forearm links 85102, 85103 about respective ones of the elbow axes 92EB1, 92EB2 in the same direction (e.g. clockwise or counterclockwise). For example, pulley 92102B may be rotatably mounted within, for example, the upper arm link 85101 about elbow axis 92EB1. The pulley may be fixedly attached to the forearm link 85102 so that as the pulley 92101B rotates the forearm link 85103 rotates with it. Similarly, pulley 92102 may be rotatably mounted about elbow axis 92EB2 and fixedly coupled to the forearm 85102 so that when pulley 92102 rotates the forearm 95102 rotates with it. Both pulleys 92102, 92102B may be coupled to pulley 92101 by respective transmissions 92T1, 92T2, which may be substantially similar to those described above, so that rotation of pulley 92101 simultaneously drives the rotation of pulleys 92102, 92102B in the same direction for rotating the forearm links 85102, 85103 about the respective elbow axes 92EB1, 92EB2.

Figure 24A:
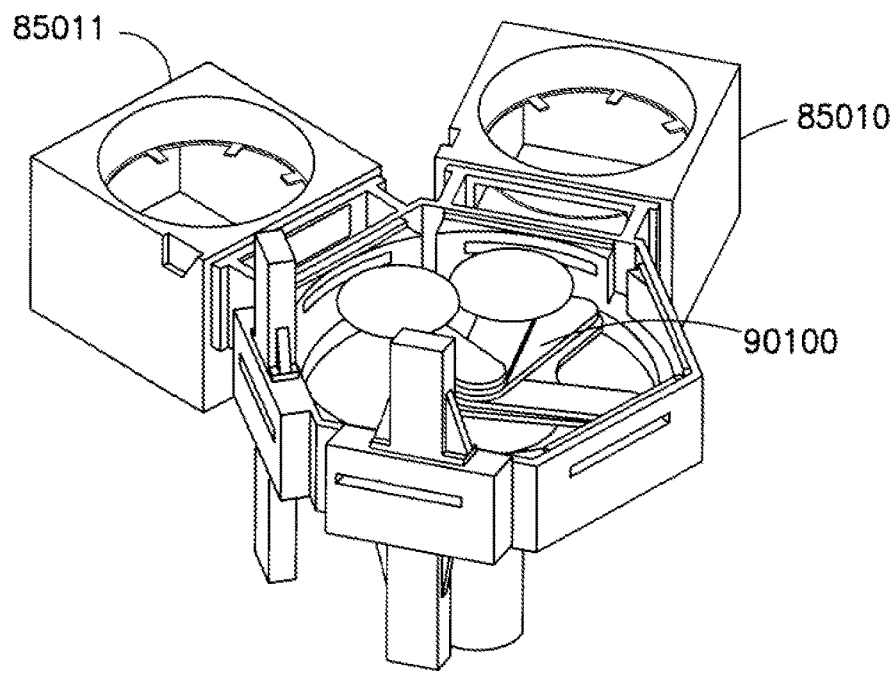
FIGS. 24A-24C illustrate the transport apparatus of FIGS. 21A and 21B in various operational states.
Figure 24B:
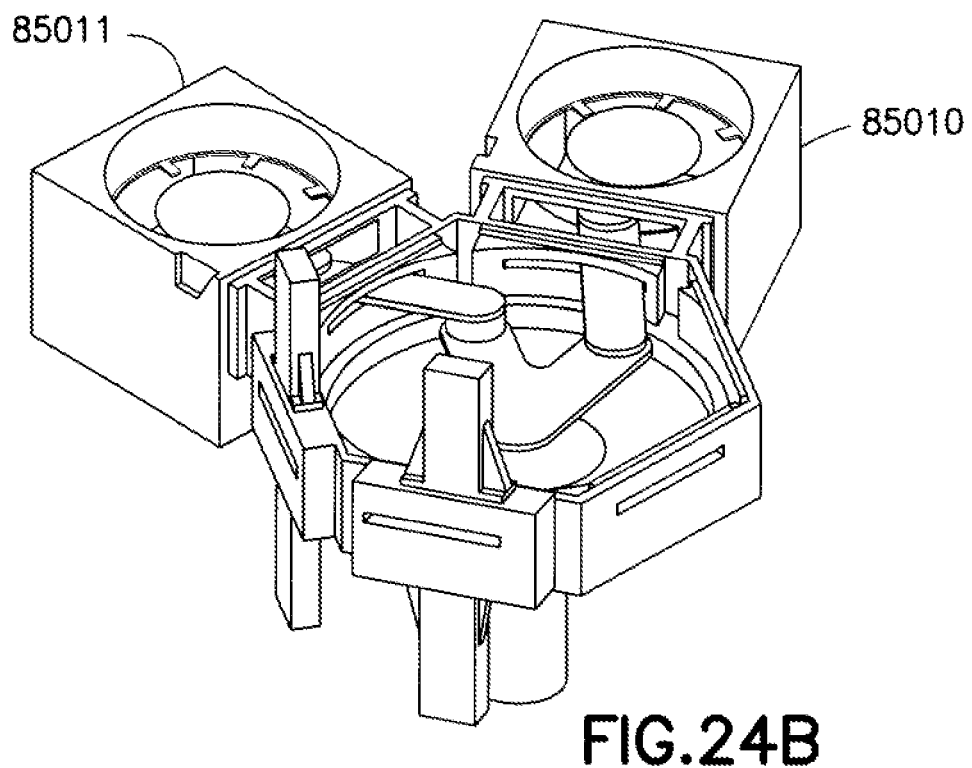
Figure 24C:
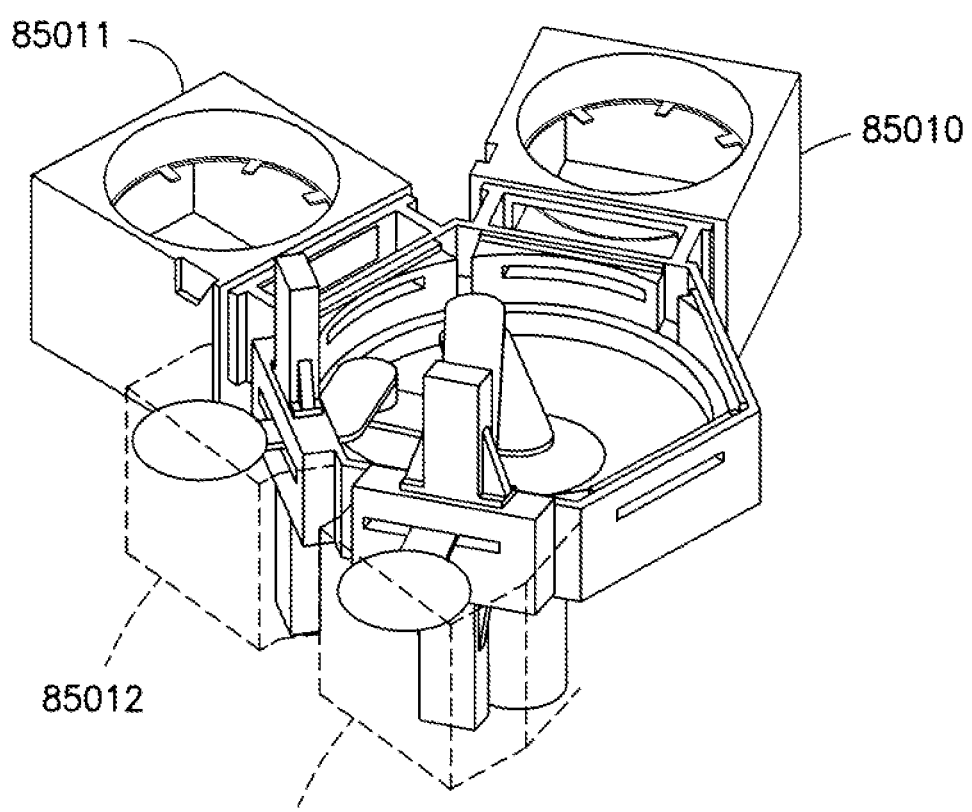

As noted above, the rotation of the end effectors 95104, 85105 may be slaved to the upper arm link 85101. For example, pulley 92103B may be rotatably located within the forearm link 85103 about the elbow axis 92EB1 and be fixed to the upper arm link 85101. Pulley 92104B may be rotatably mounted about the wrist axis 92WR1 and be fixed to the end effector 85104 so that as the pulley 92104B rotates the end effector 85104 rotates with it. As may be realized the opposite rotation of the drive shafts 91401, 91402 relative to each other causes opposite rotation of the upper arm link 85101 and forearm link 85103 for extending the arm. Because the pulley 92103B is fixed to the upper arm link 85101 the end effector 85104 remains substantially aligned with an axis of extension and retraction EXT of the arm. It is noted that the pulley diameters may be any suitable diameters for maintaining alignment of the end effector 85104 along the axis of extension and retraction EXT. Pulley 92103 may be rotatably located within the forearm link 85102 about the elbow axis 92EB2 and be fixed to the upper arm link 85101. Pulley 92104 may be rotatably mounted about the wrist axis 92WR2 and be fixed to the end effector 85105 so that as the pulley 92104 rotates the end effector 85104 rotates with it. Again, the opposite rotation of the drive shafts 91401, 91402 relative to each other causes opposite rotation of the upper arm link 85101 and forearm link 85102 for extending the arm. Because the pulley 92103 is fixed to the upper arm link 85101 the end effector 85105 remains substantially aligned with an axis of extension and retraction EXT of the arm. It is noted that the pulley diameters may be any suitable diameters for maintaining alignment of the end effector 85105 along the axis of extension and retraction EXT. FIGS. 24A-24C illustrate the transfer apparatus 90100 in a retracted configuration (FIG. 24A) extended into, for example, process modules 85010, 85011 and extended into, for example, load lock modules 85012, 85013.

Figure 21A:
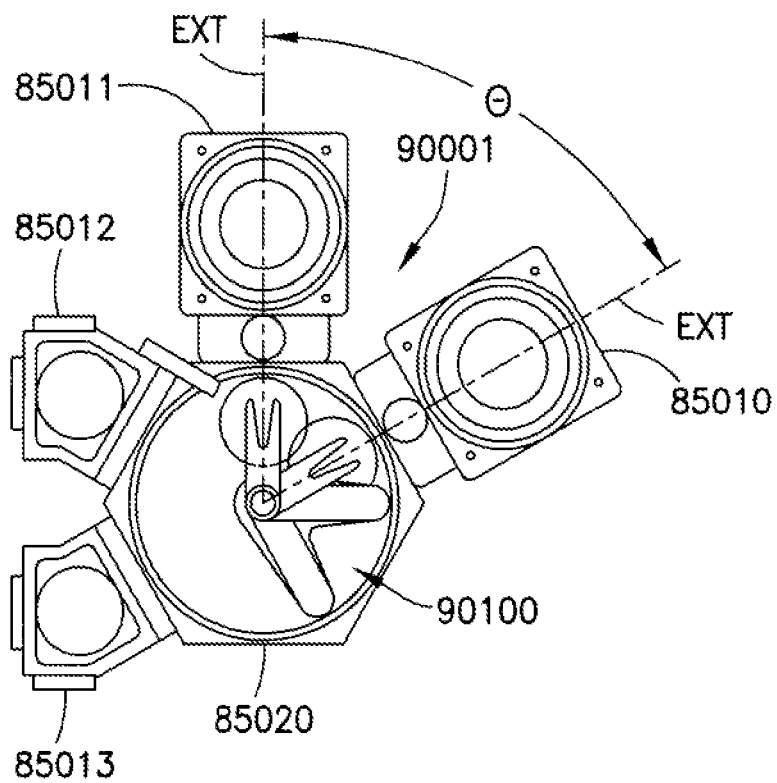
FIGS. 21A and 21B are schematic illustrations of a substrate transfer apparatus in accordance with an aspect of the disclosed embodiment.
Figure 21B:
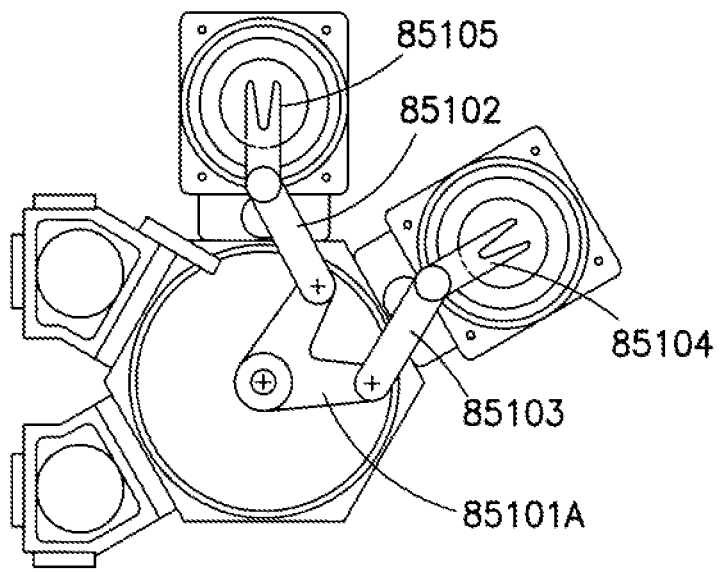
Figure 22:
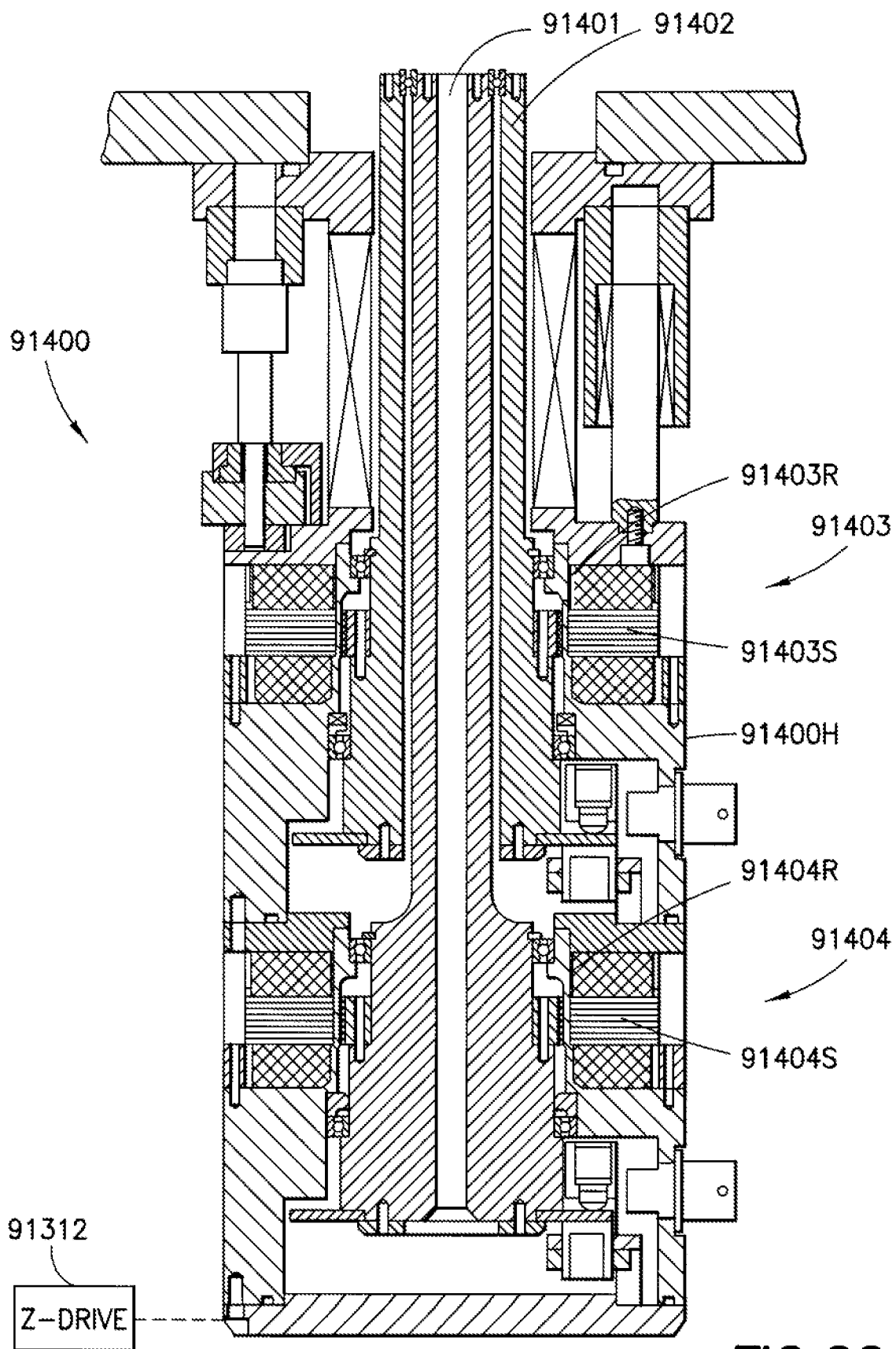
FIG. 22 is a transport apparatus drive system in accordance with an aspect of the disclosed embodiment.
Figure 23:
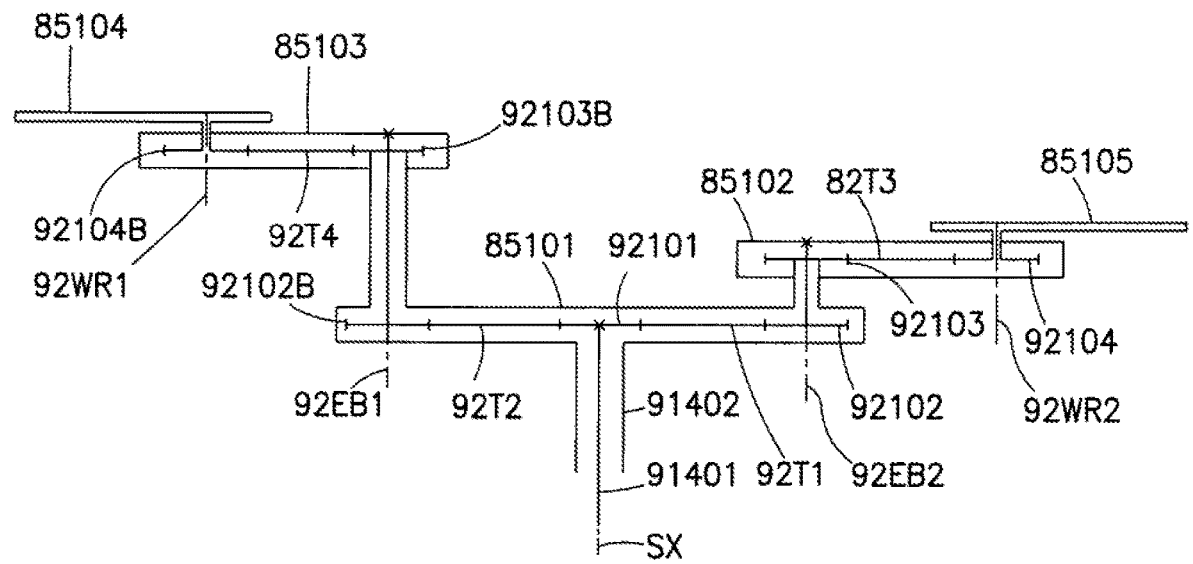
FIG. 23 is a schematic illustration of a portion of the transport apparatus of FIGS. 21A and 21B.

It is noted that the end effectors 85104, 85105 may be oriented on the respective forearm links 85102, 85103 so that an angle θ between the end effectors is substantially the same as the angle between the substrate holding locations (process modules 85010, 85011 and load locks 85012, 85013) as shown in FIG. 21A. The end effectors may also be located at different vertical heights. The process modules 85010, 85011 and the load locks 85012, 85013 may be configured to have different wafer transfer planes that correspond to the different vertical heights of the end effectors. In other aspects the Z-drive 91312 of the drive system 91400 may be configured to raise and lower the end effectors by the same amount or different amounts (e.g. the Z-drive may be configured to vertically move the end effector 85104 of one forearm 85102 independently of vertical movement of the end effectors 85105 of the other forearm 85103) for picking and placing the substrates at the substrate holding locations. In yet another aspect the substrate holding locations may include Z-drives for changing the wafer transfer plane of the substrate holding location depending on the end effector being used to pick or pace a substrate from a corresponding substrate holding station.

Figure 25A:
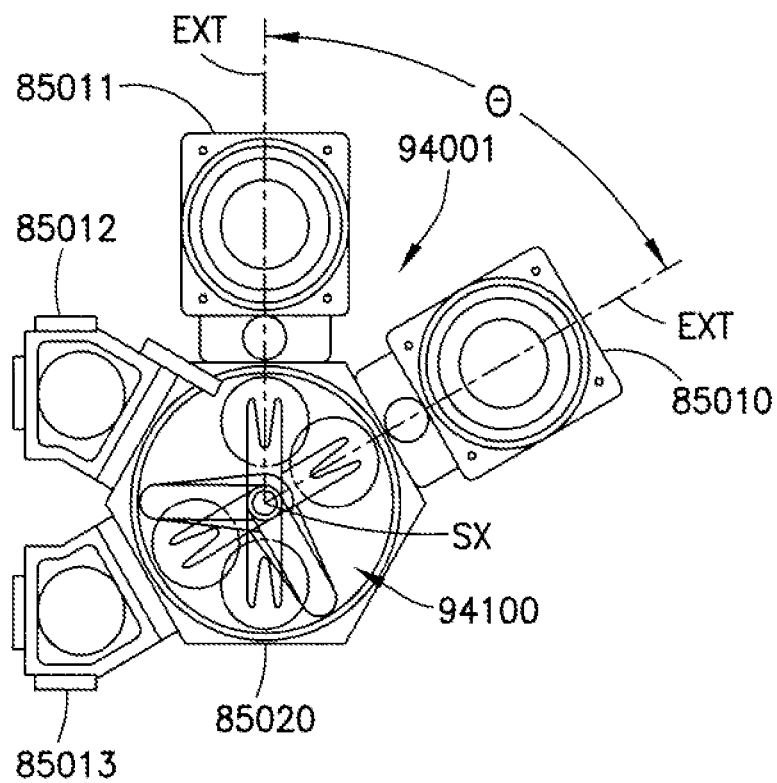
FIGS. 25A and 25B are schematic illustrations of a substrate transfer apparatus in accordance with an aspect of the disclosed embodiment.
Figure 25B:
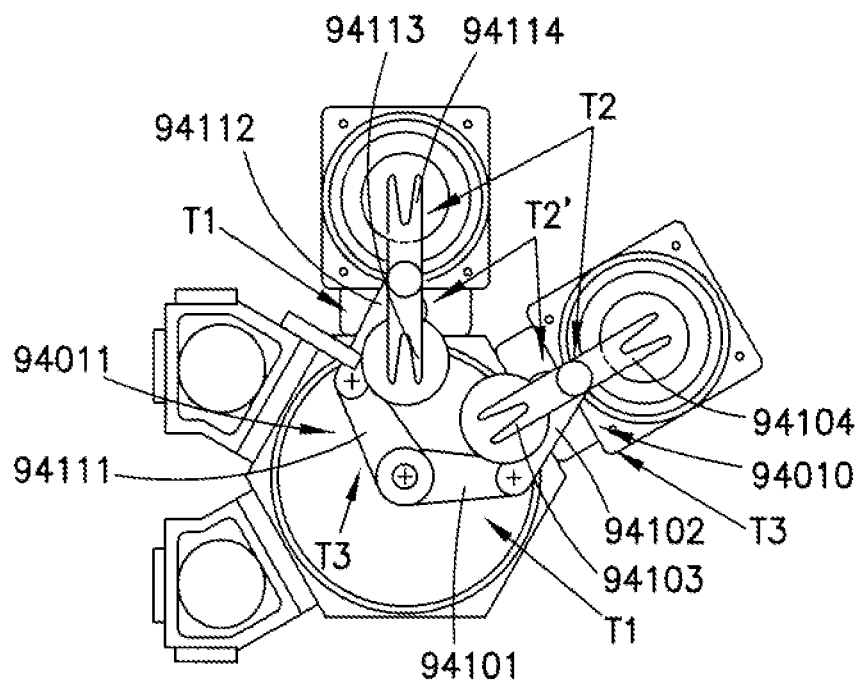

Referring to FIGS. 25A and 25B another substrate transfer apparatus 94100 is shown in accordance with an aspect of the disclosed embodiment. The transfer apparatus 94100 includes two arms 94010, 94011 each having an upper arm 94101, 94111, a forearm 94102, 94112 and at least two end effectors 94103, 94104, 94113, 94114 where each end effector is configured to hold one substrate or more than one substrate in a stacked or side by side configuration. It is noted that the upper arms and forearm may have unequal lengths in a manner substantially similar to that described above. The wrist axes of the arms 94010, 94011 in this example, are offset along the Z-axis to allow the wrists to retract over the shoulder axis SX (e.g. the wafer transfer plane of the end effectors are offset along the Z-axis) where the arms are substantially symmetric to each other.

The transfer apparatus 94100 may include a drive system, such as the three axis drive 86634 described above for driving the extension, retraction and rotation of the transfer apparatus 94100. It should be understood that the drive system of the transfer apparatus may not be limited to a three axis drive system and may include more or less than three drive axes. The end effectors 94103, 94104, 94113, 94114 may be coupled to a single drive axis of the drive system, as will be described below, for effecting the fast swap of substrates held on each arm 94010, 94011. The drive system may also be configured so that the upper arm link 94101 of arm 94010 is coupled to the same drive axis as the forearm link 94112 of arm 94011 and the upper arm link 94111 of arm 94011 is coupled to the same drive axis as forearm link 94102 of arm 94010, as will be described in further detail below.

Figure 26:
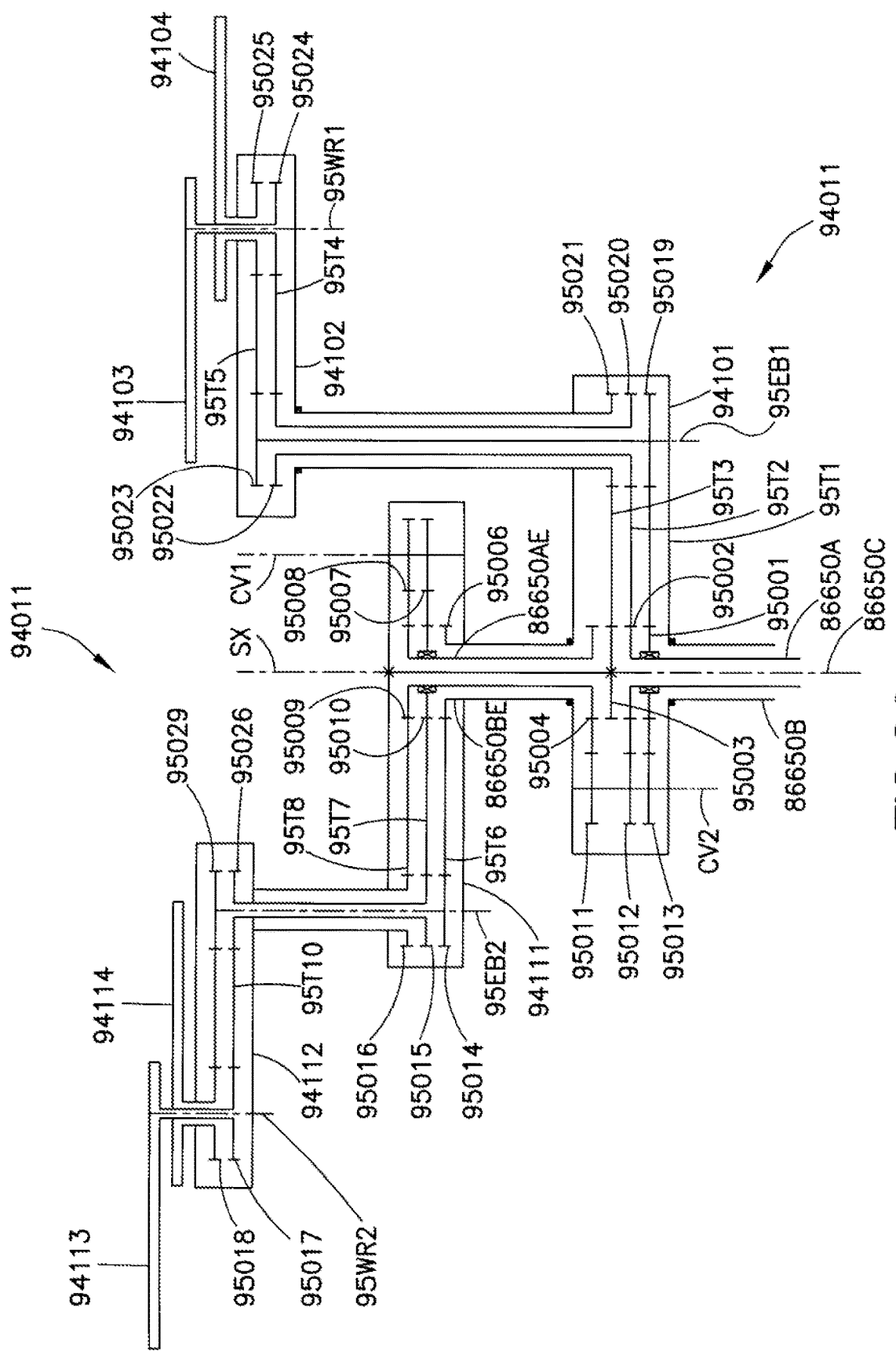
FIG. 26 is a schematic illustration of a portion of the transport apparatus of FIGS. 25A and 25B.

Referring to FIG. 26 the arm 94010 includes upper arm 94101, forearm 94102 rotatably mounted to the upper arm 94101 about elbow axis 95EB1 and end effectors 94103, 94104 independently rotatably mounted to the forearm 94102 about wrist axis 95WR1. The drive shaft 86650B (e.g. the outer drive shaft) is coupled to the upper arm 94101 about the shoulder axis SX so that as the drive shaft 86650B rotates the upper arm 94101 rotates with it. The drive shaft 86650A (e.g. the middle drive shaft) is coupled to end effector pulley 95002 so that as the drive shaft 86650A rotates the pulley 95002 rotates with it. A second end effector pulley is rotatably mounted to drive shaft 86650A so that the pulley 95001 rotates relative to the drive shaft 86650A. The pulleys 95001, 95002 are coupled to each other through a direction converter substantially similar to direction converter 87000C described above. For example, the direction converter includes pulleys 95012, 95013 mounted for rotation about axis CV2 so that the pulleys rotate as a unit. Pulley 95012 is coupled to pulley 95002 through any suitable transmission so that the pulleys 95012, 95002 rotate in the same direction. Pulley 95013 is coupled to pulley 95001 through any suitable transmission so that the pulley 95001 rotates in an opposite direction than that of pulley 95013 (and pulley 95002). The end effector 94103 is coupled to pulley 95002 through pulleys 95020, 95022, 95024 and transmissions 95T2, 95T4 in a manner substantially similar to that described above with respect to FIGS. 18A and 18C. End effector 94104 is coupled to pulley 95001 through pulleys 95019, 95023, 95025 and transmissions 95T1, 95T5 in a manner substantially similar to that described above with respect to FIGS. 18A and 18C. The drive shaft 86650C (e.g. the inner drive shaft) is coupled to pulley 95003 so that as the drive shaft 86650C rotates the pulley 95003 rotates with it. The forearm 94102 is coupled to pulley 95003 through pulley 95021 (which is fixed to forearm 94102 so that as the pulley 95021 rotates the forearm 94102 rotates with it) and transmission 95T3.

The upper arm 94111 of arm 94011 is fixedly coupled to drive shaft 86650C so that as the drive shaft 86650C rotates the upper arm 94111 rotates with it and in the same direction (e.g. clockwise or counterclockwise) as the forearm 94102 of arm 94010. The drive shaft 86650A is coupled to the direction converter of arm 94011 through pulley 95011 which is mounted about axis CV2 for rotation with pulleys 95011, 95012 as a unit. In this example, a drive shaft extension 86650AE is rotatably mounted within upper arm 4111 about axis SX. Pulleys 95004, 95009 are fixedly coupled to the drive shaft extension 86650AE. Pulley 95004 is coupled to pulley 95011 through any suitable transmission for transferring the rotational motion of drive shaft 86650A to the drive shaft extension 86650AE so that the drive shaft 86650A and drive shaft extension 86650AE rotate in the same direction. Pulley 95009 is coupled to the direction converter of arm 94111 which is substantially similar to direction converter 87000C. For example, pulleys 95007, 95008 are rotatably mounted about axis CV1 so that the pulleys 95007, 95008 rotate as a unit. Pulley 95009 is coupled to pulley 95008 through any suitable transmission so that the pulleys 95009, 95008 rotate in the same direction. Pulley 95007 is coupled to pulley 95010 (which is rotatably mounted to drive shaft extension 86650AE) through any suitable transmission so that the pulley 95010 rotates in a direction opposite to that of pulley 95007 (and pulley 95009). The end effector 94113 is coupled to pulley 95009 through pulleys 95017, 95026, 95016 and transmissions 95T8, 95T9 in a manner substantially similar to that described above with respect to FIGS. 18A and 18C. End effector 94114 is coupled to pulley 95010 through pulleys 95018, 95029, 95015 and transmissions 95T7, 95T10 in a manner substantially similar to that described above with respect to FIGS. 18A and 18C. The forearm 94112 is coupled to drive shaft 86650B through drive shaft extension 86650BE (which may be fixedly coupled to the upper arm 94101 of arm 94010). For example, a pulley 95006 may be fixedly mounted to drive shaft extension 86650BE so that as the drive shaft 86650B rotates the pulley 95006 rotates with it. Pulley 95014 may be rotatably mounted about axis 95EB2 and fixedly coupled to forearm 94112 so that as pulley 95014 rotates the forearm 94112 rotates with it. The pulley 95014 may be coupled to pulley 95006 through transmission 95T6 so that the rotation of the drive shaft 86650B causes rotation of the forearm 94112 in the same direction (e.g. clockwise or counterclockwise) as the upper arm 94101. It is noted that the pulleys of the arms 94010, 94011 may have any suitable diameters and the transmissions coupling the pulleys may be any suitable transmissions such as those described above.

In operation, to extend and retract the arms along respective axes of extension and retraction EXT the drive shafts 86650B and 86650C are rotated in opposite directions to effect extension or retraction of the upper arms 94101, 94111 and forearms 94102, 94112. The drive shaft 86650A is also rotated to maintain alignment of the end effectors 94103, 94104, 94113, 94114 with a respective one of the axes of extension and retraction of the arms 94010, 94011. To effect the fast swap of substrates held on the end effectors 94103, 94104, 94113, 94114 the drive shaft 86650A is rotated while drive shafts 86650B, 86650C remain substantially stationary in a manner substantially similar to that described above with respect to FIG. 18A-19.

It is noted that the end effectors 94103, 94104, 94113, 94114 may be oriented on the respective forearm links 94112, 94102 so that an angle θ between the end effectors is substantially the same as the angle between the substrate holding locations (process modules 85010, 85011 and load locks 85012, 85013) as shown in FIG. 25A. The end effectors may also be located at different vertical heights. The process modules 85010, 85011 and the load locks 85012, 85013 may be configured to have different wafer transfer planes that correspond to the different vertical heights of the end effectors. For example, as shown in FIGS. 15A and 15B described above. In other aspects the Z-drive 86312 (FIG. 17) of the drive system 86634 may be configured to raise and lower the end effectors by the same amount or different amounts (e.g. the Z-drive may be configured to vertically move the end effectors 94113, 94114 of one forearm 94112 independently of vertical movement of the end effectors 94103, 94104 of the other forearm 94102) for picking and placing the substrates at the substrate holding locations. In yet another aspect the substrate holding locations may include Z-drives for changing the wafer transfer plane of the substrate holding location depending on the end effector being used to pick or pace a substrate from a corresponding substrate holding station.

Figure 27A:
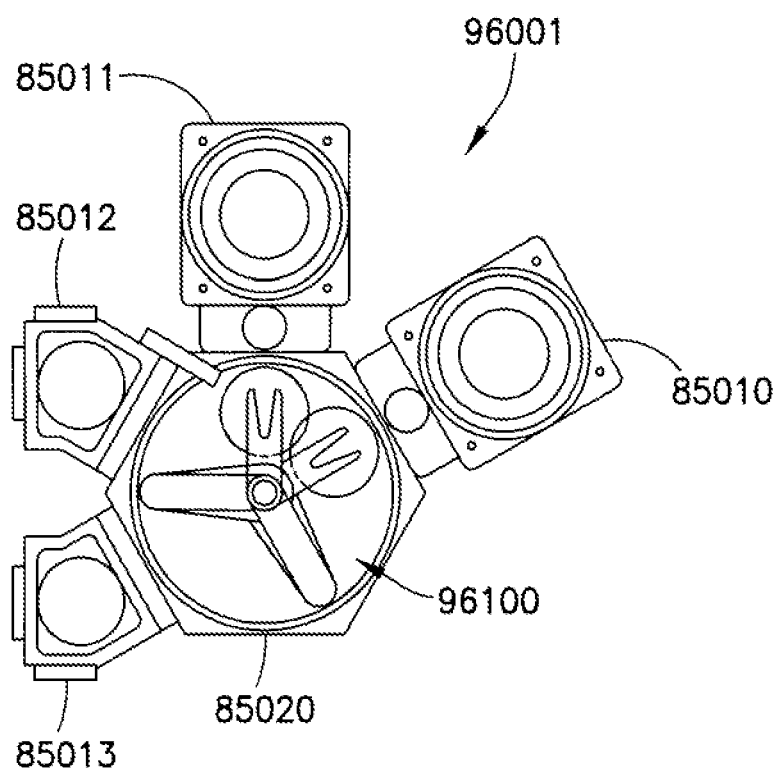
FIGS. 27A-27D are schematic illustrations of substrate transfer apparatus in accordance with aspects of the disclosed embodiment.
Figure 27B:
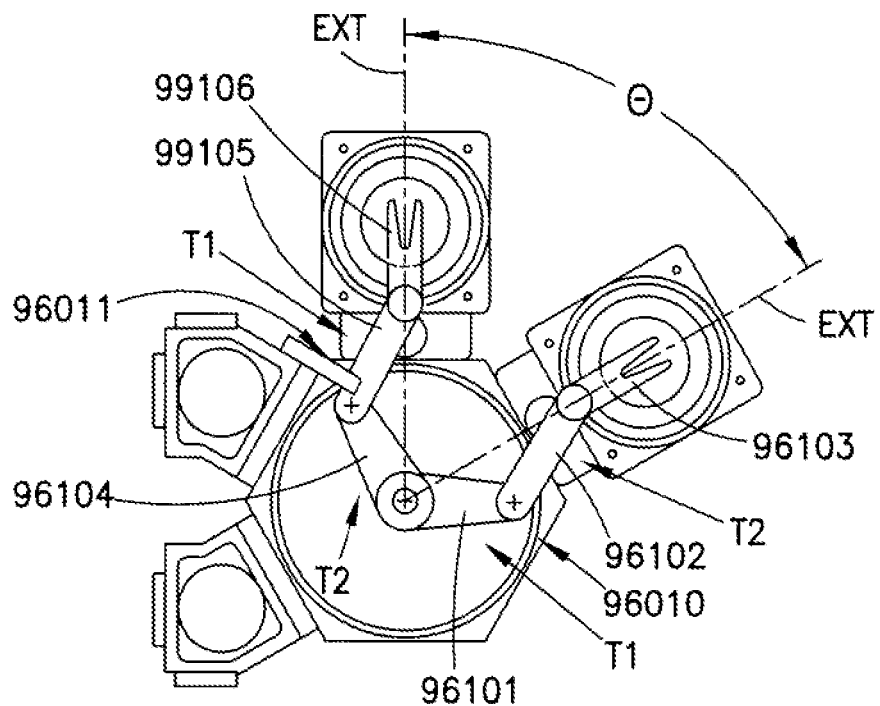
Figure 27C:
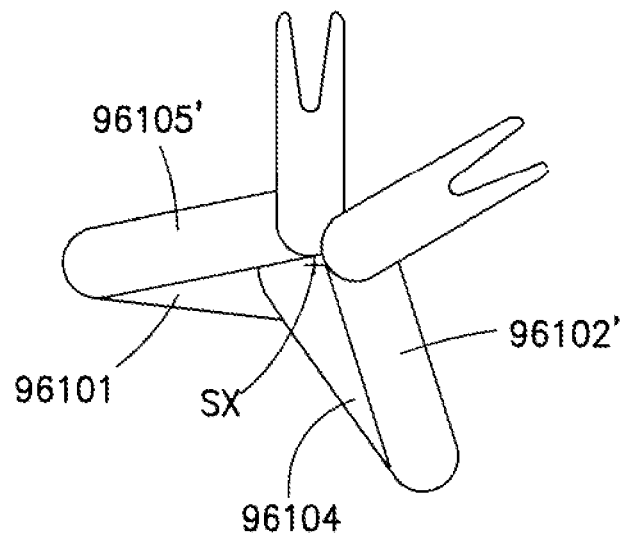
Figure 27D:
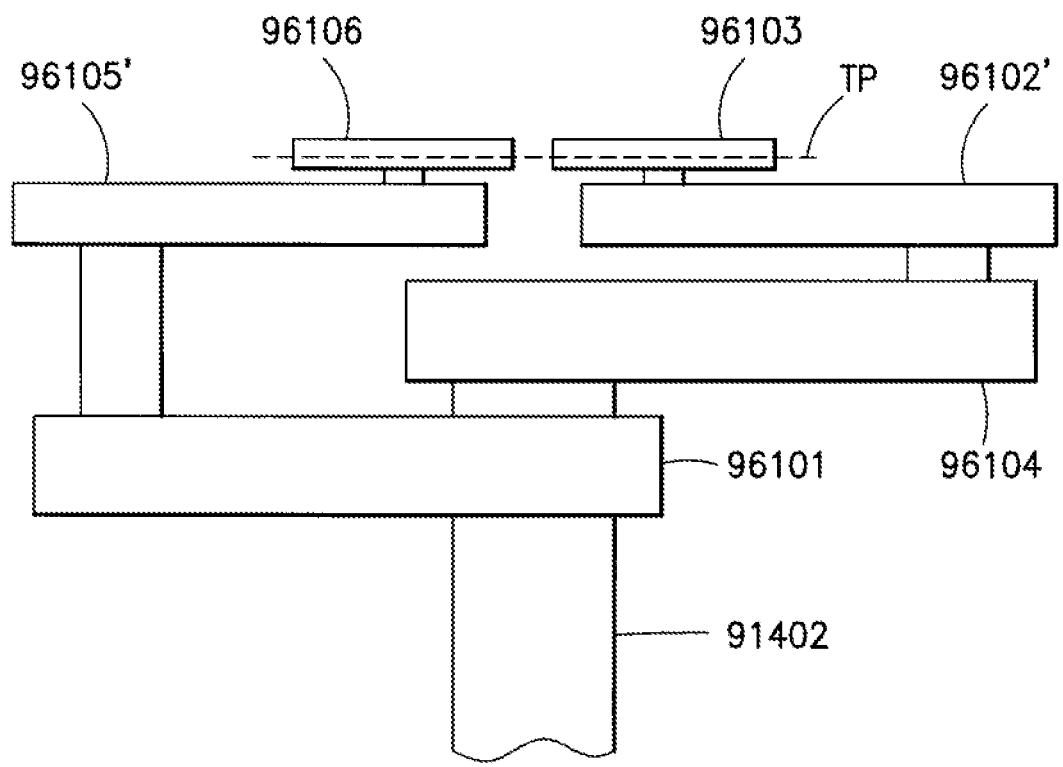
Figure 28:
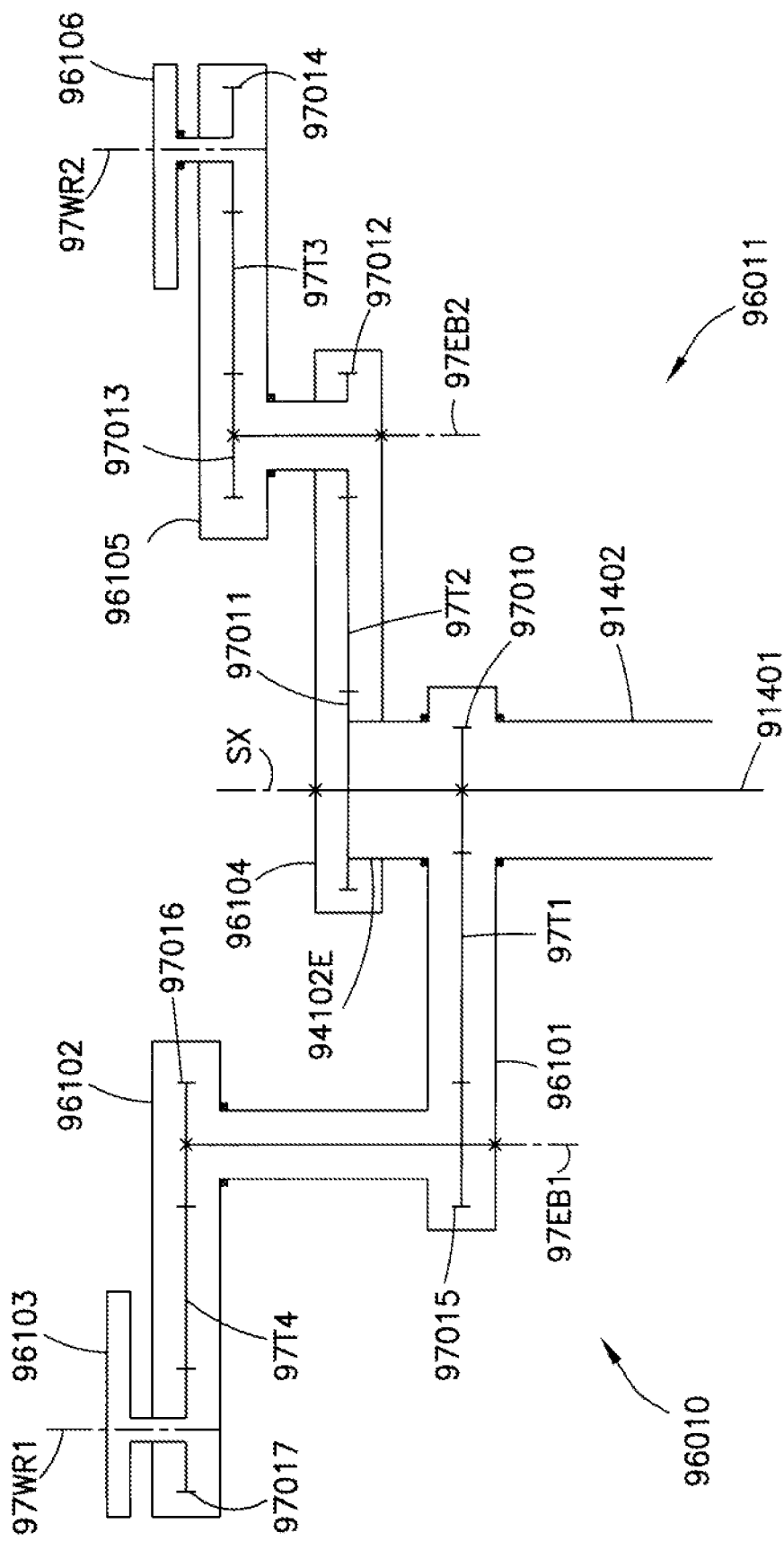
FIG. 28 is a schematic illustration of a portion of the transport apparatus of FIGS. 27A and 27B.

Referring to FIGS. 27A, 27B and 28 another substrate transfer apparatus 96100 is shown in accordance with an aspect of the disclosed embodiment. In this aspect, the substrate transfer apparatus 96100 is substantially similar to transfer apparatus 94100 unless otherwise noted. In this example, each arm 96010, 96011 includes an upper arm 96101, 96104, a forearm 96102, 96105 and at least one end effector 96103, 96106. It is noted that while only one end effector is shown, each arm may have multiple end effectors in either a stacked or side by side configuration for transferring batches of substrates with a single arm. The wrist axes of the arms 96010, 96011 in this example, are offset along the Z-axis to allow the wrists to retract over the shoulder axis SX (e.g. the wafer transfer plane of the end effectors are offset along the Z-axis so that the wafer transfer planes are substantially proximate one another such that rotation of one arm may be constrained by the other arm) where the arms are substantially symmetric to each other. However, in other aspects the wafer transfer plane TP of the end effectors may be located in a common plane where the arms 96010, 96011 are asymmetric mirror opposites of one another as shown in FIGS. 27C and 27D such that the forearms 96102',96105' are shorter in length than forearms 96102, 96105.

In this aspect the rotation of the end effectors 96103, 96106 is slaved to a respective upper arm 96101, 96104 so that the transfer apparatus can be operated with a drive system having two drive axes such as that described above with respect to FIG. 22. It should be understood that in other aspects the transfer apparatus may be operated with a drive system having more than two drive axes. For example, arm 96010 includes upper arm 96101, forearm 96102 rotatably mounted to upper arm 96101 about elbow axis 97EB1, and end effector 96103 rotatably mounted to forearm 96102 about wrist axis 97WR1. Upper arm 96101 may be coupled to drive shaft 91402 so that as drive shaft 91402 rotates the upper arm 96101 rotates with it. A pulley 97010 may be coupled to drive shaft 91401 so that as the drive shaft 94101 rotates the pulley 97010 rotates with it. Forearm 96102 may be fixedly coupled to pulley 97015 about the elbow axis 97EB1 so that as the pulley 97015 rotates the forearm 96102 rotates with it. The pulley 97015 may be coupled to pulley 97010 through any suitable transmission 97T1 so that the forearm is driven by drive shaft 91401. A pulley 97016 may be fixedly coupled to the upper arm 96101 about axis 97EB1. End effector 96103 may be fixedly coupled to pulley 97017 so that the end effector 96103 and pulley 97017 rotate as a unit. The pulley 97017 may be coupled to pulley 97016 through any suitable transmission 97T4 for slaving the rotation of the end effector 96103 to the upper arm 96101.

The upper arm 96104 may be fixedly coupled to drive shaft 91401 about shoulder axis SX so that as the drive shaft 91401 rotates the upper arm 96104 (and forearm 96102 of arm 96010) rotate in the same direction. Forearm 96105 is rotatably mounted to upper arm 96104 about elbow axis 96011. Forearm 96105 is fixedly coupled to pulley 97012 so that the pulley 97012 and forearm 96105 rotate as a unit. Pulley 97011 may be mounted to a drive shaft extension 94102E which may be an extension of drive shaft 91402 in a manner substantially similar to that described above. The pulley 97011 may be coupled to pulley 97012 through any suitable transmission 97T2 so that as drive shaft 91402 rotates the forearm 96105 (and the upper arm 96101 of arm 96010) rotate in the same direction. A pulley 97013 may be fixedly coupled to the upper arm 96104 about axis 97EB2. End effector 96106 may be fixedly coupled to pulley 97014 so that the end effector 96106 and pulley 97014 rotate as a unit. The pulley 97014 may be coupled to pulley 97013 through any suitable transmission 97T3 for slaving the rotation of the end effector 96106 to the upper arm 96104. It is noted that the pulleys may have any suitable diameters for maintaining alignment of the end effectors 96103, 96106 along an axis of extension and retraction EXT of the respective arm 96010, 96011. The operation of the transfer apparatus 96001 is substantially similar to that described above with respect to transfer apparatus 94001 except for the end effectors being slaved to the respective upper arms.

It is noted that the end effectors 96103, 96106 may be oriented on the respective forearm links 96102, 96105 so that an angle θ between the end effectors is substantially the same as the angle between the substrate holding locations (process modules 85010, 85011 and load locks 85012, 85013) as shown in FIG. 27B. The end effectors may also be located at different vertical heights. The process modules 85010, 85011 and the load locks 85012, 85013 may be configured to have different wafer transfer planes that correspond to the different vertical heights of the end effectors. For example, as shown in FIGS. 15A and 15B described above. In other aspects the Z-drive 91312 (FIG. 22) of the drive system 91400 may be configured to raise and lower the end effectors by the same amount or different amounts (e.g. the Z-drive may be configured to vertically move the end effector 96106 of one forearm 96105 independently of vertical movement of the end effector 96103 of the other forearm 96102) for picking and placing the substrates at the substrate holding locations. In yet another aspect the substrate holding locations may include Z-drives for changing the wafer transfer plane of the substrate holding location depending on the end effector being used to pick or pace a substrate from a corresponding substrate holding station.

In a first aspect of the disclosed embodiment a substrate transport apparatus is provided. The substrate transport apparatus includes a frame, a first arm coupled to the frame and a second arm coupled to the frame. A drive section is coupled to the first and second arms and configured to independently extend and rotate each of the first and second arms where an axis of extension of the first arm is angled relative to an axis of extension of the second arm.

In accordance with the first aspect of the embodiment each arm includes an end effector configured to hold at least one substrate where the end effectors are located on a common transfer plane.

In accordance with the first aspect of the embodiment, each arm includes an end effector configured to hold at least one substrate where the end effectors are located on different transfer planes.

In accordance with the first aspect of the embodiment the drive section comprises a four degree of freedom drive system.

In accordance with the first aspect of the embodiment the drive section includes a coaxial drive shaft arrangement.

In accordance with a first sub-aspect of the first aspect of the embodiment the first arm includes an upper arm connected to the drive section at a shoulder axis, a forearm connected to the upper arm at an elbow axis and an end effector coupled to the forearm at a wrist axis. The second arm includes an upper arm connected to the drive section at a shoulder axis, a forearm connected to the upper arm at an elbow axis and an end effector coupled to the forearm at a wrist axis. The shoulder axis of each of the first and second arms is a common axis.

In accordance with the first aspect of the embodiment, the forearms are arranged relative to each other in an opposed configuration such that the forearm of the first arm is located on an upper surface of a respective upper arm and the forearm of the second arm is located on a bottom surface of a respective upper arm.

In accordance with a second aspect of the embodiment a substrate processing apparatus is provided. The substrate processing apparatus including a frame, a first SCARA arm coupled to the frame at a shoulder axis, the first arm having a first upper arm, a first forearm and at least one substrate holder serially and rotatably coupled to each other, a second SCARA arm coupled to the frame at the shoulder axis so that shoulder axes of rotation of the first and second SCARA arms are substantially coincident, the second arm having a second upper arm, a second forearm and at least one substrate holder serially and rotatably coupled to each other, and a drive section connected to the frame and coupled to the first and second arms, the drive section being configured to independently extend and rotate each of the first and second arms where an axis of extension of the first arm is angled relative to an axis of extension of the second arm.

In accordance with a second aspect of the embodiment the drive section comprises a four degree of freedom drive system.

In accordance with a second aspect of the embodiment the drive section includes a coaxial drive shaft arrangement.

In accordance with a second aspect of the embodiment the frame includes a sealable chamber, wherein the first and second arms operate at least partially within the sealable chamber.

In accordance with a second aspect of the embodiment the at least one substrate holder of each of the first and second arms are disposed in substantially a common plane.

In accordance with a second aspect of the embodiment the at least one substrate holder of each of the first and second arms are disposed in planes that are proximate one another.

In accordance with a second aspect of the embodiment the substrate processing apparatus further includes a plurality of horizontally adjacent substrate holding locations at least partially radially encompassing the first and second arms, at least when the first and second arms are in a retracted configuration.

In accordance with a second aspect of the embodiment the substrate processing apparatus further includes a controller connected to the drive section and being configured to control the drive section to effect independent extension and rotation of each of the first and second arms.

In accordance with a third aspect of the disclosed embodiment a substrate processing apparatus is provided. The substrate processing apparatus includes a transport chamber and a substrate transport apparatus mounted at least partially within the transport chamber. The substrate transport apparatus includes a frame, a first SCARA arm having a first upper arm link, a first forearm link and at least one substrate holder rotatably and serially coupled to each other, a second SCARA arm having a second upper arm link, a second forearm link and at least one substrate holder rotatably and serially coupled to each other, where the first and second SCARA arms are mounted to the frame so that the first and second SCARA arms share a common shoulder axis, and a coaxial drive section connected to the first and second SCARA arms so that each of the first and second SCARA arms are capable of rotation and extension independent of the other one of the first and second SCARA arm, where the first and second SCARA arms are disposed so that an extension axis of the first SCARA arm is constrained to be angled with respect to an extension axis of the second SCARA arm.

In accordance with the third aspect of the disclosed embodiment pathways of the at least one substrate holder for each of the first and second SCARA arms along respective extension axes intersect.

In accordance with the third aspect of the disclosed embodiment pathways of the at least one substrate holder for each of the first and second SCARA arms extend to substantially intersect at the shoulder axis.

In accordance with the third aspect of the disclosed embodiment pathways of the at least one substrate holder for each of the first and second SCARA arms along respective extension axes cross.

In accordance with the third aspect of the disclosed embodiment the coaxial drive section comprises a four degree of freedom drive.

In accordance with the third aspect of the disclosed embodiment the at least one substrate holder of each of the first and second SCARA arms are disposed in substantially a common plane.

In accordance with a fourth aspect of the disclosed embodiment a substrate transport apparatus is provided. The substrate transport apparatus includes a transport chamber, and a substrate transport mounted at least partially within the transport chamber. The substrate transport including a frame, a first SCARA arm mounted to the frame about a shoulder axis and having a first upper arm link, a first forearm link and at least one substrate holder rotatably and serially coupled to each other, a second SCARA arm mounted to the frame about a shoulder axis and having a second upper arm link, a second forearm link and at least one substrate holder rotatably and serially coupled to each other, where the shoulder axis of the first SCARA arm is coincident with the shoulder axis of the second SCARA arm and the first and second SCARA arms are disposed to that extension of the first SCARA arm is constrained to be angled with respect to an extension axis of the second SCARA arm, a first drive section configured to drive rotation and extension of the first SCARA arm, and a second drive section configured to drive rotation and extension of the second SCARA arm, where a rotation axis of each of the first and second drive sections are coincident and each of the first and second SCARA arms is rotatable and extendable independent of the other one of the first and second SCARA arm.

In accordance with the fourth aspect of the disclosed embodiment pathways of the at least one substrate holder for each of the first and second SCARA arms along respective extension axes intersect.

In accordance with the fourth aspect of the disclosed embodiment pathways of the at least one substrate holder for each of the first and second SCARA arms extend to substantially intersect at the shoulder axis.

In accordance with the fourth aspect of the disclosed embodiment pathways of the at least one substrate holder for each of the first and second SCARA arms along respective extension axes cross.

In accordance with the fourth aspect of the disclosed embodiment the at least one substrate holder of each of the first and second SCARA arms are disposed in substantially a common plane or the first and second SCARA arms are disposed in planes that are proximate one another.

In a fifth aspect of the disclosed embodiment, a substrate processing apparatus includes a frame and a transfer apparatus connected to the frame. The transfer apparatus having a substantially rigid upper arm link, at least two forearm links rotatably coupled to the upper arm link, at least two end effectors rotatably coupled to each of the at least two forearm links, the forearm links being coupled so that an axis of extension of the at least two end effectors of one of the at least two forearm links is at an angle with respect to an axis of extension of the at least two forearm links of another of the at least two forearm links such that the axes of extension cross one another, and a drive system connected to the upper arm link, the at least two forearm links and the at least two end effectors, the drive system being configured so that the at least two end effectors of each of the at least two forearms are rotationally driven by a common drive axis of the drive system.

In accordance with the fifth aspect the drive system includes a directional converter configured to drive each of the at least two end effectors such that at least one end effector on each of the at least two forearms is rotated in a first direction and at least another end effector on each of the at least two forearms is rotated in a second direction that is opposite the first direction.

In accordance with the fifth aspect the at least two forearm links are rotatably coupled to substantially opposite ends of the substantially rigid upper arm link.

In accordance with the fifth aspect the upper arm link includes a first portion and a second portion releasably and rotationally coupled to each other and when released an angle between the first and second portions is adjustable and when not released the first and second portion form a substantially rigid link.

In accordance with the fifth aspect the substrate processing apparatus further includes at least two substrate holding locations arranged at an angle relative to one another wherein the at least two end effectors are arranged on each forearm such that a longitudinal axis of the end effectors is substantially aligned with an axes of extension and retraction into a respective one of the at least two substrate holding locations.

In accordance with the fifth aspect the substrate processing apparatus further includes at least one substrate holding location wherein each forearm link is coupled to a common drive axis of the drive system such that each forearm link is rotated in a common direction for both extending and retracting a respective end effector into and from the at least one substrate holding location.

In accordance with the fifth aspect the drive system includes at least one Z-drive configured to move the at least two end effectors of at least one of the at least two forearm links in a direction substantially perpendicular to a direction of extension and retraction of the at least two end effectors.

In accordance with the fifth aspect the drive system allows for the fast swapping of substrates held on each of the at least two end effectors.

In accordance with the fifth aspect the drive system is a two degree of freedom drive system.

In accordance with a sixth aspect of the disclosed embodiment a substrate processing apparatus includes a frame, and a transfer apparatus connected to the frame, the transfer apparatus having an upper arm link, at least two forearm links rotatably coupled to the upper arm link about respective elbow axes, at least one end effector rotatably coupled to each of the at least two forearm links about a respective wrist axis, and a two degree of freedom drive system operably connected to the upper arm link and the at least two forearm links for effecting extension and retraction of each the at least one end effector, wherein each of the at least one end effector is slaved to the upper arm link and the at least one end effector of one of the at least two forearm links is arranged at an angle relative to the at least one end effector of another of the at least two forearm links.

In accordance with the sixth aspect the substrate processing apparatus further includes at least two substrate holding locations connected to the frame and arranged at an angle relative to one another, wherein the angle of the at least two substrate holding locations is substantially the same as the angle between the at least one end effector of one of the at least two forearm links and the at least one end effector of another of the at least two forearm links.

In accordance with the sixth aspect the substrate processing apparatus further includes a drive system wherein each of the at least two forearm links are coupled to a common drive axis of the drive system so that each of the at least two forearm links rotate in unison about the respective elbow. Still in a further aspect the drive system includes at least one Z-drive configured to move the at least one end effector of at least one of the at least two forearm links in a direction substantially perpendicular to a direction of extension and retraction of the at least two end effectors.

In accordance with the sixth aspect the upper arm link includes a substantially rigid link and the at least two forearm links are rotatably coupled to substantially opposite ends of the substantially rigid link.

In accordance with the sixth aspect the upper arm link includes a first portion and a second portion releasably and rotationally coupled to each other and when released an angle between the first and second portions is adjustable and when not released the first and second portion form a substantially rigid link.

In accordance with a seventh aspect of the disclosed embodiment a substrate processing apparatus includes a frame, a drive system connected to the frame, a first transport arm having a first upper arm link, a first forearm link rotatably coupled to the first upper arm link and at least two end effectors rotatably coupled to the first forearm link, and a second transport arm having a second upper arm link, a second forearm link rotatably coupled to the first upper arm link and at least two end effectors rotatably coupled to the second forearm link, wherein the drive system is configured so that the at least two end effectors of the first transport arm and the two end effectors of the second transport arm are rotationally driven by a common drive axis of the drive system for the fast swapping of substrates held on each of the at least two end effectors.

In accordance with the seventh aspect the drive system includes a directional converter configured to drive each of the at least two end effectors such that at least one end effector on each of the first and second arms is rotated in a first direction and at least another end effector on each of the first and second arms is rotated in a second direction that is opposite the first direction.

In accordance with the seventh aspect the first and second upper arm links rotate about a common axis of rotation.

In accordance with the seventh aspect the drive system is connected to the first and second arms so that extension and retraction of the first transport arm is coupled with the extension and retraction of the second transport arm. In still a further aspect the first upper arm link and the second forearm link are coupled to a common drive axis of the drive system and the second upper arm link and the first forearm link are coupled to a common drive axis of the drive system.

In accordance with the seventh aspect the substrate processing apparatus further includes at least two substrate holding locations connected to the frame and arranged at an angle relative to one another, wherein the angle of the at least two substrate holding locations is substantially the same as an angle between the at least two end effectors of the first transport arm and the at least two end effectors of the second transport arm.

In accordance with the seventh aspect the drive system includes at least one Z-drive configured to move the at least two end effectors of at least one of the first and second arms in a direction substantially perpendicular to a direction of extension and retraction of the at least two end effectors.

In accordance with an eighth aspect of the disclosed embodiment a substrate processing apparatus includes a frame, a first transport arm connected to the frame and having a first upper arm link, a first forearm link rotatably coupled to the first upper arm link and at least one end effector rotatably coupled to the first forearm link, and a second transport arm connected to the frame and having a second upper arm link, a second forearm link rotatably coupled to the first upper arm link and at least one end effector rotatably coupled to the second forearm link, wherein each of the at least one end effector is slaved to a respective upper arm link and the at least one end effector of the first transport arm is arranged at an angle relative to the at least one end effector of the second transport arm.

In accordance with the eighth aspect the first and second upper arm links rotate about a common axis of rotation.

In accordance with the eighth aspect the drive system is connected to the first and second arms so that extension and retraction of the first transport arm is coupled with the extension and retraction of the second transport arm. In a further aspect the first upper arm link and the second forearm link are coupled to a common drive axis of the drive system and the second upper arm link and the first forearm link are coupled to a common drive axis of the drive system.

In accordance with the eighth aspect the substrate processing apparatus further includes at least two substrate holding locations connected to the frame and arranged at an angle relative to one another, wherein the angle of the at least two substrate holding locations is substantially the same as an angle between the at least one end effector of the first transport arm and the at least one end effector of the second transport arm.

In accordance with the eighth aspect the drive system includes at least one Z-drive configured to move the at least one end effector of at least one of the first and second arms in a direction substantially perpendicular to a direction of extension and retraction of the at least two end effectors.

In accordance with the eighth aspect the at least one end effector of the first and second transport arms are disposed in a common transfer plane.

In accordance with a ninth aspect of the disclosed embodiment a method is provided. The method including providing a substrate processing apparatus having a frame, providing a first SCARA arm coupled to the frame at a shoulder axis, the first arm having an upper arm, a forearm and at least one substrate holder serially and rotatably coupled to each other, providing a second arm coupled to the frame at the shoulder axis, the second arm having an upper arm, a forearm and at least one substrate holder serially and rotatably coupled to each other where the at least one substrate holder of each of the first and second arms are disposed in substantially a common plane, providing a drive section connected to the frame and coupled to the first and second arms, providing a plurality of horizontally adjacent substrate holding locations at least partially radially encompassing the first and second arms, at least when the first and second arms are in a retracted configuration, and controlling the drive section to effect independent extension and rotation of each of the first and second arms such that each of the horizontally adjacent substrate holding locations are accessed by each of the first and second arms.

It is noted that the aspects of the disclosed embodiment described herein can be used individually or in combination. Various alternatives and modifications can be devised by those skilled in the art without departing from the aspects of the embodiment. As such, the invention is not to be limited by what has been particularly shown and described, except as indicated by the appended claims.

What is claimed is:

1. A substrate processing apparatus comprising:
   a frame;
   a transfer apparatus connected to the frame, the transfer apparatus having:
      an upper arm link,
      at least two forearm links rotatably coupled to the upper arm link about respective elbow axes, and
      at least one end effector rotatably coupled to each of the at least two forearm links about a respective wrist axis; and
   a two degree of freedom drive system operably connected to the upper arm link and the at least two forearm links for effecting extension and retraction of each the at least one end effector wherein each of the at least one end effector is slaved to the upper arm link and the at least one end effector of one of the at least two forearm links is arranged at a non-zero angle relative to the at least one end effector of another of the at least two forearm links persistent throughout a range of motion of the transfer apparatus.

2. The substrate processing apparatus of claim 1, further comprising at least two substrate holding locations connected to the frame and arranged at an angle relative to one another, wherein the angle of the at least two substrate holding locations is substantially the same as the angle between the at least one end effector of one of the at least two forearm links and the at least one end effector of another of the at least two forearm links.

3. The substrate processing apparatus of claim 1, further comprising a drive system wherein each of the at least two forearm links are coupled to a common drive axis of the drive system so that each of the at least two forearm links rotate in unison about the respective elbow.

4. The substrate processing apparatus of claim 1, wherein the angle is a crossing angle.

5. The substrate processing apparatus of claim 1, wherein the at least one end effector of one forearm link is coupled to the at least one end effector of the other forearm link so that an axis of extension of the one end effector of the one forearm link persistent at each angular position of the axis of extension about a shoulder joint, is disposed so that the angle relative to each axis of extension of the other end effector of the other forearm link is a crossing angle.

6. The substrate processing apparatus of claim 1, wherein the upper arm link includes a substantially rigid link and the at least two forearm links are rotatably coupled to substantially opposite ends of the substantially rigid link.

7. The substrate processing apparatus of claim 1, wherein the upper arm link includes a first portion and a second portion releasably and rotationally coupled to each other and when released an angle between the first and second portions is adjustable and when not released the first and second portion form a substantially rigid link.

8. The substrate processing apparatus of claim 1, wherein the drive system is configured to substantially simultaneously:
   extend the at least two end effectors of the one of the a least two forearm links along the axis of extension of the one of the at least two forearm links, and
   extend the at least two end effectors of the other of the at least two forearm links along the axis of extension of the other of the at least two forearm links.

9. The substrate processing apparatus of claim 1, wherein the drive system is configured so that at least two forearm links are torqued together by a common torque applied through a common torque drive axis of the drive system.

10. The substrate processing apparatus of claim 1, wherein the substantially rigid upper arm link includes a first upper arm portion forming part of the substantially rigid upper arm link and a second upper arm portion forming another part of the substantially rigid upper arm link, the first upper arm portion and the second upper arm portion forming the substantially rigid upper arm link are unarticulatedly coupled to each other so that one of the first upper arm portion and the second upper arm portion is held in a fixed spatial relationship relative to another of the first upper arm portion and the second upper arm portion.

11. The substrate processing apparatus of claim 1, wherein the upper arm link includes a first portion and a second portion where the one of the at least two forearms is rotatably coupled to the first portion and the other of the other of the at least two forearms is rotatably coupled to the second portion, and an angle between the first portion and the second portion is adjustable.

12. The substrate processing apparatus of claim 11, wherein the angle between the first portion and the second portion is configured so as to be dynamically adjustable by the drive system.

13. The substrate processing apparatus of claim 11, wherein the first portion and the second portion are coupled to each other through a releasable coupling.

14. The substrate processing apparatus of claim 1, wherein each of the at least one end effector is slaved to the upper arm link.

15. A substrate processing apparatus comprising:
   a frame;
   a transfer apparatus connected to the frame, the transfer apparatus having:
      an upper arm link,
      at least two forearm links rotatably coupled to the upper arm link about respective elbow axes, and at least one end effector rotatably coupled to each of the at least two forearm links about a respective wrist axis; and a two degree of freedom drive system operably connected to the upper arm link and the at least two forearm links for effecting extension and retraction of each the at least one end effector wherein the drive system is configured so that at least two forearm links are torqued together by a common torque applied through a common torque drive axis of the two degree of freedom drive system, and the at least one end effector of one of the at least two forearm links is arranged at a non-zero angle relative to the at least one end effector of another of the at least two forearm links persistent throughout a range of motion of the transfer apparatus.

16. The substrate processing apparatus of claim 15, further comprising at least two substrate holding locations connected to the frame and arranged at an angle relative to one another, wherein the angle of the at least two substrate holding locations is substantially the same as the angle between the at least one end effector of one of the at least two forearm links and the at least one end effector of another of the at least two forearm links.

17. The substrate processing apparatus of claim 15, further comprising a drive system wherein each of the at least two forearm links are coupled to a common drive axis of the drive system so that each of the at least two forearm links rotate in unison about the respective elbow.

18. The substrate processing apparatus of claim 15, wherein the angle is a crossing angle.

19. The substrate processing apparatus of claim 15, wherein the at least one end effector of one forearm link is coupled to the at least one end effector of the other forearm link so that an axis of extension of the one end effector of the one forearm link persistent at each angular position of the axis of extension about a shoulder joint, is disposed so that the angle relative to each axis of extension of the other end effector of the other forearm link is a crossing angle.

20. The substrate processing apparatus of claim 15, wherein the upper arm link includes a substantially rigid link and the at least two forearm links are rotatably coupled to substantially opposite ends of the substantially rigid link.

* * * * *